United States Patent [19]

Bernhard et al.

[11] 4,228,495
[45] Oct. 14, 1980

[54] MULTIPROCESSOR NUMERICAL CONTROL SYSTEM

[75] Inventors: Theodore L. Bernhard, Mentor on the Lake; Ernst Dummermuth, Chesterland; Thomas M. Hoch, Woodmere; Bruce S. Jaffe, Mayfield Heights; Gregory L. Merrell, Cleveland Heights, all of Ohio

[73] Assignee: Allen-Bradley Company, Milwaukee, Wis.

[21] Appl. No.: 970,959

[22] Filed: Dec. 19, 1978

[51] Int. Cl.³ .................. G05B 19/18; G06F 15/16
[52] U.S. Cl. .................. 364/101; 364/200; 364/474
[58] Field of Search ......... 364/104, 107, 474, 101, 364/102, 200 MS File, 900 MS File

[56] References Cited

U.S. PATENT DOCUMENTS

| | | | |
|---|---|---|---|
| 3,810,104 | 5/1974 | Markley | 364/104 X |
| 4,029,950 | 6/1977 | Haga | 364/474 X |
| 4,034,354 | 7/1977 | Simmons | 364/900 |
| 4,038,533 | 7/1977 | Dummermuth et al. | 364/104 |
| 4,064,395 | 12/1977 | Schubeler et al. | 364/107 |
| 4,074,350 | 2/1978 | Roch et al. | 364/474 X |
| 4,079,235 | 3/1978 | Froyd et al. | 364/107 |
| 4,107,785 | 8/1978 | Seipp | 364/900 |
| 4,118,771 | 10/1978 | Pomella et al. | 364/474 X |

OTHER PUBLICATIONS

Roome-"Advanced Interface Techniques with Microcomputer Numerical Control"—Conference Paper, Actron, Div. of McDonnel Douglas, Monrovia, Calif. pp. 1-14.
"Bendix Dynapath ® System SM Modular Computer Numerical Control" Brochure-Bendix Industrial Controls Division, Detroit, Michigan.

Primary Examiner—Joseph F. Ruggiero
Attorney, Agent, or Firm—Quarles & Brady

[57] ABSTRACT

A numerical control system includes a main processor which performs such functions as interpolation and outputting of motion command signals to the servomechanisms on a machine tool. A separate programmable interface processor connects to the main processor bus structure and it operates as a programmable controller to control the discrete digital I/O devices associated with the machine tool. A third processor couples through a serial data link with the main processor and it operates to service peripheral I/O devices associated with the front control panel on the numerical control system.

26 Claims, 44 Drawing Figures

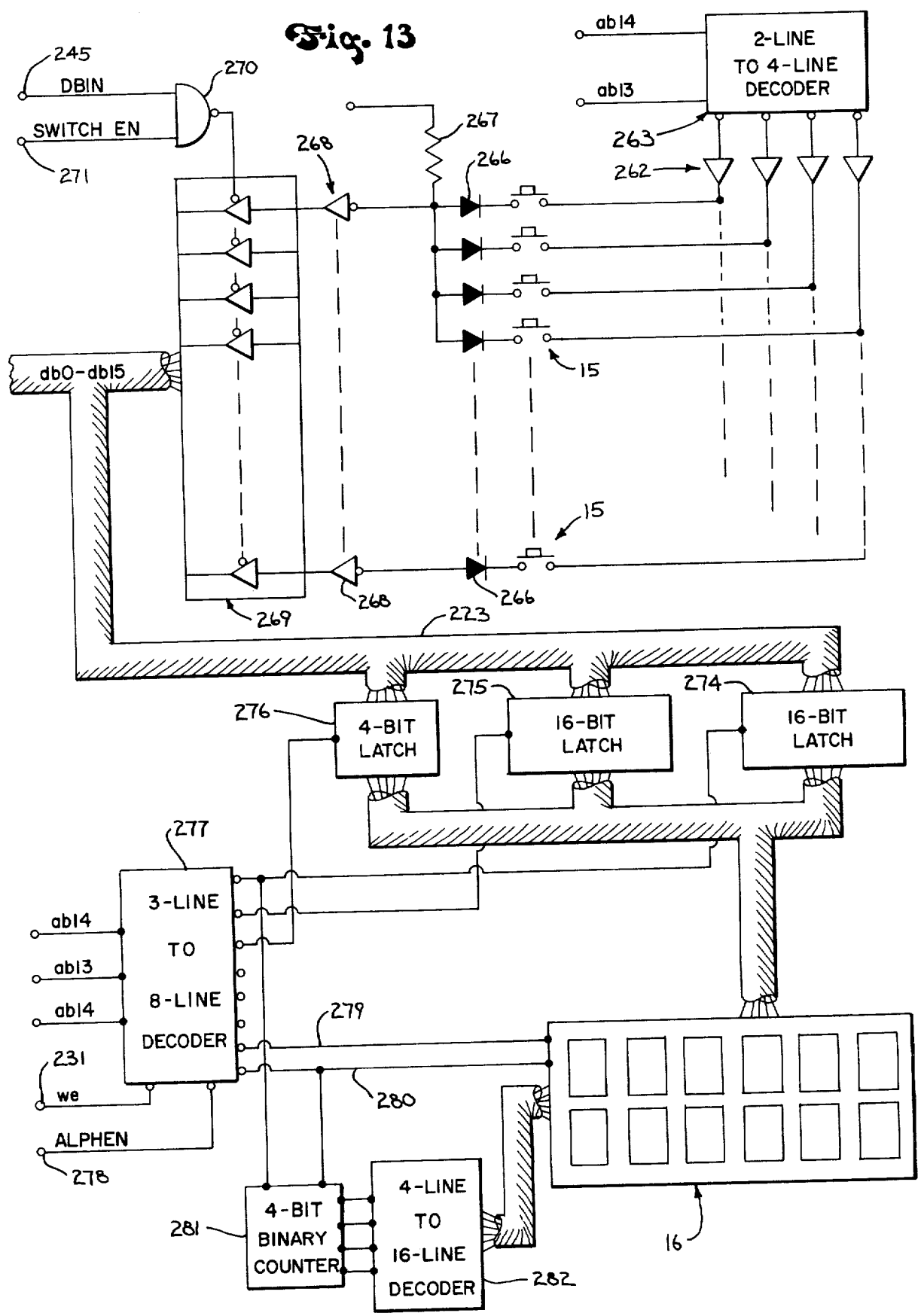

SCHEDULE QUEUE

| PCB MEMORY ADDRESS | ALLOCATED TIME SLICES |
|---|---|
| A(PCB1) | MSC1 = 32 |
| A(PCB2) | MSC2 = 32 |
| A(PCB3) | MSC3 = 3 |
| A(PCB4) | MSC4 = 1 |
| A(PCB5) | MSC5 = 1 |
| A(PCB6) | MSC6 = 1 |
| A(PCB7) | MSC7 = 2 |

368

PROCESS CONTROL BLOCK

| IOW | CIW | PRW | |
|---|---|---|---|
| CURRENT TIME SLICES REMAINING | | | (CSC) |
| MEMORY EXTENSION REG. CONTENTS | | | (MXR) |
| WORKSPACE POINTER | | | (WP) |
| PROGRAM COUNTER | | | (PC) |
| PROGRAM STATUS | | | (ST) |

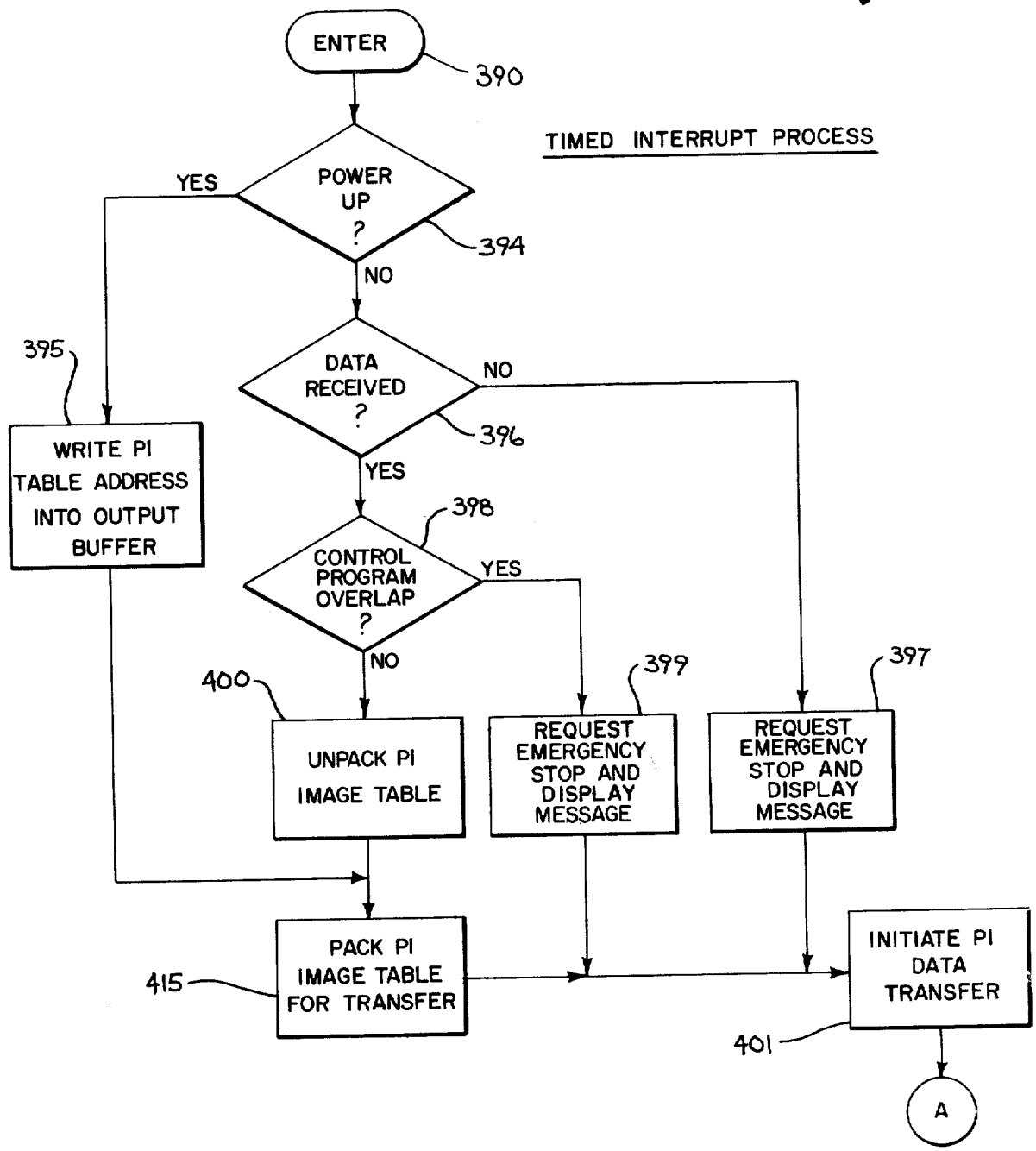

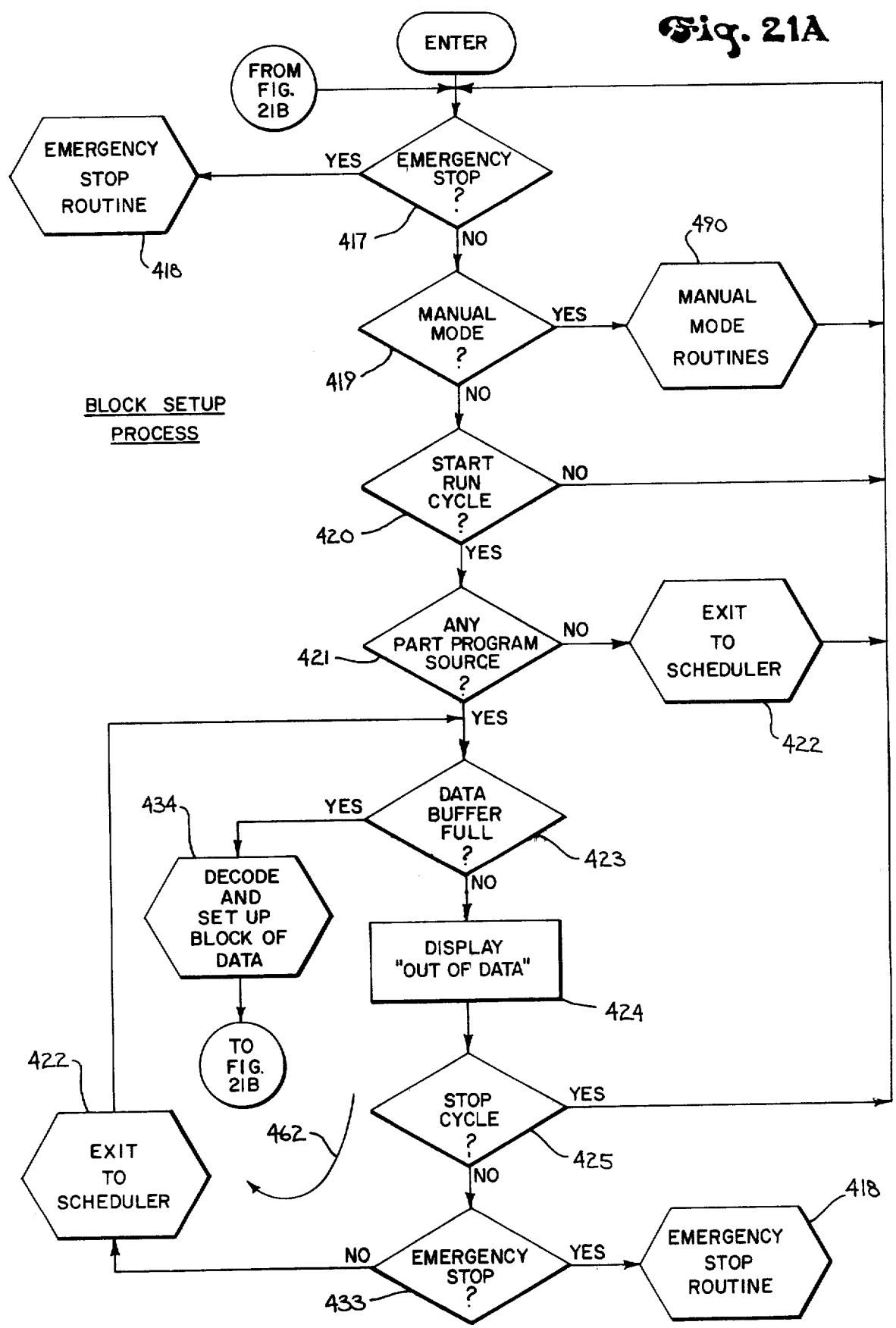

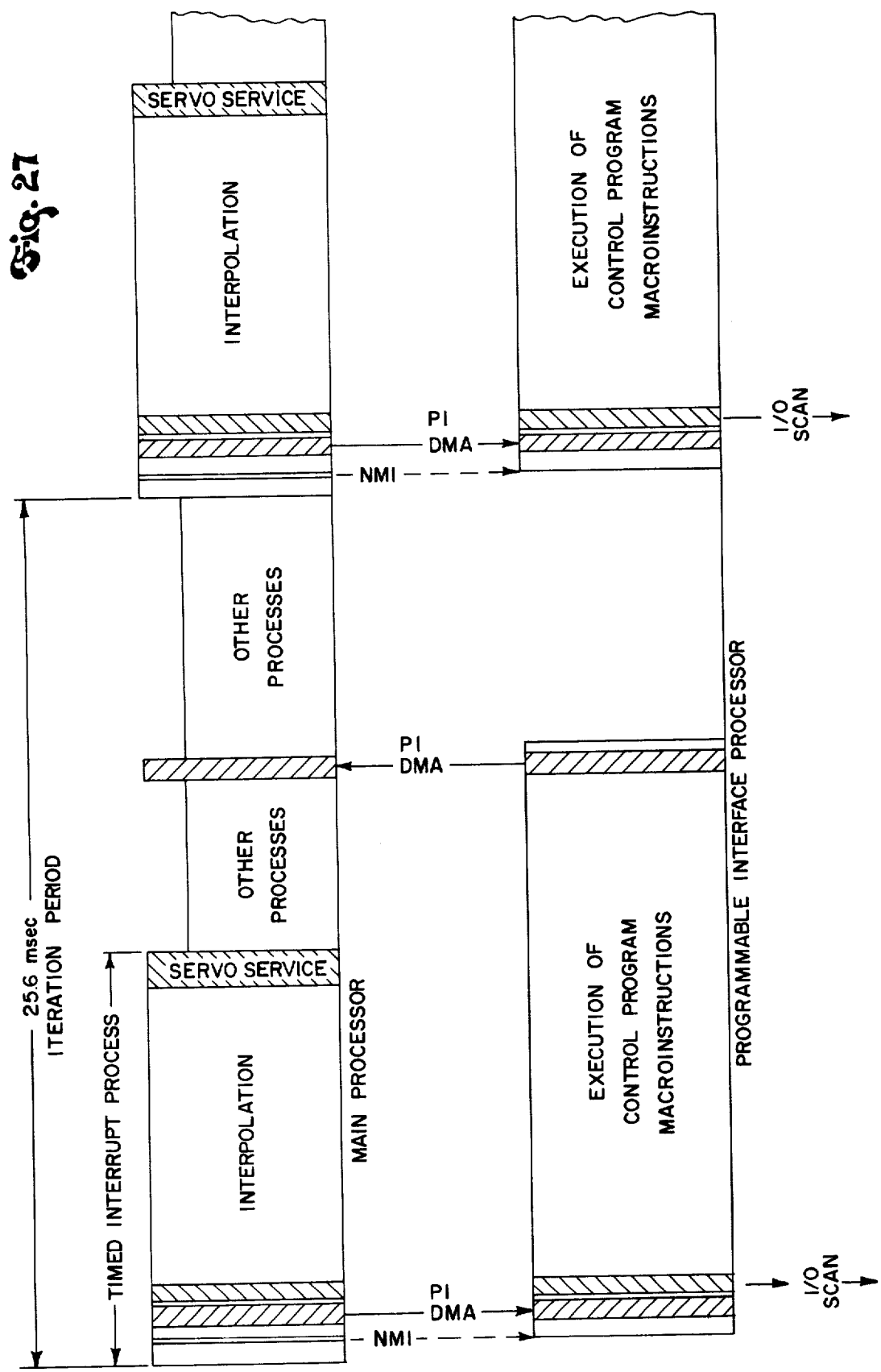

Fig. 30

REPORTED EVENT

| CURRENT STATE OF INDICATED TASK | EIC | EOC | ENRI | ESLP | EWU | EBFD | EIOW | ERK | EKI | EPN | EGN | ECOD | EWCO | ERRQ | ERDI |
|---|---|---|---|---|---|---|---|---|---|---|---|---|---|---|---|
| SCPT |  |  |  | GO TO SSLP |  |  | GO TO SIOW |  |  | GO TO SNULL |  |  |  |  |  |
| SEXT |  |  |  | GO TO SSLP |  |  |  |  |  | GO TO SNULL |  |  |  |  |  |
| SSLP |  |  |  |  | GO TO SEXT |  |  |  |  |  |  |  |  |  |  |
| SIOW | GO TO SEXT | GO TO SEXT |  |  |  |  |  | GO TO SEXT | GO TO SEXT |  | GO TO SEXT |  |  | GO TO SEXT | GO TO SEXT |
| SNULL |  |  | GO TO SEXT | GO TO SSLP | GO TO SEXT |  |  |  |  |  |  |  |  |  |  |

Fig. 32

| TASK NUMBER | PRIORITY NUMBER |
|---|---|
| INHIBIT BITS | BUFFER TYPE |
| EXECUTION TIME ||
| EXECUTION TIME ||
| SLEEP TIME NUMBER ||
| WORKSPACE POINTER ||
| PROGRAM COUNTER ||
| STATUS REGISTER ||

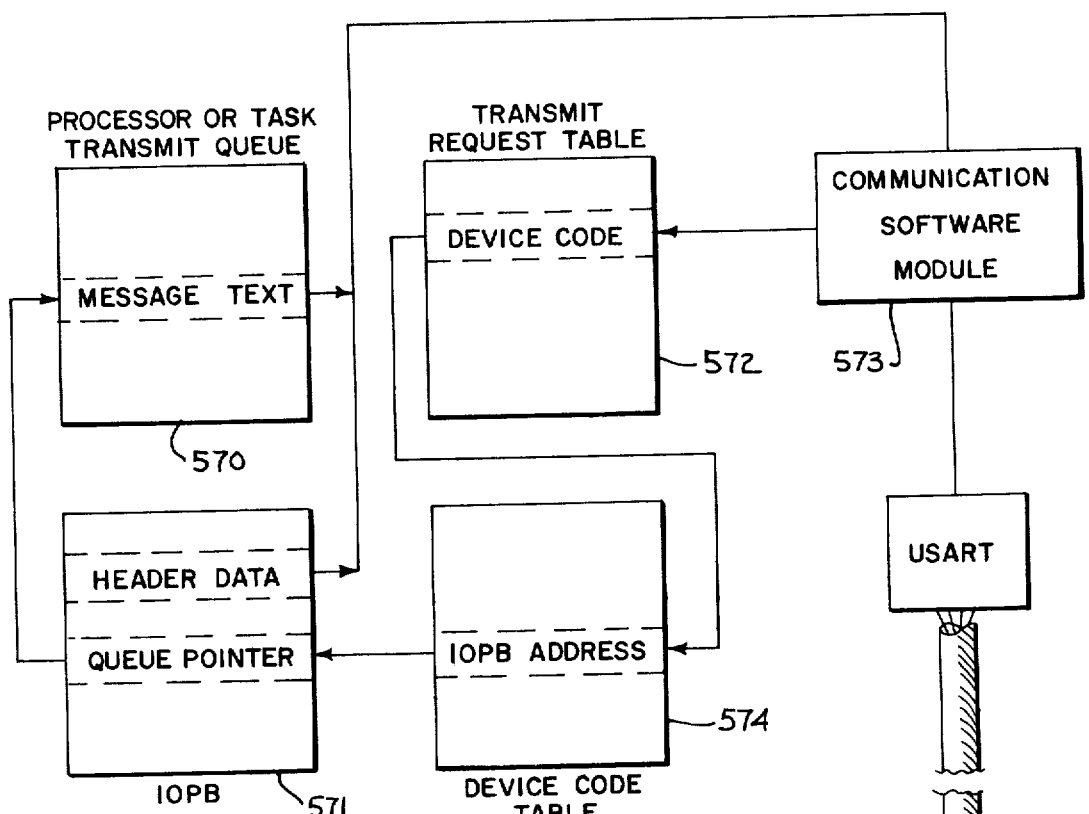
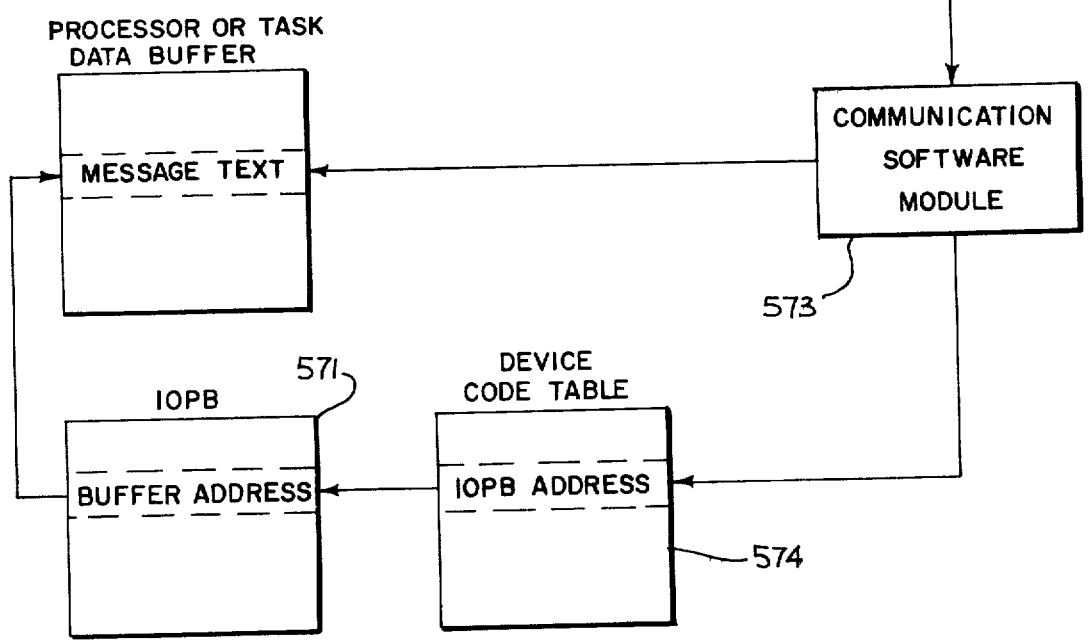
Fig. 35

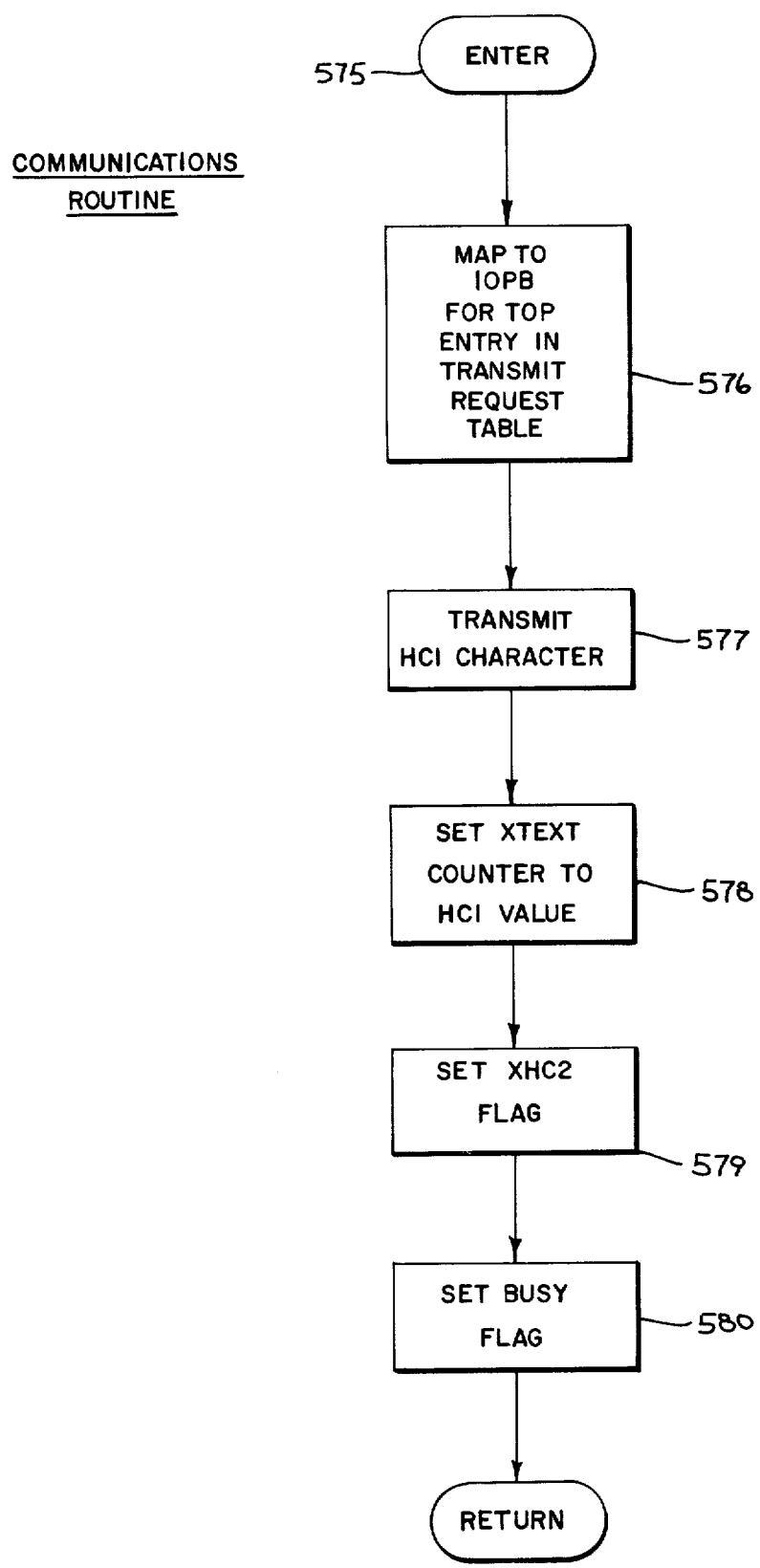

MULTIPROCESSOR NUMERICAL CONTROL SYSTEM

BACKGROUND OF THE INVENTION

The field of the invention is numerical control systems for machine tools, and particularly, control systems such as that described in U.S. Pat. No. 4,038,533 entitled "Industrial Control Processor System."

Numerical control systems connect to machine tools to control the motion of a cutting tool in response to a stored part program which directs the machine through a series of steps. In a milling machine, for example, the cutting tool may be moved along three separate axes to make straight line or circular cuts in a work piece, and the part program is a series of directions stored as digital numbers and codes which indicate where the cuts are to be made and in what sequence they are to be made. Although the part programs have traditionally been stored on magnetic or punched tape and have been read into the numerical control system in blocks of data as they are being executed, more recent numerical control systems store entire part programs in their random access memories.

In addition to controlling the motions of a cutting tool, numerical control systems also control auxiliary functions on the machine such as tool selection and changing, spindle speed, coolant flow, pallet selection and changing. These auxiliary functions vary considerably from machine to machine and they have typically been performed by separate hardwired logic circuits which respond both to sensed conditions on the machine tool and to directions indicated by selected codes within the part program. As exemplified by the above cited U.S. Pat. No. 4,038,533 and U.S. Pat. No. 3,810,104 entitled "Programmable Magnetics for a Numerical Control System," in recent years programmable controllers have been interfaced with the numerical control system processor to control the auxiliary functions. Such programmable controllers may be a separate programmed processor or an integral part of the numerical control system processor.

The addition of a programmable controller to a numerical control system provides a number of very practical advantages. First, the programmable controller hardware need not be changed when integrating the numerical control system to various types of machine tools. Instead, the programmable controller is programmed to enable it to interface with a particular machine. Second, although programmable interfaces have been available for many years in minicomputer-based numerical control systems, a programmable controller is much easier for the user to program because of the instruction set which is employed and the editing features which are available on programmable controllers.

Despite the many advantages of interfacing a programmable controller to a numerical control system, it does add cost to the system, and in some cases this added cost cannot be justified. For example, in some applications the machine tool to which the control is interfaced is very simple and the job of developing and building a separate logic circuit or relay circuit to operate the discrete I/O devices is trivial. It is desirable, therefore, that a numerical control system provide the programmable controller interface as an optional feature rather than an inseparable part of the basic numerical control system.

The vast majority of numerical control systems in service are constructed of discrete digital electronic components such as logic gates, latches, flip-flops and reigsters. In recent years, however, minicomputers or industrial computers, such as that disclosed in the above cited U.S. Pat. No. 4,038,533 have been programmed to carry out the numerical control functions. With the advent of relatively fast and inexpensive microprocessors, microprocessor-based numerical control systems are now economically and technically feasible.

Numerical control systems include a processor which converts blocks of part program data into motion command signals which are output to servomechanisms on a machine. In addition, codes in the part program are converted to logic signals which control the discrete I/O devices on the machine to perform auxiliary functions. The operation of the numerical control system is controlled through numerous switches and display devices which are mounted on a front panel where they are accessible to the machine operator. Keyboards and CRT displays are also commonly associated with the front panel to enable entry of manual data and editing of part program data. Numerous connections are required between these front panel devices and the numerical control processor. Such connections are expensive to make and as a practical matter this requires that the front panel and the numerical control processor be located as close as possible to each other. As a result, most numerical control systems are housed in a large cabinet with the front panel controls disposed on its front. The cabinet is positioned for the convenience of the operator and considerable wiring is required between the free-standing numerical control cabinet and the machine which it controls.

SUMMARY OF THE INVENTION

The present invention relates to a numerical control system in which a plurality of microprocessors are interconnected and programmed to carry out the many numerical control system functions, and particularly, are interconnected in such manner as to provide maximum flexibility in the size, physical configuration and capability of the system. The numerical control system of the present invention includes: a front panel processor which is interfaced with a data input device and a display; a main processor which is interfaced to the front panel processor, the servomechanism on a machine tool and discrete digital input/output devices on the machine tool; and a programmable interface processor coupled to the main processor and operable to perform programmable controller functions.

The front panel processor is a self-contained system which exchanges data with the main processor, but is otherwise independent. The front panel processor monitors the front panel switches, input blocks of data from a tape reader, TTY, magnetic cassette or other input media and drives front panel lights and an alpha numeric display or cathode ray tube display. The front panel processor exchanges data with the main processor through a single communication link which allows the front panel to be located remotely from the main processor. As a result, the front panel and associated front panel processor may either be mounted in the same cabinet with the main processor, or it may be mounted separately in a smaller pendent station which is convenient to the machine operator.

The programmable interface proessor is also a separately operating system whih is coupled to the main processor data and address buses through an interface circuit. Periodically data indicating the state of the numerical control system and any auxiliary functions which are to be performed by it is coupled from the main processor to the programmable interface processor and data indicating the state of the controlled machine tool is coupled from the programmable interface processor to the main processor. The main processor proceeds to perform other functions while the programmable interface processor executes a stored control program comprised of programmable controller instructions. The programmable interface processor also periodically steals the main processor data and address buses to input data from the discrete digital devices on the machine tool and to output data thereto. The programmable interface processor may be connected to a program loader such as those disclosed in U.S. Pat. Nos. 3,813,649 and 4,070,702 to facilitate the loading and editing of the control program which it executes.

A general object of the invention is to provide a numerical control system which is very flexible in terms of its size, physical configuration and capabilities. The separately operating microprocessors enable features to be added or taken away with minimal hardware and software changes. Switches, indicators, visual displays and other operator related input/output devices may be easily added or removed from the front control panel. The main processor with its complex programs need not be disturbed. Similarly, changes made to the machine tool usually require only a change in the control program executed by the programmable interface processor. Such changes in the control program can easily be made by the user through a program panel using well known programmable controller editing techniques.

The foregoing and other objects and advantages of the invention will appear from the following description. In the description reference is made to the accompanying drawings which form a part hereof, and in which there is shown by way of illustration a preferred embodiment of the invention. Such description does not necessarily represent the full scope of the invention, and reference is made to the claims herein for interpreting the breadth of the invention.

BRIEF DECRIPTION OF THE DRAWINGS

FIG. 9 is an electrical schematic diagram of the real time clock circuit which forms part of the main processor of FIG. 2;

FIG. 13 is an electrical schematic diagram of the switch and display interface circuit which forms part of the front panel processor of FIG. 7;

FIGS. 20A and 20B is a flow chart of the timed interrupt process which forms part of the system of FIG. 15;

FIGS. 21A and 21B is a flow chart of the block set up process which forms part of the system of FIG. 15;

FIG. 27 is a timing diagram illustrating the parallel operation of the programmable interface processor and the main processor;

FIG. 30 is an illustration of the state-event table employed in the software system of FIG. 29;

FIG. 32 is a schematic diagram illustrating the contents of the task status blocks which form part of the system of FIG. 29;

FIG. 35 is a schematic illustration of the data structure associated with the serial data link;

FIG. 36 is a flow chart of the communications routine associated with the serial data link and executed by both the main processor and front panel processor.

DESCRIPTION OF THE PREFERRED EMBODIMENT

Figure 1:
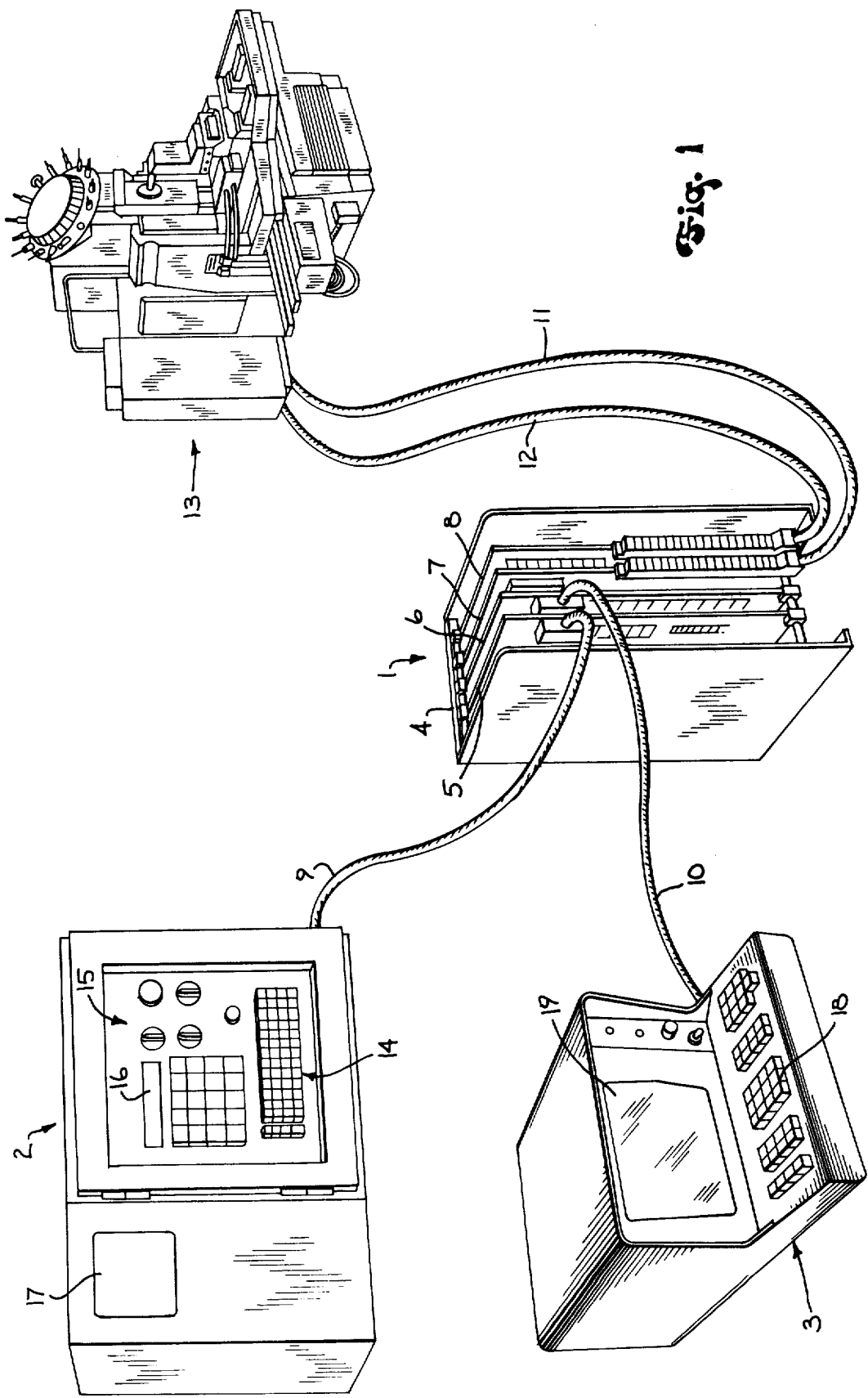
FIG. 1 is a pictorial view of the numerical control system of the present invention.

Referring to FIG. 1, the preferred embodiment of the numerical control system of the present invention is housed within a main enclosure 1 and a pendent control station 2. A program panel station 3 is also employed to load and edit the control program executed by the programmable interface processor, but it does not form part of the operating system. The physical construction of the main enclosure 1 is disclosed in copending U.S. patent application Ser. No. 853,227 filed on Nov. 21, 1977 now U.S. Pat. No. 4,151,580 and entitled "Circuit Board Assembly With Disconnect Arm" and it includes a back plane motherboard 4 and a series of printed circuit boards which connect to the motherboard 4 and extend forward therefrom.

The circuit boards mount much of the circuitry to be described herein, and they include a main processor circuit board 5, a programmable interface circuit board 6, a servomechanism interface board 7 and an I/O interface board 8. The main processor circuit board 5 is connected to the pendent control station 2 through a cable 9 and the programmable interface circuit board 6 is connected to the program panel station 3 through a cable 10. Similarly, the servomechanism interface board 7 and the I/O interface board 8 are connected by cables 11 and 12 to the machine tool 13 which is being controlled. Typically, the main enclosure 1 is housed in a cabinet attached to the machine tool 13 and the cables 11 and 12 contain numerous leads which connect with equipment in the same cabinet. In contrast, the cables 9 and 10 are serial data links which may extend up to 50 feet in length.

The pendent control station 2 is mounted in a location which is convenient to the machine tool operator and it includes a keyboard 14 and switches 15 for manual entry of data. It also includes an optional alpha numeric display 16 and an optional CRT display 17. The pendent control station 2 encloses a front panel processor circuit board (not shown in the drawings) which connects to the cable 9 and which includes circuitry to be described hereinafter that processes data from the keyboard 14 and switches 15 and outputs data to the alpha numeric display 16 and CRT display 17.

The program panel station 3 includes a keyboard 18 and a display 19. The program panel station 3 is connected to the programmable interface circuit board 6 by the cable 10, and it is operated to load and edit a control program of the type executed by programmable controllers. After this operation is completed, the program panel station 3 may be disconnected and used on other machines.

MAIN PROCESSOR HARDWARE

Figure 2:
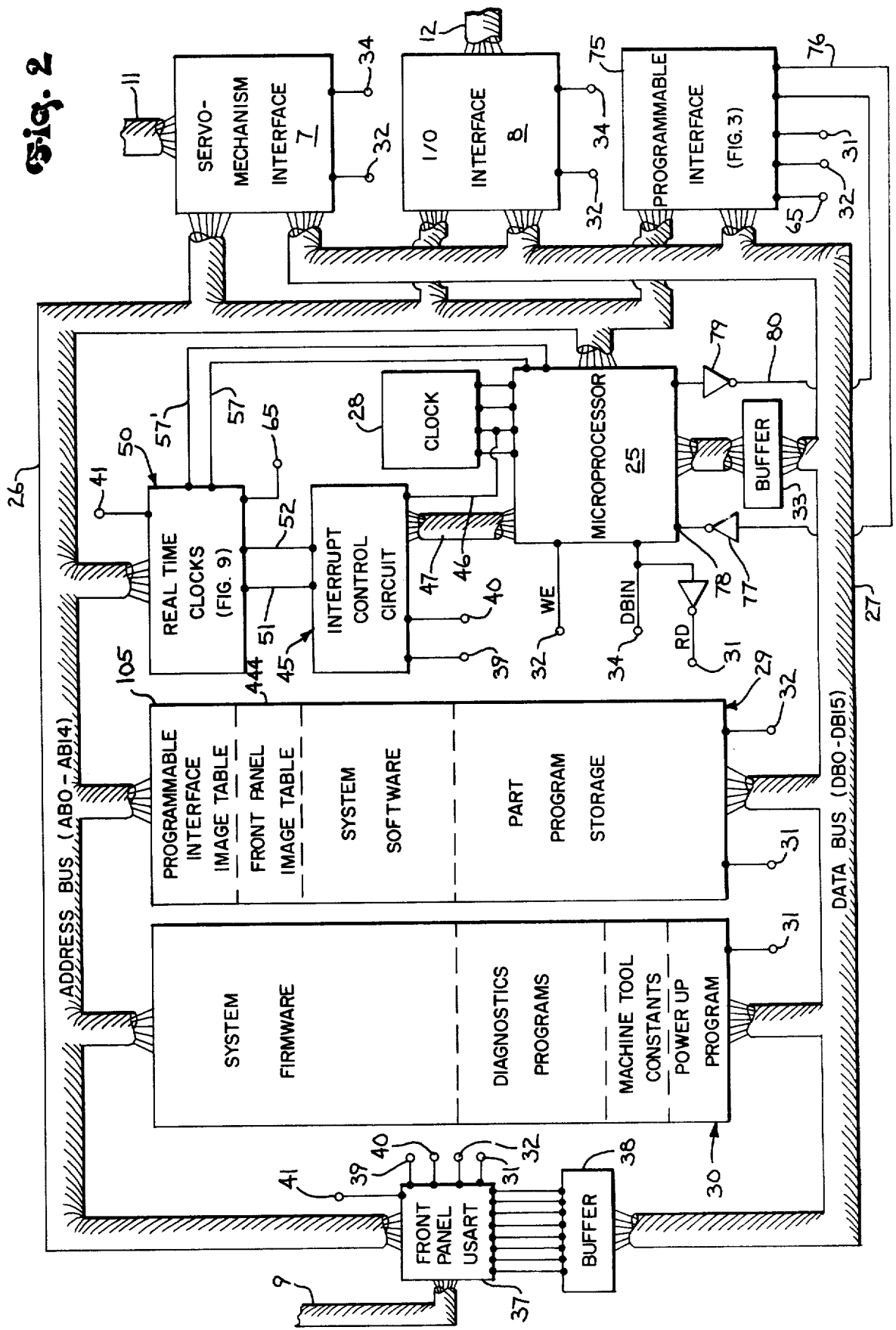
FIG. 2 is an electrical schematic diagram of the main processor portion of the system of FIG. 1.

Referring particularly to FIG. 2, the main processor of the numerical control system is mounted on the circuit board 5 and is formed around a 16-bit microprocessor 25 which is connected to a fifteen-lead address bus 26 and a sixteen-lead data bus 27. A TMS 9900 microprocessor manufactured by Texas Instruments Incorporated is employed and it is driven by a 3.3 megahertz, four-phase clock 28. The address bus 26 and the data bus 27 are also formed in the motherboard 4 and they connect to a number of system elements including a random access memory 29 and a read-only memory 30. Although the size of the memories 29 and 30 can vary considerably depending upon the particular requirements of the system, the basic system includes a 17-bit by 4K random access memory 29 and a 16-bit by 12K read-only memory 30. A RD control line 31 connects both the random access memory 29 and the read-only memory 30 to the microprocessor 25 and a WE control line 32 connects between the random access memory 29 and the microprocessor 25. A 16-bit word is read from either the random access memory 29 or the read-only memory 30 when a selected memory line is addressed through the bus 26 and a logic low control signal is applied to the RD control line 31. The 16-bit word thus read from either the memory 29 or 30 is coupled through the data bus 27 and through a 16-bit buffer 33 to a designated register inside the microprocessor 25. A 16-bit data word is written into the random access memory 29 by addressing a selected line in the memory 29 through the bus 26 and applying a logic low control signal on the WE control line 32. Additional memory may be added to the system, and by expanding the address bus to nineteen leads, up to 512K of memory can be accommodated.

Referring particularly to FIG. 2, the data bus 27 and the address bus 26 also connect through the motherboard 4 to circuits on the servomechanism interface board 7. The servomechanism interface board 7 includes 16-bit motion command registers (not shown in the drawings) and 16-bit feedback word registers (not shown in the drawings). These registers can be separately addressed through the address bus 26 and a 16-bit motion command word can thus be written into any one of the motion command registers when a logic low voltage is applied to the WE control line 32. Similarly, a 16-bit following error word can be read from an addressed feedback register when a logic low voltage is generated on a DBIN control line 34.

As is well known in the art, by periodically calculating a new position command number which is output to the servomechanism on the machine tool 13, the motion of a cutting tool can be precisely controlled. In such case, one position command register and one feedback register is associated with each axis of motion. Although the control loop could be closed within the main processor, in the preferred embodiment the control loop for each axis of machine motion is closed on the servomechanism interface board 7 employing techniques such as that disclosed in U.S. Pat. No. 3,752,969 issued on Aug. 14, 1973 and entitled "Method and Means for Updating the Position Dimension of a Numerically Controlled Machine Tool."

Referring particularly to FIG. 2, the data bus 27 and the address bus 26 also connect through the motherboard 4 to circuits on the I/O interface boards 8. The I/O interface circuit boards 8 include sets of sixteen input circuits and sets of sixteen output circuits. The input circuits are each individually connected to a sensing device on the machine tool 13, such as a limit switch, and each output circuit is connected to an operating device on the machine tool 13, such as a motor starter or solenoid. Input circuits such as those disclosed in U.S. Pat. Nos. 3,643,115 and 3,992,636 may be employed and output circuits such as that disclosed in U.S.

Pat. No. 3,745,546 may be employed. Date may be written into a set of output circuits by generating the appropriate address on the bus 26 and applying a logic low voltage to the WE control line 32. Similarly, data can be read from a set of input circuits by generating the proper address on the address bus 26 and applying a logic low voltage to the DBIN control line 34. Although data is written into and read from the I/O interface circuits 8 in sixteen-bit words, it should be apparent that each bit is associated with a discrete sensing or operating device on the machine tool 13. It is these discrete devices which are readily controlled using programmable controller techniques.

Referring particularly to FIGS. 1 and 2, the communication of data to and from pendent control station 2 is provided by a front panel USART 37. The USART 37 includes eight data terminals which connect through a set of eight bidirectional buffers 38 to the eight least significant digit leads DB8-DB15 in the main processor data bus 27. The cable 9 connects to a data receive terminal and a data transmit terminal on the USART 37 and when an eight-bit byte of data is received through the cable 9 from the pendent control station 2, a logic low interrupt is generated on a control line 39. As will be explained in more detail hereinafter, this interrupt is serviced by the microprocessor 25 which generates the address of the front panel USART 37 on the address bus 26 and generates a logic low voltage on the RD control line 31 to read the received byte of data onto the data bus 27. Conversely, when an eight-bit byte of data is to be transmitted to the program panel station 3, an interrupt is generated by the USART 37 on an interrupt control line 40 to indicate that the previous byte of data has been transmitted. The microprocessor 25 responds by executing an interrupt service routine stored in the read-only memory 30 which addresses the front panel USART 37 through the address bus 26 and generates a logic low voltage on the WE control line 32. An eight-bit byte of data is thus coupled through the buffers 33 onto the data bus 27 and written into the USART 37. The USART 37 then transmits the eight-bit byte of data serially through the cable 9 to the pendent control station 3. The USART 37 is driven by a two megahertz clock that is applied to it through a control line 41.

The USART 37 is a universal receiver/transmitter which interfaces the main processor with the serial data link formed by cable 9. Data is received serially in eight-bit bytes from the cable 9, is checked for transmission errors, and is read out onto data bus 27 as eight parallel bits. As will be described hereinafter, a similar universal receiver/transmitter is connected to the other end of the cable 9 at the pendent control station 2 and data is conveyed back and forth on the cable 9 by them. The cable 9 includes only four leads and it may extend up to fifty feet in length according to RS-232 protocal.

The interrupts generated by the front panel USART 37 and other elements in the system are received at an interrupt control circuit 45. Referring particularly to FIG. 2, the interrupt control circuit 45 is connected to receive the third-phase clock signal from the four-phase clock 28 through a line 46, and it has a set of four interrupt code outputs and an interrupt request output which connect through a bus 47 to the microprocessor 25. The interrupt control circuit 45 is a commercially available integrated circuit model TRM 9901, and for a complete description of its structure, operation and connection to the microprocessor 25, reference is made to *TMS 9901 Programmable Systems Interface Data Manual* published July, 1977 by Texas Instruments Incorporated. The interrupt control lines 39 and 40 from the front panel USART 37 connect to this interrupt control circuit 45 and the circuit 45 is responsive to a signal on either of these lines to generate a four-bit code along with an interrupt request to the microprocessor 25. The interrupt control circuit 45 also determines the priority of interrupts and a list of the USART 37 interrupts along with other main processor interrupts is provided in Table A in the order of their priority. Some of these interrupts, including those generated by the USART 37, can be disabled, or masked, so that they are not applied to the microprocessor 25.

TABLE A

| Interrupt | Description |
|---|---|
| 0 | Restart system. |
| LD | Power on reset. |
| 1 | Standby power has failed. |
| 2 | Single step through program. |
| 3 | Data received by USART 37. |
| 4 | Data transmitted by USART 37. |
| 5 | Time out error on slow memory ready line. |
| 6 | Parity error when reading data bus 27. |
| 7 | Watchdog timer timed out. |
| 8 | 1.6 millisecond clock. |
| 9 | 100 millisecond clock. |

Referring particularly to FIGS. 2 and 9, a real time clock circuit 50 is connected to the address bus 26 and it generates a 1.6 millisecond interrupt through a line 51 and a 100 millisecond interrupt through a line 52 to the interrupt control circuit 45. The real time clock circuit 50 includes a pair of 3-line-to-8-line decoder circuits 53 and 54 and a pair of 2-line-to-4-line decoder circuits 55 and 56. The input terminals as well as one enabling terminal on the decoder circuit 53 are connected to the leads AB10-AB14 in the address bus 26, and the input terminals on the decoder circuit 54 connect to leads AB0-AB2 in the address bus 26. A CRUCLK control line 57' connects an enable terminal on the decoder circuit 54 to the microprocessor 25. A MEMEN control line 57 from the microprocessor 25 connects through a gate 58 to one input of the decoder circuit 5 and the lead AB9 connects to its other input. The decoder circuit 56 is enabled by lead AB3 in the address bus 26 and one of its inputs is driven by a gate 58' which connects to address bus leads AB6-AB8. These decoder circuits are operated when the microprocessor 25 executes the proper instructions to reset the interrupt request hardware now to be described after the request is acted upon.

The real time clock circuit 50 includes an eight megahertz oscillator 58 which drives a multistage binary counter indicated as a frequency divider 59. One output 60 on the frequency divider 59 generates a logic high voltage pulse every 1.6 milliseconds to the clock terminal of a D-type flip-flop 61, and a second output 62 on the frequency divider 59 connects to the clock input on a second D-type flip-flop 63. The second output terminal 62 also connects through an inverter gate 64 to a 100 millisecond clock line 65. A $\bar{Q}$ output on the first D-type flip-flop 61 connects to the 1.6 millisecond interrupt line 51 and a $\bar{Q}$ output terminal on the second D-type flip-flop 63 connects to the 100 millisecond interrupt line 52.

Every 100 milliseconds the second D-type flip-flop 63 is set through its clock terminal and a logic low voltage is generated on the 100 millisecond interrupt line 52 to the interrupt control circuit 45. A reset terminal on the D-type flip-flop 63 is connected through a reset line 66 to the eighth output terminal on the 3-line-to-8-line decoder circuit 53. After the 100 millisecond interrupt is acted upon by the microprocessor 25, an instruction is executed by the microprocessor 25 which generates a logic low reset pulse on the line 66 to reset the second D-type flip-flop 63 and to thereby remove the interrupt request on the line 52.

Similarly, every 1.6 milliseconds the first D-type flip-flop 61 is set through its clock terminal and a logic low voltage is generated on the 1.6 millisecond interrupt request line 51 to the interrupt control circuit 45. After the interrupt is acknowledged, the microprocessor 25 executes an instruction which generates a logic low reset pulse on a line 67 that connects the seventh output of the 3-line-to-8-line decoder 53 to a reset terminal on the D-type flip-flop 61. The D-type flip-flop 61 is thus reset and the logic low interrupt request on the line 51 is removed.

The operation of the real time clocks are controlled to some extent by program instructions executed by the microprocessor 25. More specifically, when a selected instruction is executed by the microprocessor 25, a logic low voltage is generated on a CLOCK ON line 68 by the second output of the 3-line-to-8-line decoder circuit 54. The CLOCK ON line 68 connects to a reset terminal 69 on the frequency divider 59 as well as a clock terminal on a third D-type flip-flop 70. The Q output on the third D-type flip-flop 70 connects to the D input on the first D-type flip-flop 61. When a logic low voltage is generated on the CLOCK ON line 68, the flip-flop 70 is set to effectively enable 1.6 millisecond interrupts to be applied to the line 51. On the other hand, a CLOCK OFF line 71 connects the first output of the 3-line-to-8-line decoder circuit 54 to a reset terminal on the third D-type flip-flop 70 and when this is driven to a logic low voltage by the execution of another selected instruction, the third D-type flip-flop 70 is reset. The logic low voltage thus generated at its Q output effectively prevents the first D-type flip-flop 61 from being set and it thus prevents the generation of 1.6 millisecond interrupt signals on the line 51.

PROGRAMMABLE INTERFACE HARDWARE

Figure 3:
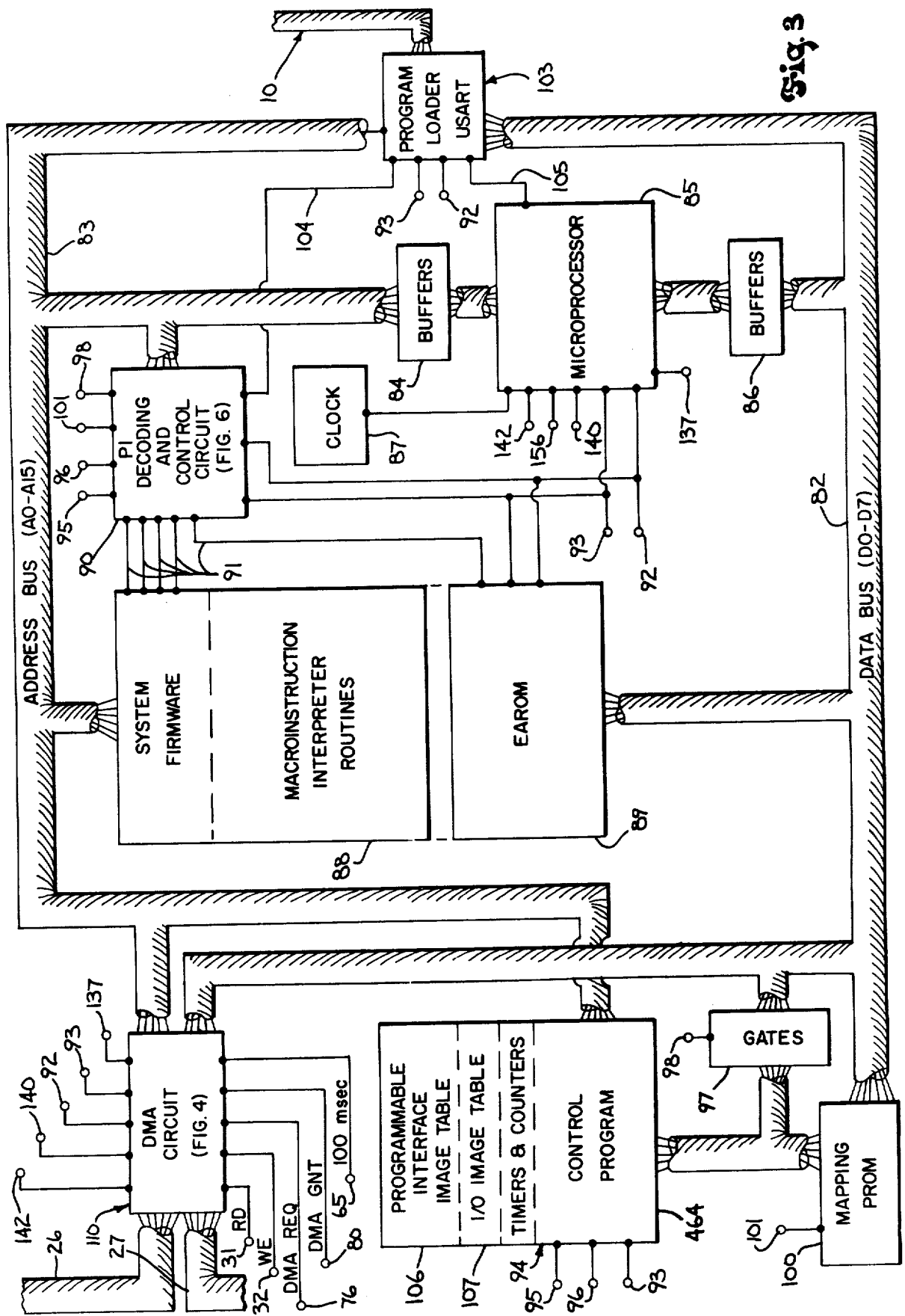
FIG. 3 is an electrical schematic diagram of the programmable interface processor portion of the system of FIG. 1.

Referring to FIGS. 2 and 3, a programmable interface circuit 75 is contained on the programmable interface circuit board 6 and is connected to the main processor data bus 27 and the main processor address bus 26. In addition, the programmable interface circuit 75 connects to the RD control line 31, the WE control line 32 and it receives the 100 millisecond clock from the real time clock circuit 50 through the line 65. The programmable interface circuit 75 is a separate processor and this processor periodically obtains control of the main processor data bus 27 and address bus 26 by generating a logic low signal on a DMA REQ control line 76. This control signal is coupled through an inverter gate 77 to a HOLD terminal 78 on the microprocessor 25. When the request is granted, a signal is generated by the microprocessor 25 through an inverter gate 79 and DMA GNT control line 80 back to the programmable interface circuit 75.

Referring particularly to FIG. 3, the programmable interface circuit 75 is structured around an eight-bit data bus 82 and a sixteen-bit address bus 83. The address bus 83 is driven through a set of sixteen buffers 84 by an eight-bit microprocessor 85. The data bus 82 is coupled to this microprocessor 85 through a set of eight bidirectional buffers 86. A model Z-80 microprocessor manufactured by Zilog, Inc. is employed and it is driven by a four megahertz clock circuit 87.

The programmable interface circuit 75 also includes an eight-bit by 4K line read-only memory 88 and an eight-bit by 2K line electrically alterable read-only memory 89. The memories 88 and 89 connect to the leads (D0–D7) in the data bus 82 and to the leads (A0–A15) in the address bus 83. Selected data can be read from the memories 88 or 89 when the microprocessor 85 executes memory read instructions, and when such an instruction is executed, a logic signal is generated on one of five enable lines 91 and on a "rd" control line 92. A programmable interface decoding and control circuit 90 operates the enable lines 91 and the memory read instruction enables the contents of a selected line in the memory 88 or 89 to be read onto the data bus 82.

Data can also be written into the electrically alterable read-only memory 89 by executing memory write instructions. Such instructions cause the decoding and control circuit 90 to enable the memory 89 through control line 91 and to generate a logic signal on a "wr" control line 93. The data on the data bus 82 is written into the memory 89 when such an instruction is executed.

The programmable interface circuit 75 also includes a nine-bit by 2K line random access memory 94 which connects to the leads (A0–A15) in the address bus 83, which connects to the wr control line 93 and which connects to a pair of enable lines 95 and 96 that are driven by the decoding and control circuit 90. Data is written into an addressed line of the random access memory 94 from the data bus 82 through a set of eight gates 97. The gates 97 each have an enable terminal which is commonly connected through a gate enable line 98 to the decoding and control circuit 90. When a memory write instruction is executed by the microprocessor 85, an eight-bit word is coupled through the gates 97 and stored in the addressed line of the random access memory 94.

Data is read from the random access memory 94 to the data bus 82 through an eight-bit by 512 line mapping prom 100. When data is read from the random access memory 94 the mapping prom 100 is enabled through a "map en" control 101 which is driven by the decoding and control circuit 90. The random access memory 94 stores control program instructions which include operation codes that are not recognized by the microprocessor 85. These operation codes are applied to address terminals on the mapping prom 100 and each unique code addresses a specific line in the mapping prom 100. A number, which indicates the starting address of a control instruction interpreter routine, is stored on the mapping prom line corresponding to each unique operation code. Thus, each time a control instruction operation code is read from the random access memory 94, it is mapped into the number indicating the starting address of its corresponding interpreter routine. These numbers are generated at the mapping prom data terminals which connect to the eight leads in the data bus 82. The programmable interface system jumps to the indicated interpreter routine and the microprocessor 85 executes the machine instructions therein to perform the functions indicated by the control instruction operation code. All other data stored in the random access memory 94 is coupled directly to the data bus 82 without alteration.

The control program is loaded into the random access memory 94 and edited through the program panel station 3. Referring again to FIG. 3, the cable 10 from the program panel station 3 is connected to the serial input and serial output terminals of a program loader USART 103 which has its parallel data terminals connected to the eight leads D0–D7 of the programmable interface data bus 82. A C/$\overline{\text{D}}$ terminal on the program loader USART 103 connects to lead A0 in the address bus 83 and its CS terminal connects through a USART EN line 104 to the decoding and control circuit 90. The program loader USART 103 is also connected to the wr and rd control lines 92 and 93 and when an eight-bit byte of data is received by the USART 103 through the cable 10, it generates an interrupt request to the microprocessor 85 through an INT line 105. When the microprocessor 85 acknowledges the interrupt, the system jumps to a program loader routine which is stored in the read-only memory 88. This routine includes instructions which enables the program loader USART 103 through the control line 104 and which generates a logic low signal on the rd control line 92. The received eight-bit byte of data is thus read onto the data bus 82.

Conversely, instructions executed by the microprocessor 85 may also enable the program loader USART 103 through the line 104 and generate a logic low signal on the wr control line 93 to load an eight-bit byte of data into the USART 103. This data is then transmitted serially through the cable 10 to the program panel station 3. In this manner, characters cn be input from the keyboard 18 and characters can be output to the display 19 on the program panel station 3.

Figure 4:
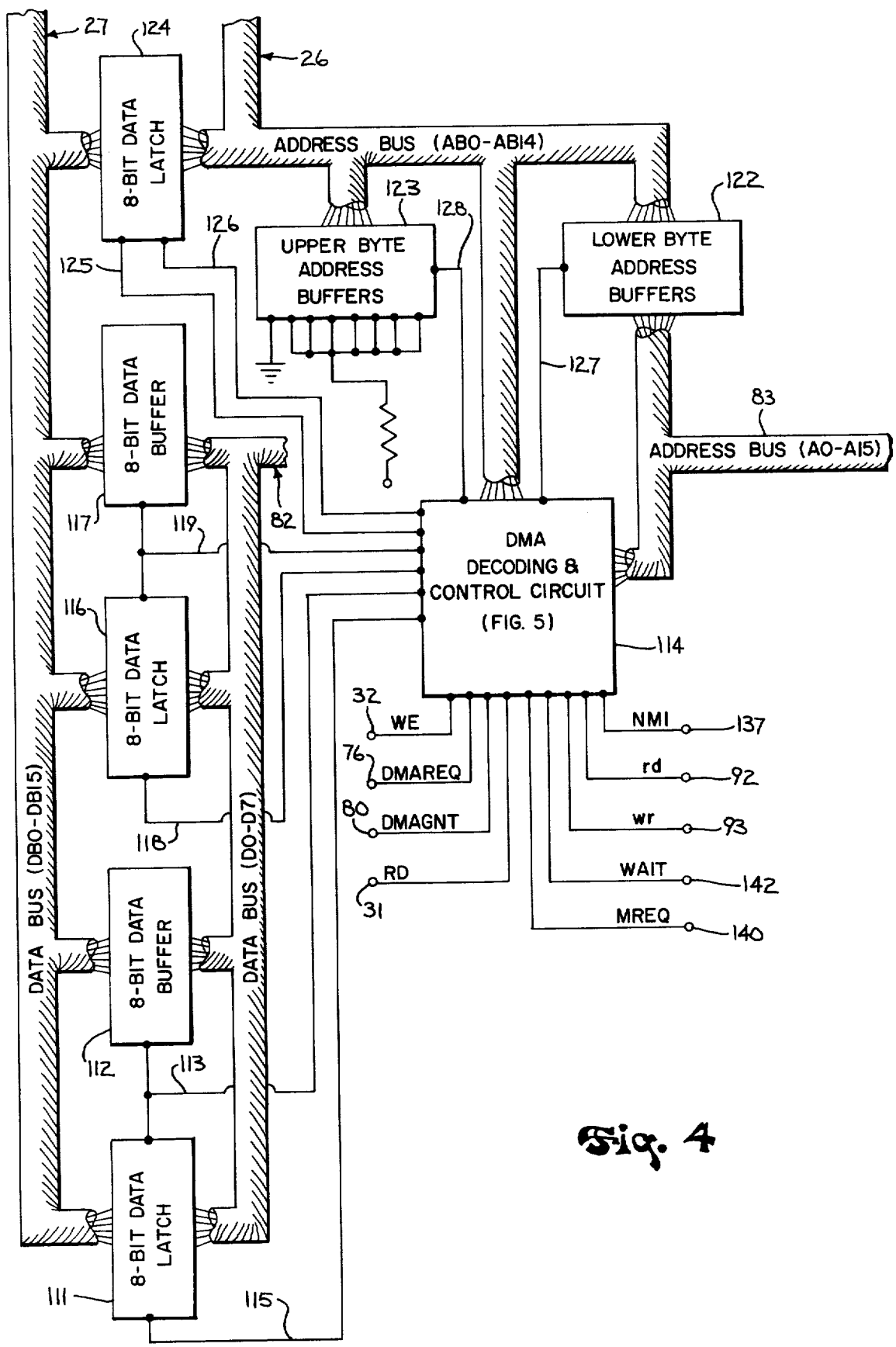
FIG. 4 is an electrical schematic diagram of the DMA circuit which forms part of the processor of FIG. 3.

The programmable interface circuit 75 is interfaced with the main processor by a DMA circuit 110. Referring particularly to FIGS. 3 and 4, data on the sixteen-bit main processor data bus 27 is coupled to the eight-bit programmable interface data bus 82 by an eight-bit data latch 111 and an eight-bit data buffer 112. The lower eight-bit byte of such a sixteen-bit data word is coupled directly through the buffer 112 when a DIN control line 113 is driven low by a DMA decoding and control circuit 114. The upper eight-bit byte is momentarily stored in the latch 111, and during the next machine cycle, a CLIN control line 115 is driven low by the DMA decoding and control circuit 114 to apply the eight-bit byte stored in the latch 111 to the programmable interface data bus 82. The sixteen-bit word from the main processor is thus converted to two eight-bit words in the programmable interface processor.

Data is conveyed in the opposite direction (from the programmable interface processor 75 to the main processor data bus 27) by an eight-bit data latch 116 and an eight-bit data buffer 117. A first eight-bit byte on the programmable interface data bus 82 is stored in the eight-bit data latch 116 when a logic low voltage is applied to a CLOUT control line 118. When a second eight-bit byte of data is then generated on the programmable interface data bus 82, a logic low voltage is generated on a DOUT control line 119. This enables the data latch 116 and the data buffer 117 and both eight-bit bytes of data are simultaneously applied as a sixteen-bit data word to the main processor data bus 27. The bidirectional flow of data from the sixteen-bit main processor to the eight-bit programmable interface processor is thus established.

Referring particularly to FIG. 2, the programmable interface circuit 75 directs the transfer of data to and from the main processor. It transfers data to and from two general locations, a programmable interface image table 105 stored in the random access memory 29, and the I/O interface circuits 8. The programmable interface circuit 75 addresses these locations using the main processor address bus 26 which is relinquished to it when a DMA request is granted.

Referring again to the DMA circuit of FIG. 4, the main processor address bus 26 is controlled by the programmable interface circuit 75 through a set of lower byte address buffers 122 and either a set of upper byte address buffers 123 or an eight-bit data latch 124. Seven inputs to the upper byte address buffers 123 are connected to a source of logic high voltage and its eighth input is connected to signal ground. The eight inputs to the lower byte address buffers 122 are connected to leads A0–A7 in the programmable interface address bus 83. The inputs to the eight-bit data latch 124 are connected to leads in the main processor data bus 27 and during power up, the main processor writes the eight most significant digits of the address of the programmable interface image table 105 into the eight-bit data latch 124. This is accomplished by generating the address EC1E (Hexadecimal) on the address bus 26 during a write instruction. This address is decoded by the DMA decoding and control circuit 114 which enables the eight-bit data latch 124 through an UPP ADD control line 126. Consequently, if the position of the programmable interface image table 105 should be changed for some reason, the programmable interface circuit 75 is automatically appraised of this fact via the eight-bit data latch 124 each time the system is powered up.

A FLREQAK control ine 125 also connects to the data latch 124 and it is driven low by the DMA decoding and control circuit 114 to generate the PI image table starting address on the main processor address bus 26. A specific line in the image table 105 is selected by the address on leads A0–A7 in the PI address bus 83 which is applied to the main processor address bus 26 by the lower byte address buffers 122. The address buffers 122 are enabled by a LADREN control line 127.

By sequentially enabling the elements of the DMA circuit 110, the microprocessor 85 may thus read data from the main processor memory 29 and write data into it. In this manner, the contents of the programmable interface image table 105 in the main processor memory 29 and a similar programmable interface image table 106 in the memory 94 are periodically exchanged, or transferred, to reflect changes which have occurred in each since the previous DMA.

Referring again to FIG. 4, the other function of the DMA circuit 110 is to exchange data between the I/O interface circuits 8 and an I/O image table 107 stored in the programmable interface memory 94. This data transfer is controlled by the DMA circuit 110 under the direction of the microprocessor 85 and when such a transfer is to occur, a signal is generated on an IOAK control line 128 which enables the upper byte address buffers 123 in the DMA circuit 110. As a result, the I/O interface circuits 8 are addressed through the bus 26. The particular set of sixteen input or output circuits selected is determined by the eight least significant bits applied to the main processor address bus 26 through the lower byte address buffers 122. The microprocessor 85, under the direction of an I/O scan routine, sequentially addresses each set of input and output circuits through the buffers 122. It operates the DMA circuit 110 to transfer data from the I/O interface circuits 8 to the I/O image table 107 stored in the RAM 94 and it operates to transfer data from the I/O image table 107 to the I/O interface circuits 8. In this manner, the I/O image table 107 is periodically coupled to the discrete sensing devices and operating devices on the controlled machine to both update the I/O image table 107 and to control the operating devices.

Referring particularly to FIG. 4, the control lines which operate the various buffers and data latches in the DMA circuit 110 are driven by the DMA decoding and control circuit 114. This circuit connects to a set of lines leading to the main processor and a set of lines leading to the programmable interface processor, and it is through these lines that it is operated. The decoding and control circuit 114 is shown in detail in FIG. 5 and it includes a 3-line-to-8-line decoder circuit 130 which is driven by control lines 92, 125 and 128 and address bus lead A0. In conjunction with an AND gate 131 and an OR gate 132 this decoder circuit 130 drives the control lines 113, 115, 118 and 119. In addition, the DMA decoding and control circuit 114 includes a set of NAND gates 133, 134 and 135 and an inverter gate 136 which are connected to drive the UPP ADD control 126 and a NMI control line 137. The NMI control line 137 connects to a corresponding terminal on the programmable interface microprocessor 85. The gates 133–135 are driven by the main processor RD and WE control lines 31 and 32 and by selected leads in the main processor address bus 26. When a logic low voltage is generated on the NMI control line 127, a non-maskable interrupt is indicated to the programmable interface microprocessor 85. It is in this manner that the main processor initiates a sequence of functions which are performed by the programmable interface circuit 75. As will be described hereinafter this occurs every 25.6 milliseconds and it serves to synchronize the operation of the two processors.

After the NMI interrupt has been initiated by the main processor, it continues to carry out its many other functions and the programmable interface processor commences to carry out a number of functions which include the transfer of the contents of the PI image table 105 from the main processor to its own PI image table 106. It performs this transfer by making a series of direct memory access requests from the main microprocessor 25. Referring again to FIG. 5, such a DMA request signal is generated on the DMA REQ control line 76 by a set of gates indicated collectively at 139. These gates are driven by the leads A0, A13 and A15 in the programmable interface address bus 83 and by a "mreq" control line 140 which emanates from the microprocessor 85. In addition to being applied to the main microprocessor 25, this DMA request signal is also coupled through a NAND gate 141 back to the microprocessor 85 through a wait control line 142. The microprocessor 85 is thus held, or frozen, until the main microprocessor 25 responds to the DMA request.

This response is received through the DMA GNT control line 80 and is coupled through an OR gate 143 to a pair of AND gates 144 and 145 and an exclusive NOR gate 146. The AND gates 144 and 145 are also driven by a second pair of AND gates 147 and 148, which are in turn driven by the set of DMA request gates 149 and the lead A14 in the programmable interface address bus 83. The state of the lead A14 in the programmable interface address bus 83 determines whether the DMA request is for the purpose of exchanging data in the programmable interface image tables or for exchanging data between the I/O image table 107 in the random access memory 94 and the I/O interface circuits 8. If the purpose of the DMA request is to exchange data between the programmable interface image tables, the AND gate 145 is enabled and the FLREQAK control line 125 is driven high. On the other hand, the AND gate 144 is enabled and the IOAK control line 128 is driven high when data is to be exchanged with the I/O interface circuits 8. In either case, the LADREN control line 127 is driven high by an OR gate 149 and the wait line 142 is released through a time delay circuit which includes gates 150 and 151. The programmable interface microprocessor 85 then controls not only its own buses and control lines, but also the main processor address bus 26, main processor data bus 27, the RD control line 31 and the WE control line 32.

Figure 6:
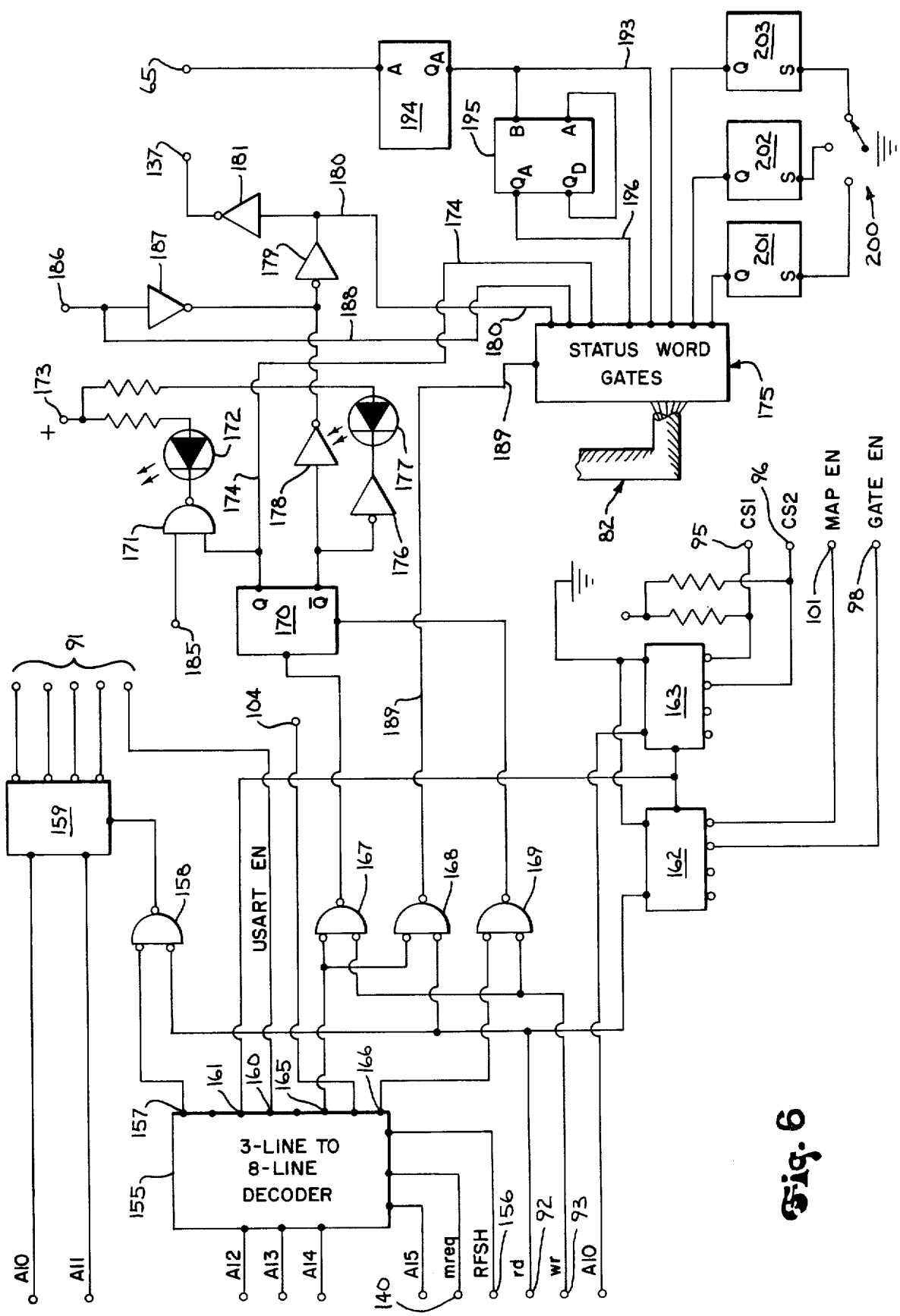
FIG. 6 is an electrical schematic diagram of the decoding and control circuit which forms part of the processor of FIG. 3.

Referring to FIGS. 3 and 6, the programmable interface decoding and control circuit 90 generates enabling signals to the various elements of the programmable interface circuit 75, including the DMA circuit 110. The decoding and control circuit 90 includes a 3-line-to-8-line decoder circuit 155 which connects to leads A12, A13, A14 and A15 in the address bus 83. It also connects to the control line mreq 140 and a control line RFSH 56 which are both driven by the microprocessor 85. The first output terminal 157 on the 3-line-to-8-line decoder 155 along with the rd control line 92 connect to the inputs of a NAND gate 158 which drives the enabling terminal on a 2-line-to-4-line decoder circuit 159. The decoder circuit 159 is driven by the leads A10 and A11 in the address bus 83 and its four outputs along with the fourth output 160 on the decoder circuit 155 form the control lines 191 which enable the read-only memory 88 and the electrically alterable read-only memory 89. A third output terminal 161 on the 3-line-to-8-line decoder circuit 155 connects to the enabling input on both a second 2-line-to-4-line decoder circuit 162 and a third 2-line-to-4-line decoder circuit 163. One input on each decoder circuit 162 and 163 is connected to signal ground, a second input on the decoder circuit 162 is connected to the rd control line 92, and a second input on the decoder circuit 163 is connected to the lead A10 in the address bus 83. The first output of the decoder circuit 162 drives the map enable control line 98. Similarly, the first and second outputs on the third decoder circuit 163 drive the CS1 control line 95 and the CS2 control line 96.

The sixth and eighth output terminals 165 and 166 on the 3-line-to-8-line decoder circuit 155 operate a watch-dog timer circuit. More particularly, the output terminal 165 connects to inputs on a pair of NAND gates 167 and 168 and the output terminal 166 connects to one input of a NAND gate 169. The second inputs on the NAND gates 167 and 169 are connected to the wr control line 93 and a second input on the NAND gate 168 is connected to the rd control line 92. The output of NAND gate 167 connects to the input of a seventy millisecond monostable multivibrator 170 and the output of the NAND gate 169 connects to the reset terminal on this multivibrator 170. A Q output on the multivibrator 170 connects through a NAND gate 171 and a first light emitting diode 172 to a positive d.c. supply terminal 173 and it connects through a line 174 to one input on a set of status word gates 175. The Q output on the monostable multivibrator 170 connects through a gate 176 and second light emitting diode 177 to the positive d.c. supply terminal 173, and it connects through a pair of gates 178 and 179 to another input on the status word gates 175 through a line 180. The line 180 also connects through an inverter gate 181 to the NMI control line 137.

Under normal operating conditions a machine instruction is periodically (i.e., less than 70 msec.) executed by the programmable interface microprocessor 85 which causes a logic low voltage to be generated at the output of the NAND gate 167. This logic low voltage retriggers the monostable multivibrator 170 so that its $\overline{Q}$ output remains at a logic low voltage and its Q output remains at a logic high voltage. If it is not retriggered within seventy milliseconds, however, the Q output of the monostable multivibrator goes low and its $\overline{Q}$ output goes high. As a result, the second light emitting diode 177 is illuminated to visually indicate that the watchdog timer has timed out and a logic high voltage is generated on the line 180 to initiate a non-maskable interrupt through the NMI control line 137. The line 180 also drives the first input on the status word gates 175 so that a logic high voltage is indicated in the status word when the watchdog timer times out.

Referring still to FIGS. 3 and 6, a parity generator (not shown in the drawings) associated with the random access memory 94 in the programmable interface circuit 75 connects through one lead 185 to the NAND gate 171 and through a second lead 186 to an inverter gate 187. When a parity error is sensed, the output of the NAND gate 171 goes low to energize the first light emitting diode 172, and a non-maskable interrupt is initiated through the NMI control line 137 by the gates 187, 179 and 181. In addition, the line 186 connects through a line 188 to an input on the status word gates 175 with the result that the parity error is also indicated in the status word.

When either a parity error occurs or when the watchdog timer times out, one of the light emitting diodes 172 or 177 is energized and a non-maskable interrupt is requested from the microprocessor 85. In response, the programmable interface system jumps to a program which among other functions enables the status word gates 175 through an enable line 189. The enable line 189 is driven by the NAND gate 168. The logic state of the eight input terminals on the status word gates 175, including the logic state of the lines 174 and 188, are thus read onto the programmable interface data bus 82. The cause of the interrupt is then determined by subsequent machine instructions which examine the bits of this status word.

Referring particularly to FIG. 6, the status word read from the status word gates 175 also contains other information. Particularly, one of its inputs is connected through a line 193 to the $Q_a$ output of a first four-bit binary counter 194. The A input on the counter 194 is driven byy the 100 millisecond real time clock signal on the line 65 and its $Q_a$ terminal is connected to the B input on a second four-bit decade counter 195. The $Q_a$ output on this counter 195 is connected through a line 196 to another input on the status word gates 175.

The signal on the line 193 is a 200 millisecond real time clock signal and the signal on the line 196 is a two-second real time clock signal. These real time clock signals are required by the programmable interface system to execute timer instructions that are employed in the control program.

The status word gates 175 also provide an indication of the mode in which the programmable interface circuit is to operate. More particularly, a single pole three position mode switch 200 is mounted along the back edge of the programmable interface circuit board 6 and its three poles are connected to the set terminals of three respective flip-flops 201, 202 and 203. The Q output terminals on the respective flip-flops 201–203 are connected to separate inputs on the status word gates 175 and the position of the mode switch (i.e., load, test, or run) is thus determined by the logic state of these outputs which form part of the status word.

The various elements of the programmable interface circuit 75 are enabled and operated in response to specific machine instructions executed by the microprocessor 85. The operation codes in such instructions operate the wr control line 93, the rd control line 92 and the mreq control line 140, and the operand, or address, codes in such instructions select a system element. The memories 88, 89 and 94 are, of course, enabled by a range of addresses, but each line in these memories has its own distinct address. For a list of the operation codes which will provide the required control line states, reference is made to the Z80-CPU Technical Manual published in 1976 by Zilog.

PENDENT CONTROL STATION HARDWARE

Figure 7:
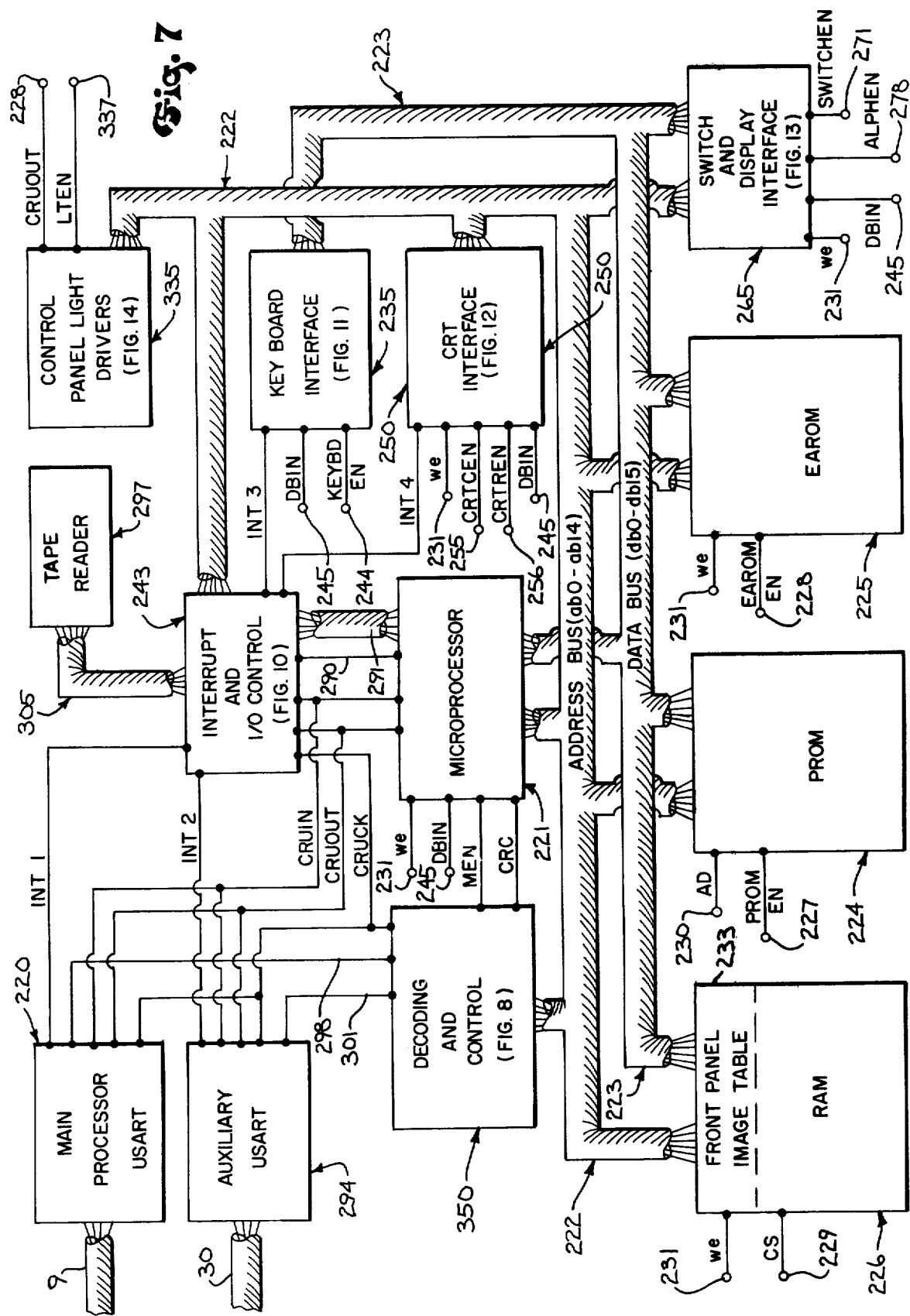
FIG. 7 is an electrical schematic diagram of the front panel processor portion of the system of FIG. 1.

Referring particularly to FIGS. 1, 2 and 7, the pendent control station 2 is connected to the main processor circuit board 5 by the cable 9. The cable 9 connects to a USART 220 at the pendent control station 2. The USART 220 is mounted on a circuit board (not shown in the drawings) with other elements of a front panel processor. These elements include a sixteen-bit microprocessor 221 which is a model TMS 9900 manufactured by Texas Instruments, Inc. The microprocessor 221 is connected to drive a fifteen-lead address bus 222 and it is connected to a sixteen-lead bidirectional data bus 223. Machine instructions for the microprocessor 221 are stored in a sixteen-bit by 16K line programmable read-only memory 224. Also connected to the address bus 222 and the data bus 223 is a sixteen-bit by 4K line random access memory 226 and a four-bit by 2K line electrically alterable read-only memory 225 which stores display messages. Data may be read from any of the three memories 224–226 when they are enabled through respective PROM EN, EAROM EN and CS control lines 227–229 and when the proper logic state is generated on respective AD and WE control lines 230 and 231. Data can also be written into the random access memory 226 when it is enabled through the cs control line 229 and when the we control line 231 is at a logic high voltage state. Data can also be written into the electrically alterable read-only memory 225 when it is enabled through the EAROM EN control line 228 and a logic low voltage appears on the we control line 231. The particular line into which data is written or from which data is read in any of the memories 224–226 is selected by the address on the address bus 222.

Figure 11:
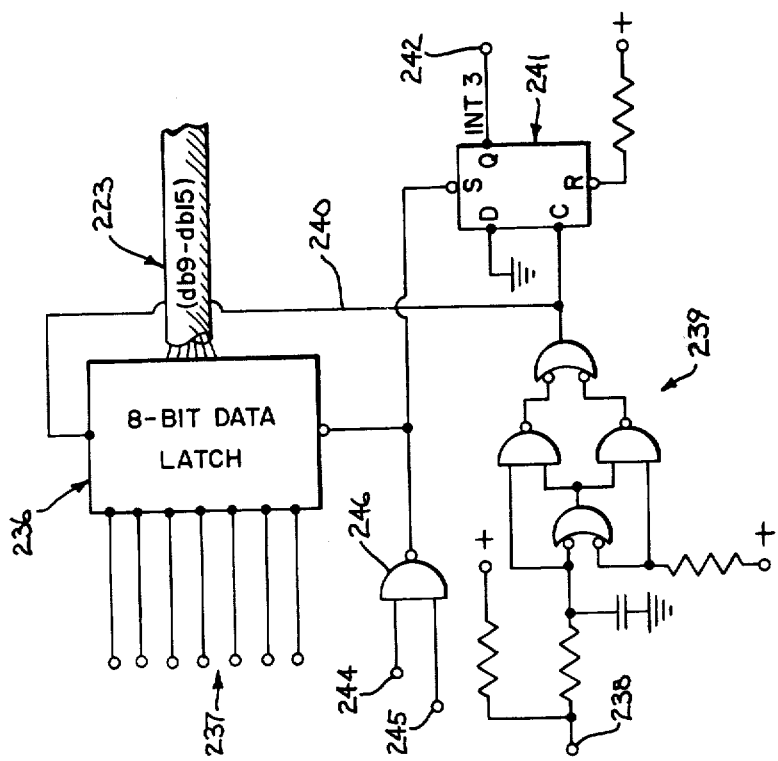
FIG. 11 is an electrical schematic diagram of the keyboard interface circuit which forms part of the front panel processor of FIG. 7.

Referring particularly to FIGS. 1, 7 and 11, the keyboard 14 on the pendent control station 2 is coupled to the front panel processor data bus 223 by a keyboard interface circuit 235. The keyboard interface circuit 235 includes an eight-bit data latch 236 which has seven of its input terminals connected through leads 237 to the keyboard 14. When an ASCII character is generated on the leads 237 by the keyboard 14, a logic low strobe signal is simultaneously generated on a control line 238.

The strobe signal is coupled through a set of gates 239 to a line 240 which connects to a clock terminal on the eight-bit data latch 236. The ASCII character is thus clocked into and stored in the eight-bit data latch 236. The same strobe signal is also applied to the clock terminal of an interrupt request flip-flop 241 which has its Q terminal connected through an INT 3 control line 242 to an interrupt and serial I/O control circuit 243. The flip-flop 241 is set by the keyboard strobe signal and an interrupt is requested. In response to this interrupt request the microprocessor 221 executes a keyboard service routine which includes an instruction that generates a logic high voltage on a KEYBD EN control line 244 and a DBIN control line 245. A NAND gate 246 in the keyboard interface circuit 235 is enabled by these control signals and its output is driven low to not only set the interrupt request flip-flop 241, but to gate the ASCII character stored in the eight-bit data latch 236 onto the leads db9–db15 of the data bus 223.

Figure 12:
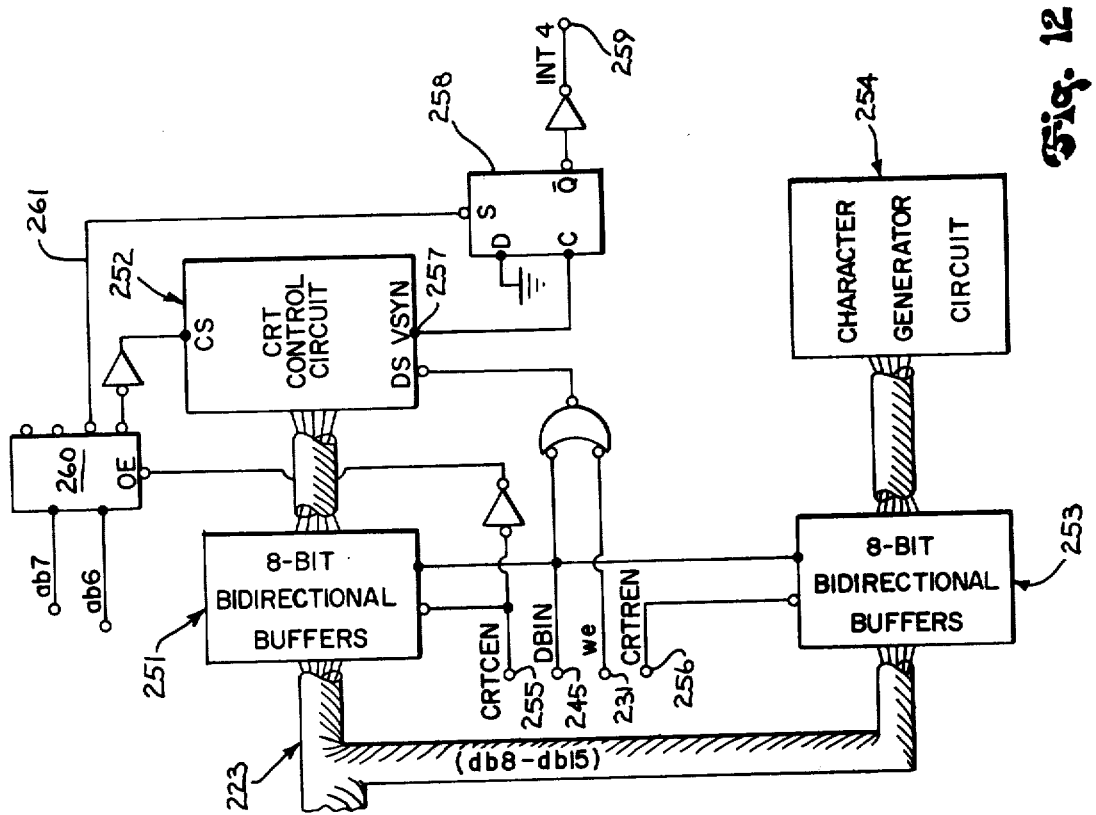
FIG. 12 is an electrical schematic diagram of the CRT interface circuit which forms part of the front panel processor of FIG. 7.

Referring particularly to FIGS. 1, 7 and 12, the CRT display 17 on the pendent control station 2 is coupled to the data bus 223 of the front panel processor by a CRT interface circuit 250. The interface circuit 250 includes a first set of eight bidirectional buffers 251 which connect leads db8–db15 in the data bus 223 to a CRT control circuit 252. A second set of eight bidirectional buffers 253 connect the same data bus leads to a character generator circuit 254. Control data is coupled through the buffers 251 to the CRT control circuit 252 when a logic low voltage is generated on a CRTCEN control line 255, and data is coupled through the buffers 253 to the character generator circuit 254 when a logic low voltage is generated on a CRTREN control line 256.

The CRT control circuit 252 generates an interrupt request at a VSYN terminal 257 when data is required by the CRT display 17. This request is applied to the clock terminal of a D-type flip-flop 258 and the Q̄ output terminal on this flip-flop is coupled to the interrupt and serial I/O control circuit 243 through an INT 4 control line 259. When the interrupt is acknowledged, a CRT service routine is executed by the microprocessor 221 that includes an instruction which enables a 2-line-to-4-line decoder circuit 260 through the CRTCEN control line 255. This same instruction generates a code on address bus leads ab6 and ab7 that connect to the input terminals of the decoder circuit 260 and a logic low voltage is generated by the decoder circuit 260 on a line 261. This voltage sets the D-type flip-flop 258 to remove the interrupt request on the INT 4 control line 259. There are numerous CRT control circuits and character generator circuits known to those skilled in the art and reference is made to "Application Note 1—1 5027 Video Timer-Controller" published in 1978 by Standard Microsystems Corporation for a more detailed description of the circuit employed in the preferred embodiment.

Referring particularly to FIGS. 1, 7 and 13, the switches 15 and the alpha-numeric display 16 on the pendent control station 2 are coupled to the address bus 222 and the data bus 223 by a switch and display interface circuit 265. Each switch 15 on the pendent station 2 is connected between a scanning gate 262 and a logic high voltage source in series with a diode 266 and a resistor 267. Each set of four switches 15 is also coupled through a buffer 268 to one of sixteen tri-state gates 269. The outputs of the tri-state gates 269 are connected to the leads db0–db15 in the data bus 223 and their enabling terminals are commonly connected to the output of a NAND gate 270. The NAND gate 270 is driven by the DBIN control line 245 and by a "switch en" control line 271. There are four scanning gates 262, each connected to the output of a 2-line-to-4-line decoder 263 and each connected to a set of four of the switches 15. The two inputs on the decoder 263 are connected to leads ab13 and ab14 in the address bus 222 and when selected instructions are executed by the microprocessor 221, the NAND gate 240 is enabled and the states of one of four sets of sixteen switches 15 are gated onto the data bus 223. The four 16-bit data words input from the switch interface circuit are stored in a four-line front panel image table portion 233 of the RAM 226.

Referring still to FIG. 13, data is coupled to the alpha-numeric display 16 through a pair of sixteen-bit data latches 274 and 275 and a four-bit data latch 276. The clock terminals on the data latches 274–276 are connected to respective output terminals on a 3-line-to-8-line decoder circuit 277. The three inputs to the decoder circuit 277 connect to the leads ab12–ab14 in the address bus 222 and an enabling terminal on the decoder 277 is driven by an "ALPHEN" control line 278. The we control line 231 connects to an enable terminal on the 3-line-to-8-line decoder circuit 277. Two output terminals on the decoder 277 connect respectively to a load control line 279 and a clear control line 280. The load control line 279 connects to the display 16 and the line 280 connects to the display 16 and the reset terminal on a four-bit binary counter 281. The input of the counter is driven by the decoder 277 and its four outputs are connected to a 4-line-to-16-line decoder 282. Fourteen of the sixteen outputs on the decoder 282 connect to the display 16. In response to selected instructions executed by the microprocessor 221, the three data latches 274–276 are sequentially loaded with thirty-six bits of data. This data is output to one of fourteen rows in the display 16, the row being determined by the output of the decoder 282. After each thirty-six-bit row of data is displayed, the latches 274–276 are reloaded and the counter 281 is incremented to enable the next row on the display 16. The display 16 is thus continuously scanned and the five-by-seven dot matrix display elements therein are energized by the data from the latches 274–276.

Figure 10:
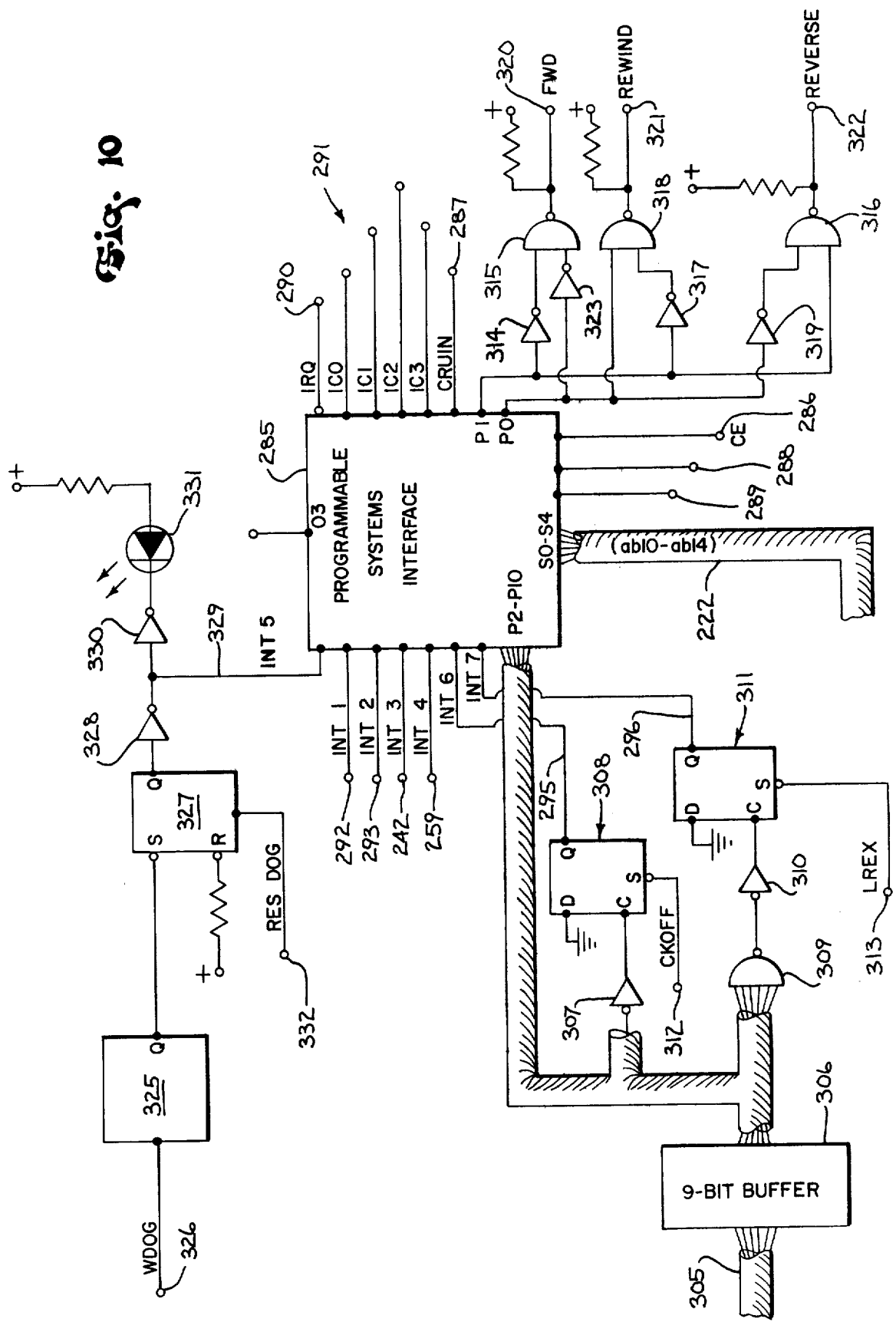
FIG. 10 is an electrical schematic diagram of the interrupt and I/O control circuit which forms part of the front panel processor of FIG. 7.

Referring particularly to FIGS. 7 and 10, the remaining input/output devices associated with the pendent control station 2 are coupled to the microprocessor 221 by the interrupt and I/O control circuit 243. The control circuit 243 includes a programmable systems interface circuit 285 which is an integrated circuit model TMS 9901 manufactured by Texas Instruments, Inc. The programmable systems interface circuit 285 communicates with the microprocessor 221 through a communication register unit (inside the microprocessor 221). The connection to this "CRU" register is accomplished by five address select lines (S0–S4) which connect to leads ab10–ab14 in the address bus 222, a CE enable line 286 and three communication register unit control lines CRUIN 287, CRUOUT 288 and CRUCK 289. A selected bit, determined by the state of inputs S0–S4, may be strobed out of the sixteen-bit communication register unit in the microprocessor 221. This data bit appears on the CRUOUT control line 288 when the CRUCK control line 289 is strobed. Similarly, a data bit may be written into this same register through the CRUIN control line 287 when the CRUCK control line 287 is strobed.

The programmable systems interface 285 is also connected to the microprocessor 221 through an interrupt request line (IRQ) 290 and four interrupt code lines (IC0-IC3) indicated at 291. Seven interrupt inputs, INT1-INT7 are connected to receive interrupt requests from various system elements such as the CRT interface circuit 250 (through the INT4 control line 259) and the keyboard interface circuit 235 (through the INT3 control line 242). In addition, a control line INT1 292 connects to the main processor USART 220, and an INT2 control line 293 connects to an auxiliary USART 294. Two additional control lines (INT6 and INT7) 295 and 296 are associated with a tape reader 297.

When one of the control lines INT1-INT7 is driven low, the programmable systems interface 285 passes the signal to an internal priority encoder where the highest priority interrupt signal is encoded into a four-bit binary code. This code is generated on the IC0-IC3 control lines 291 to the microprocessor 221 along with an interrupt request on the IRQ control line 290. This four-bit code is employed by the microprocessor 221 to identify which of the peripheral devices or I/O devices is requesting the interrupt.

Referring particularly to FIGS. 7 and 10, whereas the keyboard interface circuit 235 and the CRT interface circuit 250 couple data in parallel to the data bus 223, the main processor USART 220 and the auxiliary USART 294 exchange data serially with the microprocessor 221 via the CRUIN data line 287 and the CRUOUT data line 288. For example, when a byte of data is received by the main processor USART 220 through the cable 9, it request an interrupt through the INT1 control line 292. When the interrupt request is passed on to the microprocessor 221 by the control circuit 243, the microprocessor 221 jumps to a USART interrupt service routine. Instructions in this routine enable the main processor USART 220 through a control line 298 and sequentially read in the byte of data, one bit at a time, through the CRUIN data line 287. Conversely, when data is to be coupled to the main processor through the cable 9, it is generated to the main processor USART 220 through the CRUOUT data line 288, one bit at a time.

The auxiliary USART 294 may be connected through a cable 300 to a TTY, to the host computer in a DNC system, or to a number of other devices. It operates in the same manner as the USART 220 when enabled through a control line 301.

Referring particularly to FIGS. 7 and 10, the tape reader 297 is connected to the interrupt and I/O control circuit 243 through a data and control cable 305. Nine leads in this cable 305, eight of which are data leads and one of which is a strobe line, connect to the inputs of a nine-bit buffer 306. The nine outputs on the buffer 307 connect to respective inputs P2-P10 on the programmable systems interface 285. The strobe line from the tape reader connects through a gate 307 to the clock input on a D-type flip-flop 308, and when an eight-bit byte of data is received at the buffers 306, the flip-flop 308 is reset by the strobe signal to generate a logic low interrupt signal on the INT6 control line 295. A tape reader service routine is executed by the microprocessor 221 when this interrupt request is passed on by the programmable systems interface 285 and the eight-bit byte of tape reader data is input to the microprocessor 221 serially through the CRUIN data line 287. Also, a NAND gate 309 has its inputs connected to the nine outputs of the buffer 306 and its output is coupled through a gate 310 to the clock terminal of a D-type flip-flop 311. When the nine leads are all at a logic high voltage indicating an intercharacter gap, the flip-flop 311 is reset to generate a logic low interrupt request through the INT7 control line 296. This is used in conjunction with the data strobe to determine whether the tape reader is operating properly. When the interrupts generated by the tape reader are acknowledged by the microprocessor 221, the routines which service them include instructions that reset the respective flip-flops 308 and 311 through a CKOFF control line 312 and a LREX control line 313.

The tape reader 297 is controlled by a two-bit binary code which is generated at a pair of outputs P0 and P1 on the programmable systems interface 285. The P1 output is connected to one input on a NAND gate 316 and through inverter gates 314 and 317 to inputs on NAND gates 315 and 318. The P0 output connects to a second input on NAND gate 318 and it connects through inverter gates 323 and 319 to second inputs on NAND gates 315 and 316. The output of the NAND gate 315 connects to the tape reader 297 through an FWD control line 320 and when it is driven to a logic low voltage, the tape reader is run in the forward direction. The output of the NAND gate 316 drives a REV control line 322 which connects to the tape reader 297 and operates it in the reverse direction when driven to a logic low voltage. The output of the NAND gate 318 connects to a REWIND control line 321 which rewinds the tape on the tape reader 297 when driven to a logic low voltage. The tape reader control lines 320–322 are operated by the microprocessor 221 in response to the execution of machine instructions which control the outputs P1 and P0 on the programmable systems interface 285 through the CRUOUT data line 288.

Referring still to FIG. 10, the interrupt and I/O control circuit 243 also includes a watchdog timer circuit. This circuit contains a monostable multivibrator 325 which has its input connected to a WDOG control line 326 and its Q output connected to the set terminal on an RS flip-flop 327. The reset terminal on the flip-flop 327 connects to a logic high voltage source and its Q output connects through an inverter gate 328 to an INT5 control line 329 that connects with the programmable systems interface 285. The output of the inverter gate 328 also connects through a second inverter gate 330 to a light emitting diode 331. The monostable multivibrator 325 is clocked through the WDOG control line 326 and whethe front panel processor is operating normally, it will be clocked again before a logic high pulse is generated at its Q output (i.e., within 100 milliseconds) and it will reset. If a malfunction should occur, however, and the monostable multivibrator 325 is not clocked within 100 milliseconds, the flip-flop 327 is set and an interrupt is generated through the INT5 control line 329. Simultaneously, the light emitting diode 331 is de-energized to provide a visual indication of the malfunction. When the malfunction has been corrected, the flip-flop 327 in the watchdog timer circuit is reset through an RES DOG control line 332.

Figure 14:
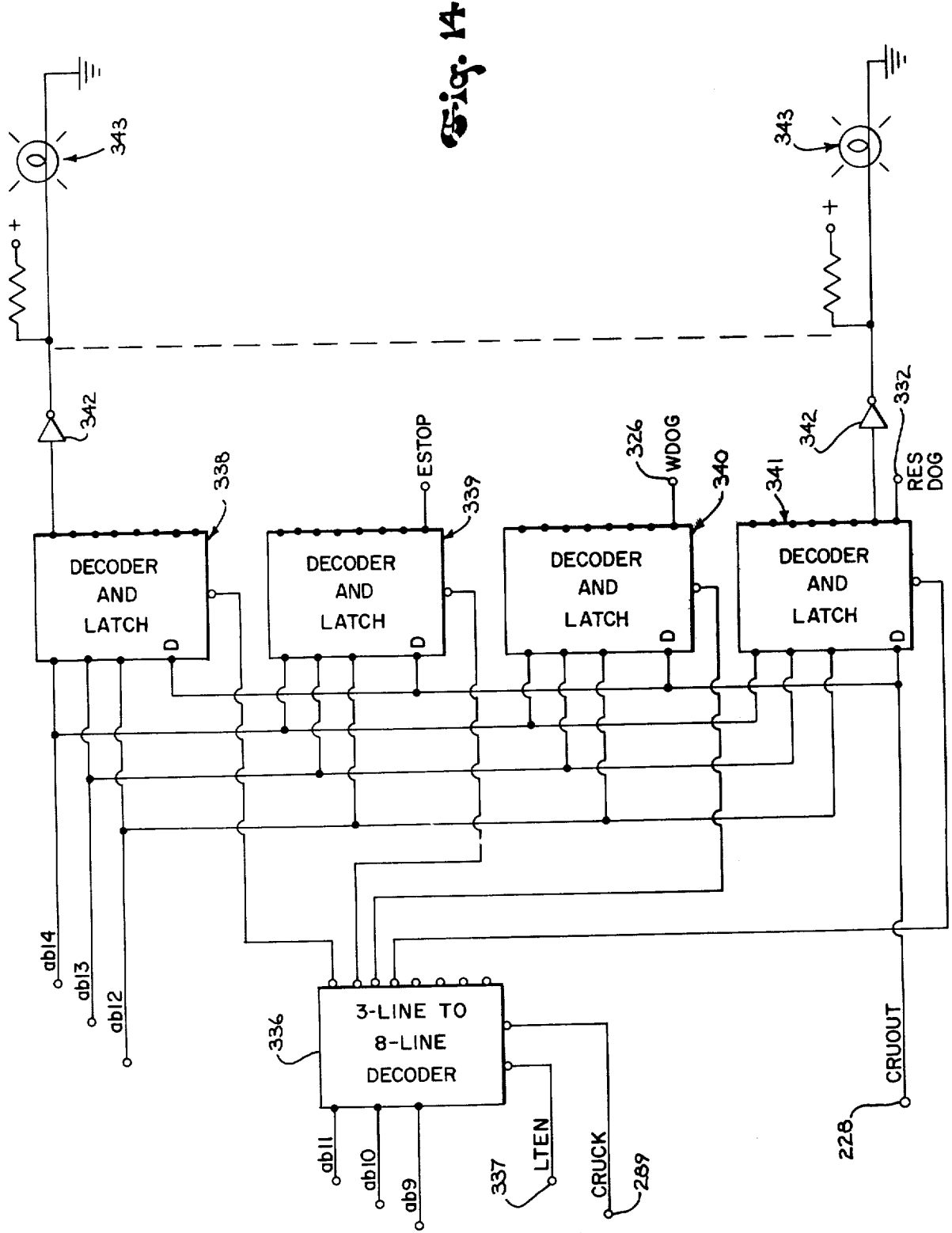
FIG. 14 is an electrical schematic diagram of the control panel light driver circuit which forms part of the front panel processor of FIG. 7.

Referring particularly to FIGS. 7 and 14, data is output from the microprocessor 221 to a control panel light driver circuit 335 via the CRUOUT data line 228. More specifically, a first 3-line-to-8-line decoder circuit 336 has a set of inputs connected to the leads ab9–ab11 in the address bus 222, and its enable terminal is connected to a LTEN control line 337. An enable terminal on the 3-line-to-8-line decoder 336 connects to the CRUCK control line 289. Four of the eight output terminals on the 3-line-to-8-line decoder circuit 336 are connected to respective clock terminals on four 3-line-to-8-line decoder/latch circuits 338-341. The three inputs on each of the circuits 338-341 connect to the respective leads ab12-ab14 in the address bus 222 and their D input terminals connect to the CRUOUT data line 228. The output terminals on each of the decoder and latch circuits 338-341 are connected through inverter gates 342 to energize selected lights 343 on the pendent control station 2. One of these outputs on the decoder and latch circuit 340 connects to the WDOG control line 326 and an output on the decoder and latch circuit 341 connects to the RES DOG control line 332.

When the 3-line-to-8-line decoder circuit 336 is enabled by the LTEN control line 337 and a timing pulse is received on the CRUCK control line 289, one of the four decoder and latch circuits 338-341 is enabled by the three-bit code on the leads ab9-ab11 of the address bus 222. Simultaneously, one of the eight output terminals on the enabled decoder and latch circuit 338-341 is selected by the three-bit code on the leads ab12-ab14 of the address bus 222. One bit of data is thus clocked into the enabled decoder and latch circuit through the CRUOUT data line 228. In this manner, a selected one of the lights 343 on the pendent control station 2 can be energized or deenergized in response to instructions executed by the microprocessor 221. Also, one such instruction is periodically executed by the microprocessor 221 to restart the watchdog timer circuit and another such instruction is executed to reset the watchdog timer.

Figure 8:
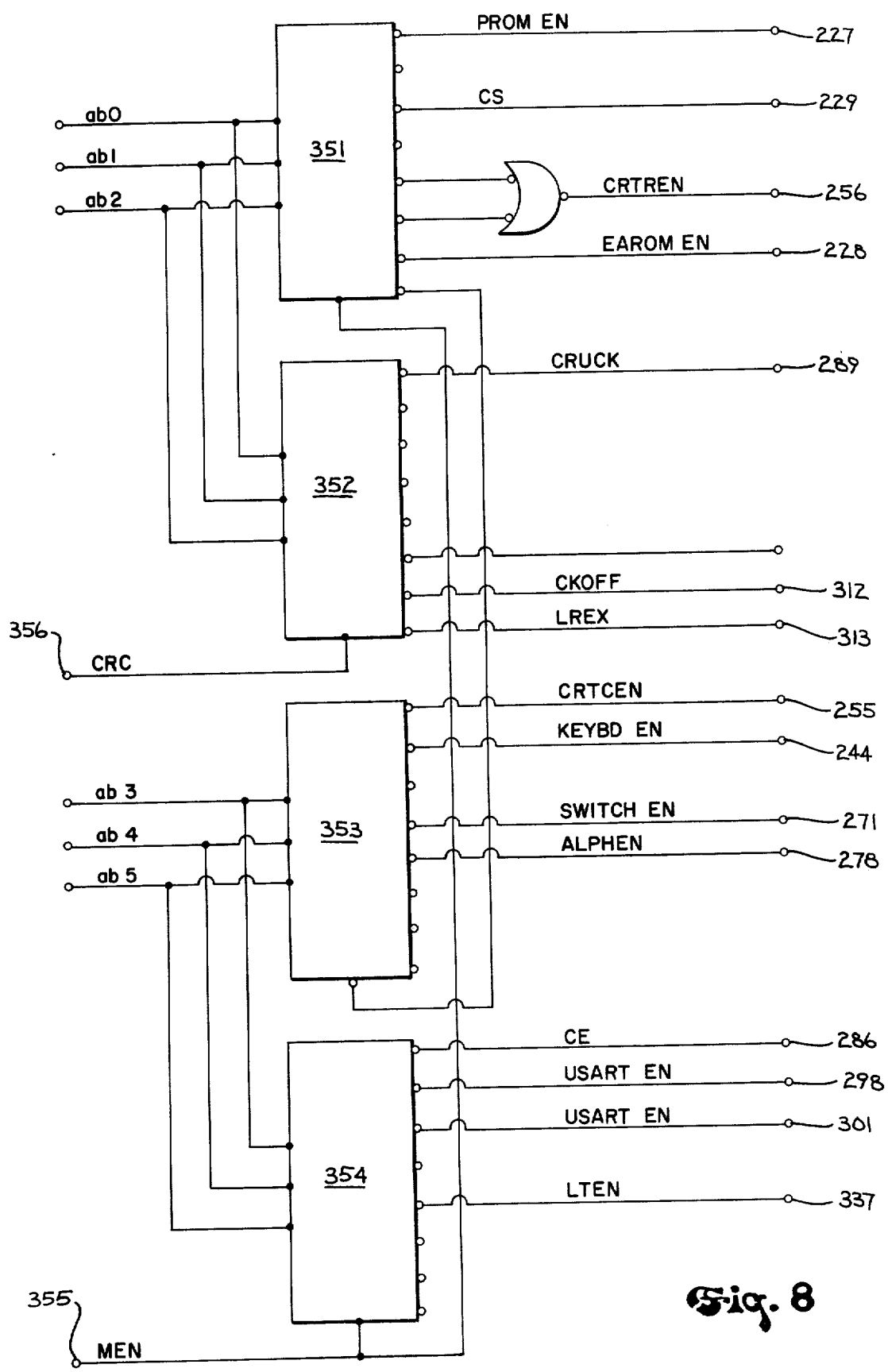
FIG. 8 is an electrical schematic diagram of the decoding and control circuit which forms part of the processor of FIG. 7.
Figure 6:
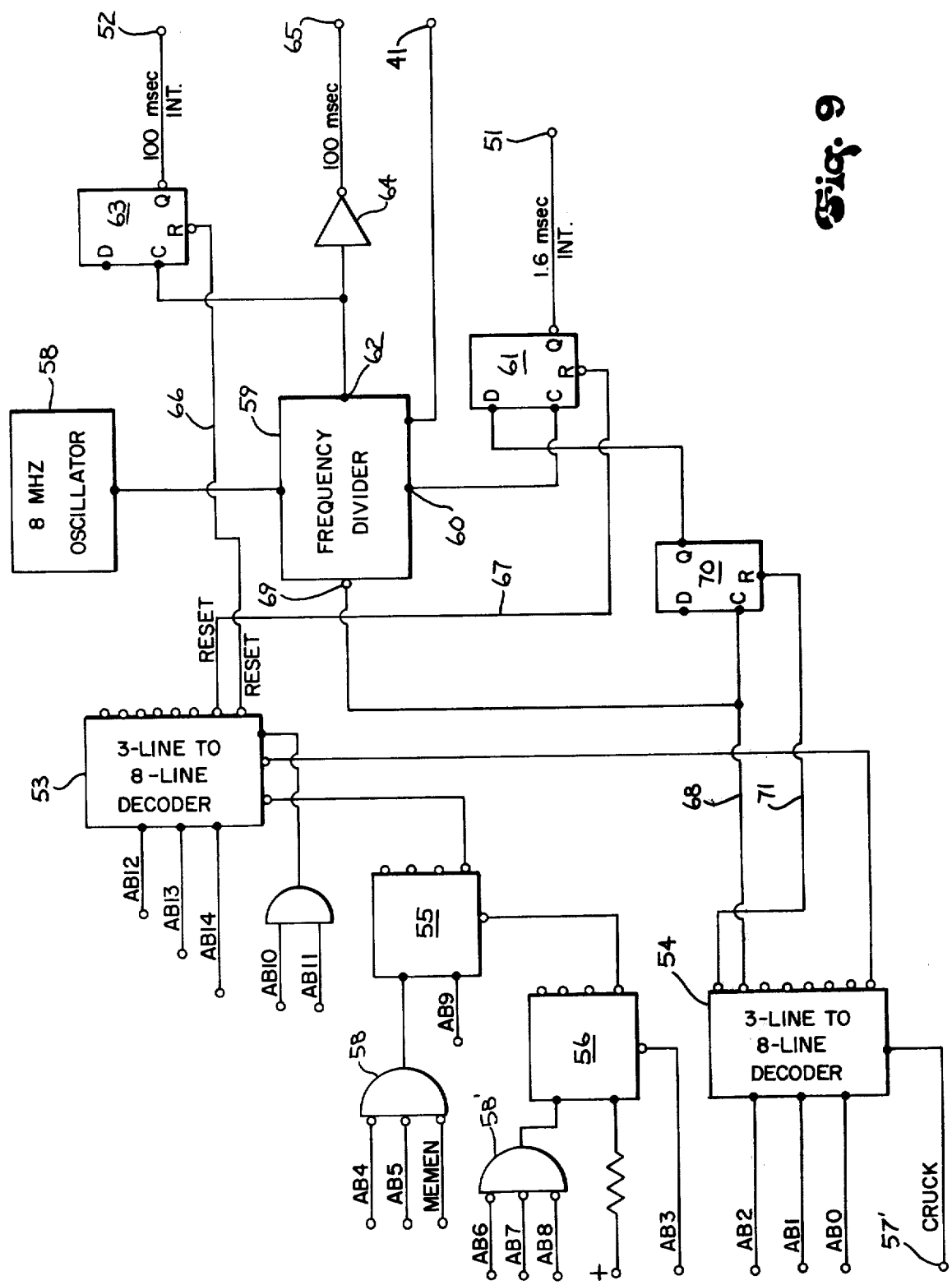

Referring particularly to FIGS. 7 and 8, the control lines which enable the various front panel processor elements described above are for the most part driven by a front panel decoding and control circuit 350. The decoding and control circuit 350 is comprised primarily of four 3-line-to-8-line decoder circuits 351-354 and these are selectively connected to the leads ab0-ab5 of the address bus 222. The decoders 351 and 354 are enabled by a MEN control line 355 whereas the decoder circuit 352 is enabled by the microprocessor 221 through a CRC control line 356. The outputs of the decoders 351-354 drive the front panel processor control lines as shown in FIG. 8. The instructions which are executed by the microprocessor 221 to operate the various elements of the front panel processor through these control lines include selected operation codes and operands. The operands, or addresses, of the various system elements are indicated in Table B along with the states of the control lines which are driven directly by the microprocessor 221. For a detailed description of the operation codes which operate the microprocessor control lines reference is made to *TMS 9900 Microprocessor Data Manual* published in 1976 by Texas Instruments, Inc.

TABLE B

| DEVICE | MEN | CRC | ADDRESS (HEXADECIMAL) |
|---|---|---|---|
| PROM 224 | X | | 0000-7FFE |
| EAROM 225 | X | | F000-FFFE |
| RAM 226 | X | | C000-DFFE |
| KEYBOARD INTERFACE 235 | X | | E400 |
| CRT BUFFERS 251 | X | | E100-E31E |
| CRT BUFFERS 253 | X | | 8000-BFFE |
| CRT CONTROL CIRCUIT 252 | X | | E100-E31E |

TABLE B-continued

| DEVICE | MEN | CRC | ADDRESS (HEXADECIMAL) |
|---|---|---|---|
| CRT FLIP-FLOP 258 | X | | E200 |
| SWITCH TRI-STATE GATES 269 | X | | EC00-EC06 |
| DISPLAY LATCH 274 | X | | E800 |
| DISPLAY LATCH 275 | X | | E802 |
| DISPLAY LATCH 276 | X | | E804 |
| LOAD DISPLAY LINE 279 | X | | E80C |
| CLEAR DISPLAY LINE 280 | X | | E80E |
| LIGHT DRIVER LATCH 338 | | X | 800-807 |
| LIGHT DRIVER LATCH 339 | | X | 808-80F |
| LIGHT DRIVER LATCH 340 | | X | 810-817 |
| LIGHT DRIVER LATCH 341 | | X | 818-81F |
| TAPE READER BUFFER 306 | | | 012-01A |
| TAPE READER FWD LINE 321 | | X | 010=0&011=0 |
| TAPE READER REV LINE 321 | | X | 010=0&011=1 |
| TAPE READER REWIND LINE 322 | | X | 010=1&011=0 |
| USART ENABLE 298 | | X | 600-61F |
| USART ENABLE 301 | | X | 200-21F |

MAIN PROCESSOR OPERATION

Referring particularly to FIG. 2, the numerical control system of the present invention performs numerous functions. Part program data is input to the front panel processor from the tape reader 297 and is coupled through the cable 9 to the main processor. The "blocks" of part program data are stored in the main processor random access memory 29. Operator commands are also received by the front panel processor from the keyboard 14 and the switches 15. These commands are also coupled to the main processor and the microprocessor 25 processes these commands to operate the numerical control system as directed.

When the numerical control system is running a part program, the blocks of part program data are read from the random access memory 29 (128 bytes at a time). A block of part program data may include codes which must be decoded, dimensions which indicate the distances the cutting tool is to be moved, and numbers which indicate the feed rate at which the cutting tool is to be moved. The codes may also direct that such auxiliary functions as a tool change, pallet change, coolant on, etc. should be performed, and when these are decoded, a designated flag is set in the programmable interface image table 105 stored in the random access memory 29. As will be explained, the contents of the programmable interface image table 105 are periodically transferred to the programmable interface circuit 75 to indicate that the particular auxiliary function is to be performed.

The dimensions and numbers in a part program are employed by the microprocessor 25 to calculate a distance which the cutting tool is to move along each axis of machine tool motion in a single 25.6 millisecond iteration. These distances are stored in active buffers in the random access memory 29 and they are employed every 25.6 milliseconds by the microprocessor 25 under the direction of an interpolation routine to calculate the motion command signals which are output to the servo-mechanism interface circuit 7.

Figure 15:
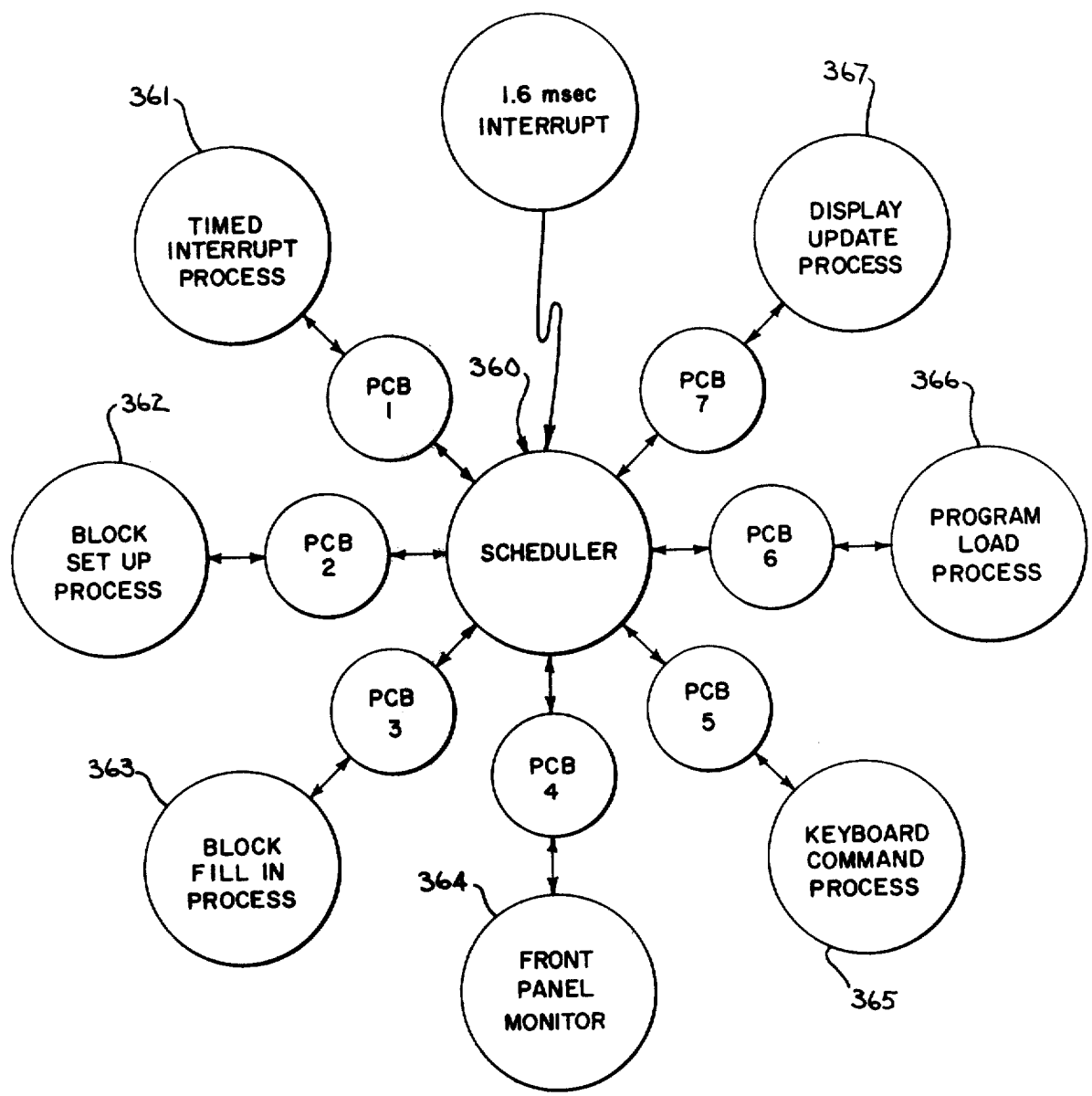
FIG. 15 is a schematic diagram of the main processor operating system.

The control of these and other functions resides in the main microprocessor 25 which operates under the direction of a scheduler routine that is stored in the read-only memory 30. Referring particularly to FIGS. 2 and 15, the scheduler routine, or scheduler, is indicated schematically at 360 and it is entered at least once every 1.6 milliseconds when the microprocessor 25 responds to the interrupt generated by the real time clock 50. The various functions which the main processor is to perform are collected into seven general processes and it is the function of the scheduler 360 to allocate 1.6 millisecond "time slices" to each of these processes on a round-robin basis. These seven processes are indentified herein as follows: timed interrupt process 361; block set up process 362; block fillin process 363; front panel monitor 364; keyboard command process 365; program load process 366; and display update process 367. The scheduler 360 has sixteen 1.6 millisecond time slices ($16 \times 1.6 = 25.6$) which it can allocate to these processes during each iteration period. The number of allocatable time slices remaining during any 25.6 millisecond iteration period is retained in a counter (ITRS) which is stored in the random access memory 29.

Figures 16, 17, 19:
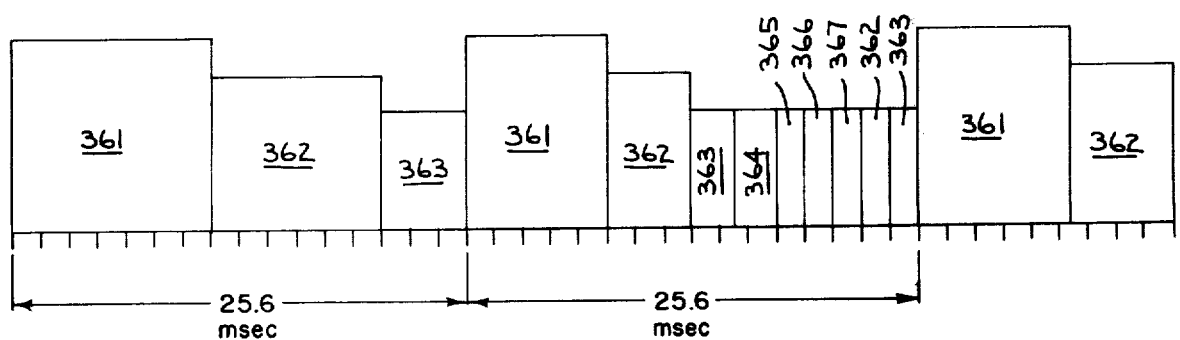
FIG. 16 is a schematic diagram illustrating the contents of a schedule queue which forms part of the system of FIG. 15.
FIG. 17 is a schematic diagram illustrating the contents of a process control block which forms part of the system of FIG. 15.
FIG. 19 is an illustration of a typical sequence of operation of the system of FIG. 15.

Referring particularly to FIGS. 15-17, the order in which the processes are executed and the number of time slices allocated to each during a 25.6 millisecond iteration period are indicated in a schedule queue 368. The schedule queue 368 is stored in the read-only memory 30 and its content are illustrated in FIG. 16. Associated with each of the processes listed in the schedule queue 368 is a process control block (PCB) which is stored in the random access memory 29 and which contains data concerning the status of the process as illustrated in FIG. 17. The addresses of the respective process control blocks PCB1-PCB7 are stored in the schedule queue 368 and are labeled A(PCB1); A(PCB2); A(PCB3); A(PCB4): A(PCB5); A(PCB6); and A(PCB7). Associated with each of these PCB addresses is a number which indicates the maximum number of contiguous time slices allocated to the process. A register (PCBIDX) located in the random access memory 29 is an index to the current, or active, line in the schedule queue 368. This register is employed by the scheduler routine 360 to sequentially activate the processes. For example, PCBIDX points to the first line in the schedule queue 368 at the beginning of each iteration period and the timed interrupt process 361 is thus activated through its associated process control block (PCB1). Since the timed interrupt process 361 must be executed to completion, an excessive number of time slices are allocated to it (MSC1-32). However, under normal operating conditions the timed interrupt process is completed in fewer than sixteen time slices and there will be a number of time slices remaining in each 25.6 millisecond iteration period to service other processes. When a process is completed or when it uses up its allocated time, the scheduler 360 is called and the register PCBIDX is incremented to point to the next line in the schedule queue 368. For example, after the timed interrupt process is completed, the block set up process 362 is activated through its associated process control block (PCB2) and the remaining time slices in the iteration period are used up if necessary to complete this process. The remaining processes are similarly activated when time becomes available during any iteration period in the order listed in the schedule queue 368. A dummy process (not shown in the drawings) is also included in the system in the event that no process can be executed. This dummy process is a wait loop which is executed until the start of the next iteration period.

Referring particularly to FIGS. 15 and 17, the process control blocks (PCB1-PCB7) store data which provides to the scheduler 360 the status of the respective processes 361-367. The first line of each process control block stores inhibit flags, which when set, indicate to the scheduler 360 that the process is not to be executed. More particularly, bit 0 is an inhibit flag (IOW) which is set when the process requests I/O and specifies its willingness to await completion of the I/O operation, bit 1 is an inhibit flag (CIW) which is set by the scheduler when it receives an inhibit request from the process which indicates that it is not to be executed during the present 25.6 millisecond iteration period, and bit 2 is a inhibit flag (PRW) which indicates that the process is to remain inhibited until it is reactivated, or enabled, by another process. As the scheduler 360 sequences through the schedule queue 368, it interrogates the inhibit flags in the active process control block to determine if its associated process should be executed.

The second word in each process control block (PCB1-PCB7) serves as a counter (CSC) which indicates to the scheduler the number of allocated time slices remaining before the next process on the round robin must be activated. When a process is activated, one of the first functions the scheduler performs is to load this counter (CSC) with the number of allocated time slices indicated for that process in the schedule queue 368. Then, as 1.6 millisecond interrupts occur, the time slice counter (CSC) is decremented, and when it reaches zero, control is returned to the scheduler 360.

The remaining four lines of each process control block (PCB1-PCB7) store data which indicates the status of the process when control is returned from it to the scheduler 360. More specifically, line three stores the contents of a memory extension register (MXR), line four stores the contents of a workspace pointer (WP), line five stores the contents of a program status register (ST). This data is loaded into the process control block by the scheduler 360 when the activated process is interrupted by the 1.6 millisecond clock or whenever the process exits and is "blocked" by an inhibit bit. When the process is reactivated by the scheduler 360, therefore, the contents of these four lines in the process control block can be reloaded into the appropriate microprocessor registers and the execution of the process can continue from the point where it left off.

Figure 18A:
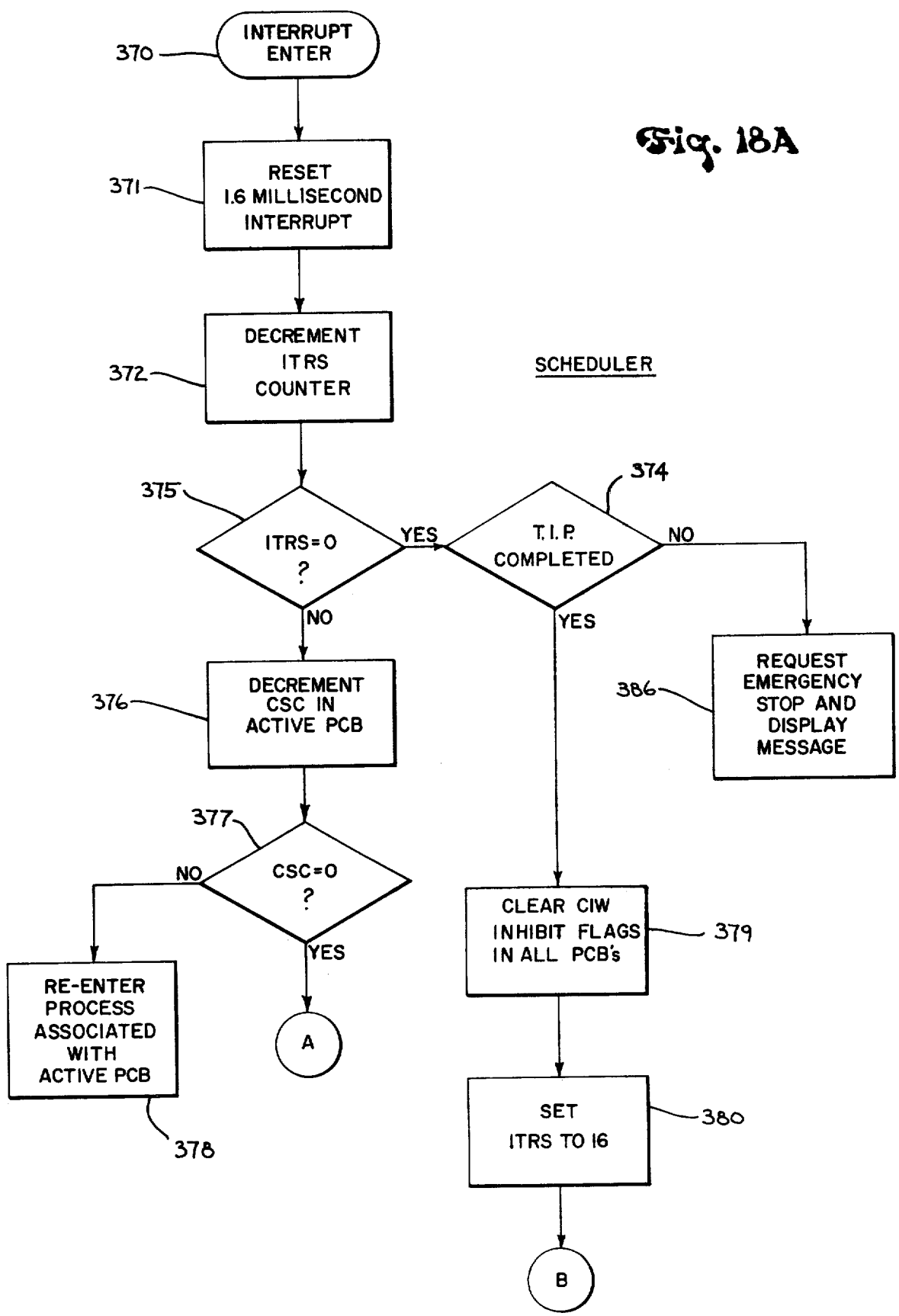
FIGS. 18A and 18B is a flow chart of the scheduler which forms part of the system of FIG. 15.
Figure 18B:
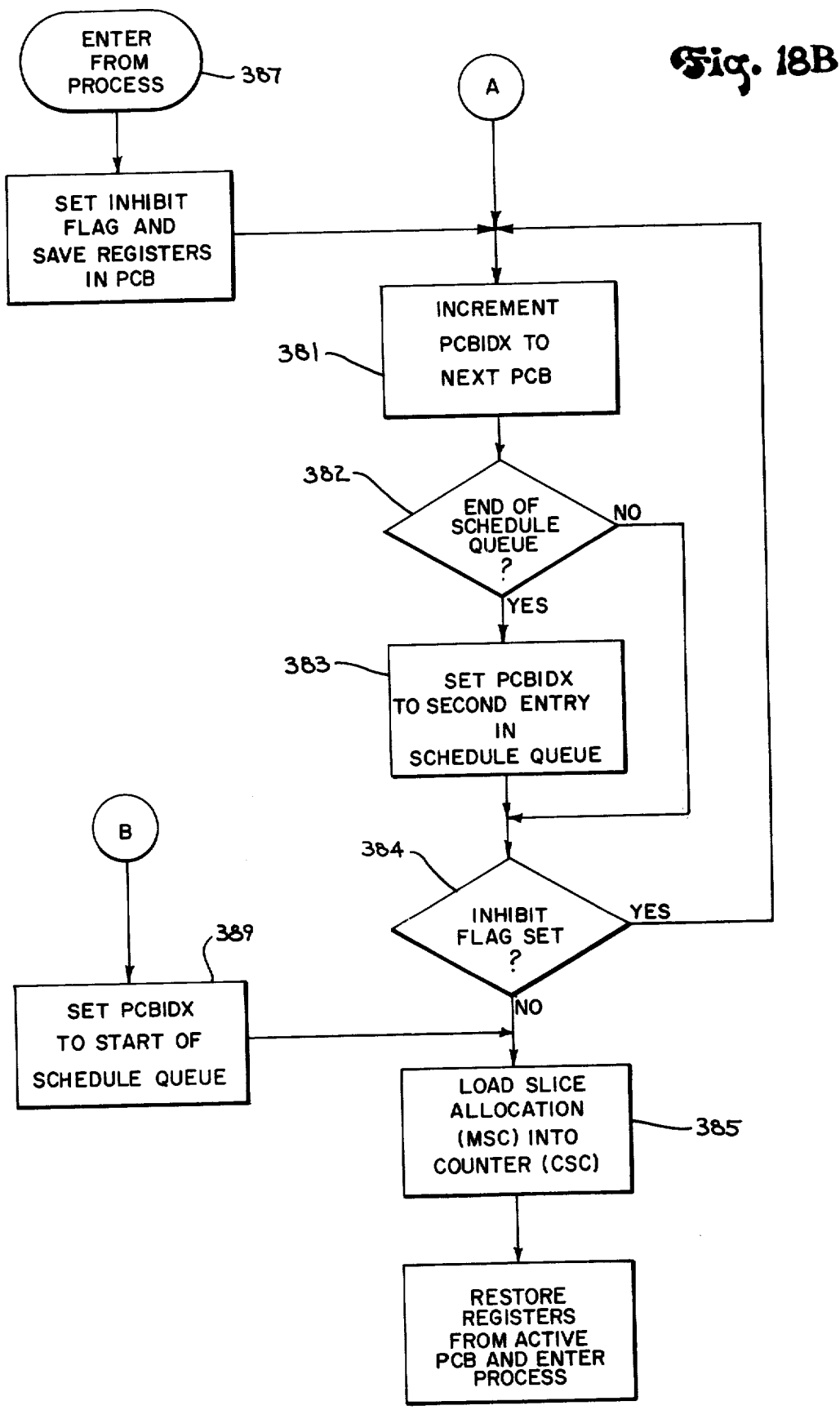

Referring particularly to FIGS. 18A and 18B, the scheduler routine 360 is entered during each 1.6 millisecond interrupt at the point 370. The 1.6 millisecond interrupt is then reset by an instruction indicated by process block 371 and the time slice counter (ITRS) is decremented one count as indicated by process block 372. The time slice counter (ITRS) is then examined as indicated by decision block 275 to determine if all sixteen time slices for the current iteration period have occurred.

If the iteration period has not expired, the counter (CSC) in the active process control block is decremented as indicated by process block 376 and it is then checked, as indicated by decision block 377, to determine if it is zero. If it is not, further time slices are available to the active process and the active process is reentered as indicated by process block 378.

If the iteration period has expired as determined by decision block 375, or if the time allocated to the active process has expired as determined by decision block 377, the scheduler 360 maintains control. When the iteration period ends a check is made to determine if the timed interrupt process (TIP) was completed during the iteration period. This is accomplished by decision block 374 which branches to an emergency stop routine indicated by process block 386 when an "overlap" has occurred. Under normal operating conditions, however, the inhibit flag CIW in all of the process control blocks PCB1-PCB7 are reset as indicated by process block 379 and the time slice counter (ITRS) is set to sixteen as indicated by process block 380 to start a new iteration period. As shown in FIG. 18B, the PCBIDX register is set to the start of the schedule queue 368 as indicated by process block 389 and the timed interrupt process is entered and executed to completion. The timed interrupt process is thus executed at the beginning of each iteration period.

Referring to FIG. 18B, when the iteration period has not ended, but the next process in the schedule queue 368 is to be activated, the register PCBIDX is incremented as indicated by process block 381 to point to the next process control block listed. If the end of the schedule queue has been reached as determined by decision block 382, and time remains in the iteration period, the register PCBIDX is reset to point to the second entry in the schedule queue 368 as indicated by process block 383. In either case, the next process control block is now active and the first function performed by the scheduler 360 is to examine the first line in the active process control block to determine if any inhibit flags are set. If so, as indicated by decision block 384, the scheduler 360 loops back to process block 381 to determine if the next process listed in the schedule queue 368 should be activated. As indicated by process block 385, if no inhibit flags are set, the time slice allocation (MSC) for that purpose is read from the schedule queue 368 and loaded into the counter (CSC) of the active process control block. The active process is then entered and executed until it requests "blocking" or until the next 1.6 millisecond interrupt occurs.

Referring particularly to FIG. 18B, when a process is completed before a 1.6 millisecond interrupt occurs, the scheduler routine 360 is entered at the point 387. The appropriate inhibit flag is set for that purpose and the contents of the microprocessor registers are saved in the process control block associated with the completed process as indicated by process block 388. The register PCBIDX is then incremented as described above to point to the next line in the schedule queue 368 and the next "unblocked" process will be activated and will use the remaining time in the current time slices.

The timed interrupt process 361 will be executed to completion during each iteration period because it is allocated more time slices than it can possibly use when the system is operating properly. The block set up process 362 will utilize a large portion of the remaining time in the interpolation period until it has completed its function of setting up the next program block for interpolation. After that the block set up process 362 is dormant and will be entered after the completion of the timed interrupt process 361 just long enough to check whether the endpoint of the current part program block has been reached. Considerable time is then available during each iteration period and this is allocated to the remaining "background" processes listed in the schedule queue 368. A typical allocation of time slices by the scheduler 360 is illustrated schematically in FIG. 19 for three iteration periods immediately following the transfer of a new block of data into the active interpolator buffer. The timed interrupt process 361 occupies a substantial portion of each iteration period, but the time required by the block set up process diminishes after the first iteration period. Subsequent iteration periods will be similar to the second period illustrated in FIG. 19 until the end of block is detected and the block set up process 362 again requires substantial time.

It should be apparent that the scheduler 360 provides a flexible and efficient means of allocating time to the various functions which the main processor must perform. Processes, and hence functions, may be added or deleted from the system merely by making additions or subtractions from the schedule queue 368. Priorities can be altered by changing the order of the schedule queue entries or the time slice allocations.

Referring to FIGS. 2, 15 and 20, the timed interrupt process functions to output motion commands to the servo-mechanism interface circuits 7 and to exchange data with the programmable interface circuit 75 once during every 25.6 millisecond iteration period. Referring particularly to FIG. 20A, the timed interrupt process is entered from the scheduler 360 at the beginning of each iteration period at the point 390. The first function it performs is to determine if the system is being powered up, as indicated by decision block 394. If the system is in power up, the starting address of the programmable interface image table 105 in the random access memory 29 is written into the data latch 124 in the DMA circuit 110 (see FIG. 4). This enables the programmable interface circuit 75 to address the proper memory address so that it can subsequently exchange data with the programmable interface image table 105.

After power up, the timed interrupt process prepares to initiate a data transfer with the programmable interface circuit 75. First, it checks to see whether data was received from the programmable interface circuit 75 during the previous iteration period, as indicated by decision block 396. If not, a malfunction has occurred and the system branches to a process block 397 which requests an emergency stop and loads an appropriate message into a display buffer for transmittal to the front panel processor. Otherwise, the system checks a control program overlap flag as indicated by decision block 398 to determine if the programmable interface processor completed its functions during the previous iteration period. If it did not, an emergency stop is requested and a suitable message is displayed as indicated by process block 399. The "data received" and "control program overlap" indicators are stored in the programmable interface image table 105. They are set by the programmable interface circuit 75.

Under normal circumstances, instructions indicated by process block 400 are executed next to unpack data written into the programmable interface image table 105 by the programmable interface circuit 75 during the previous iteration. This data is dispersed to various locations in the random access memory 29 for use by other programs. Next, data is assembled from various locations in the random access memory 29 and stored at specified locations of the programmable interface image table 105 as indicated by process block 415. Such data may be generated by the block set up process from the part program and may include, for example, an indication that an auxiliary function such as a tool change or a pallet change is to occur. After this data has been assembled in the PI image table 105, an instruction indicated by process block 401 is executed by the main processor to initiate the data transfer between it and the programmable interface circuit 75. As indicated previously, this instruction generates a non-maskable interrupt to the programmable interface microprocessor 85. The programmable interface circuit 75 subsequently requests a DMA from the main microprocessor 25 and the main microprocessor 25 releases its data bus 27, address bus 26, and control lines WE and RD to the programmable interface circuit 75. As will be described in more detail hereinafter, the programmable interface 75 then transfers thirty-three 16-bit words of data from the PI image table 105 in the main processor memory 29 to the PI image table 106 in the programmable interface memory 88. Later, during the same iteration period, the programmable interface circuit 75 transfers thirty-three 16-bit words of data back from the PI image table 106 in memory 88 to the PI image table 105 in the memory 29. The data thus transferred is indicated schematically in FIG. 28.

Figure 20B:
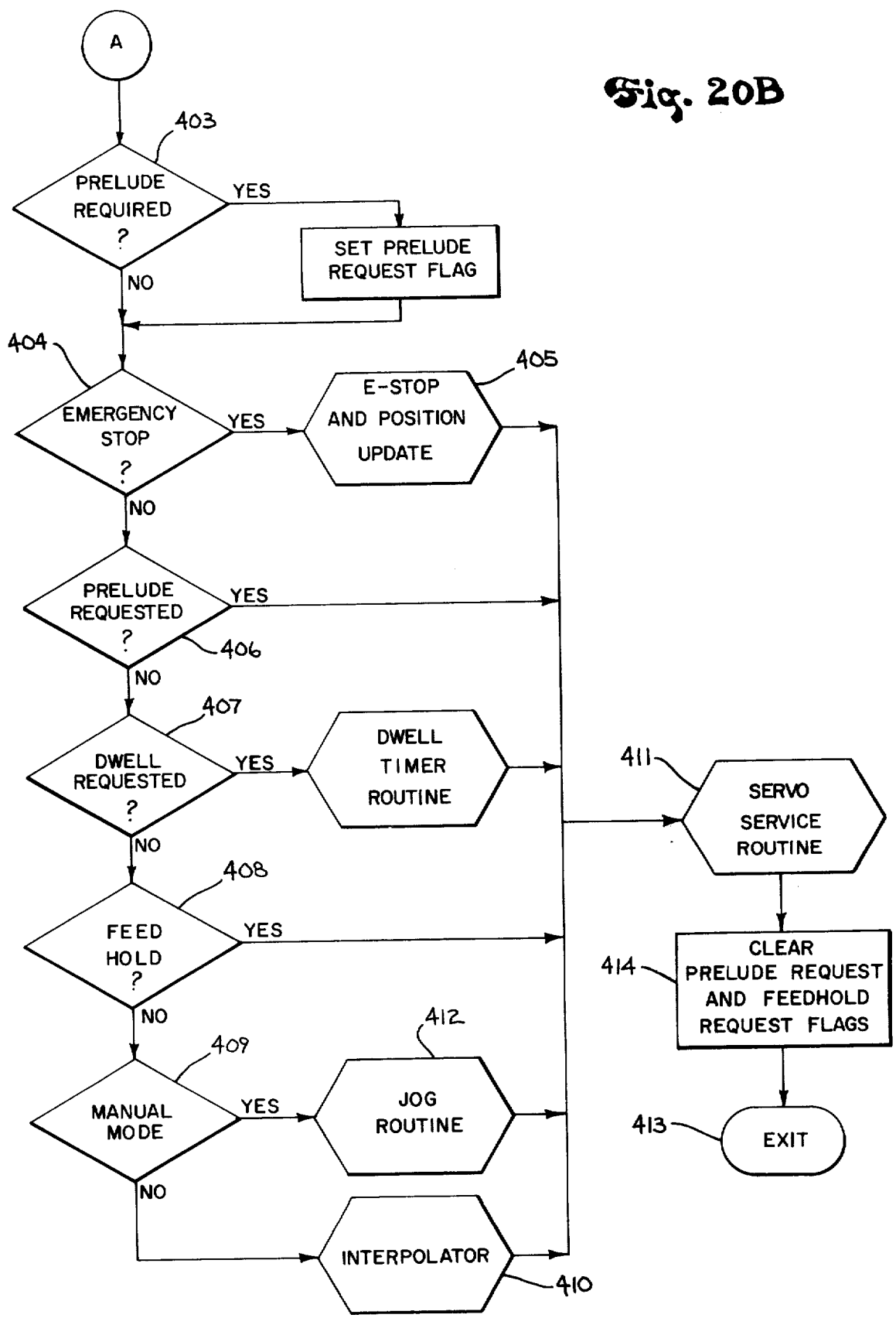

Referring particularly to FIG. 20B, after the exchange of data with the programmable interface circuit 75 has been initiated, the main processor continues to execute instructions in the timed interrupt process. The next step in this process is to determine if a "prelude" flag has been set as indicated by decision block 403. A prelude is always requested during the first iteration period of any part program block which contains an S-word, a T-word, or certain M codes defined in EIA standard RS-274-C. This gives the programmable interface circuit 75 an opportunity to act on the S, T or M code at the beginning of the block before interpolation begins.

The system next executes instructions indicated by decision block 404 to determine whether the emergency stop flag has been set. If so, an emergency stop and position update routine 405 is executed. Otherwise, the prelude flag is checked at decision block 406 and the "dwell" flag is checked at decision block 407. If neither of these flags is set the "feed hold" flag is checked at decision block 408 and the "manual mode" flag is checked at decision block 409.

If none of these flags are set the interpolation routine 410 is entered and is executed to its completion to generate an incremental motion command number for each axis of motion on the machine tool being controlled. A servo-service routine 411 is then executed to output the motion command signals to the servo-mechanism interface circuit 7 as indicated at 411. If the interpolator 410 is bypassed, either no incremental motion command numbers are calculated, or motion command numbers are calculated by a jog routine 412 which is responsive to operator commands. In any case, after the newly calculated motion commands are output to the servo-mechanism interface circuit 7, the prelude request and feedhold request flags are reset as indicated by process block 414 and the system exits at 413 back to the scheduler 360.

Figure 21B:
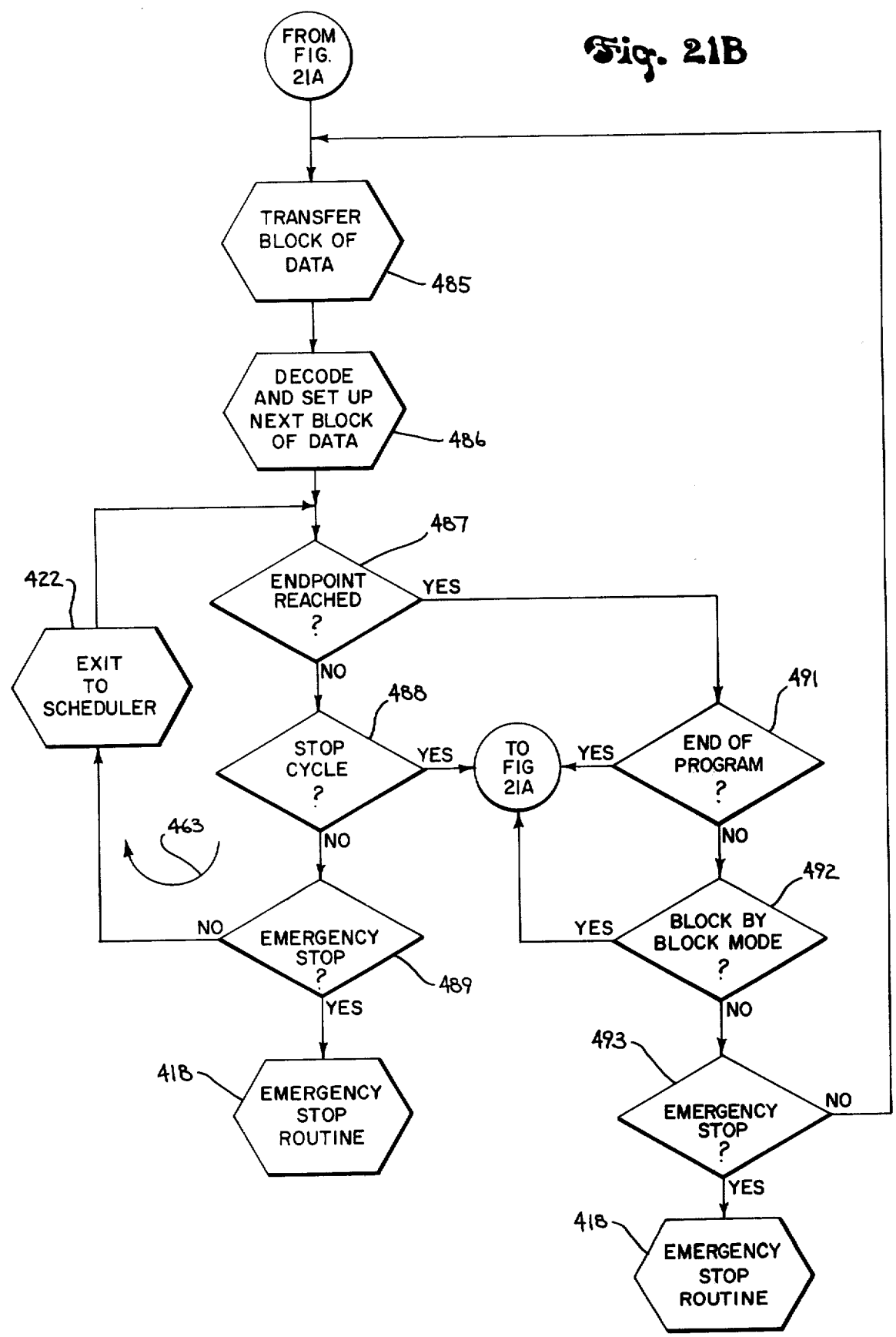

The next process in the schedule queue 368 is the block set up process 362 which is illustrated by the flow chart in FIGS. 21A and 21B. Among other things, this process takes a block of part program data from a "block data buffer," decodes the ASCII characters into binary axis commands, feed rate commands and flags. This decoded data is then employed to calculate the parameters needed for the interpolator routine, such as distance to go, speed and the initial values of I, J and K for circular interpolation. These interpolator parameters are stored in a "temporary interpolator buffer" until the previous block of data has been completely interpolated, at which point, the block set up process makes the temporary interpolator buffer "active" and it begins to set up the next part program block in the temporary interpolator buffer.

Referring particularly to FIG. 21A, the block set up process first executes a series of instructions which determine whether part program data is available and whether that data should be set up and applied to the interpolator routine. More specifically, a test is first made to determine whether an emergency stop has been requested as indicated by decision block 417 and then the status of the mode switch is checked as indicated by decision block 419 to determine if manual mode has been selected. If an emergency stop has been requested, the system branched to an emergency stop routine 418 and if manual mode has been selected, the system branches to the appropriate manual mode routine indicated collectively at 490. As indicated by decision block 420, instructions are executed next to determine whether the cycle start button has been depressed. If it has, instructions indicated by decision block 421 are executed to determine if a source of part program data has been identified by the operator. If a source of data has not been identified, the process exits back to the scheduler routine through a routine indicated at 422. The routine 422 requests "blocking" and the scheduler sets the CIW inhibit flag in the process control block associated with the block set up process. The scheduler also loads data into the other locations of the process control block which will cause the block set up process to be re-entered at its beginning during the next iteration period.

After a source of part program data has been identified by the operator, the system leaves the loop formed by decision block 421 and executes instructions indicated by decision block 423 to determine whether the "block data buffer" has been filled with part program data. If not, a message is output to the pendent station display as indicated by process block 424 and instructions indicated by decision blocks 425 and 433 are executed to determine if the cycle stop push button has been depressed by the operator or if an emergency stop has been requested. If neither of these requests have occurred, the system exits back to the scheduler through the routine 422, which sets the CIW inhibit flag and conditions the process control block to re-enter the block set up process at decision block 423 during the next iteration period. During subsequent iterations the block set up process will be entered to determine whether the data buffer is full and will loop back to the scheduler as indicated by the arrow 462.

When the block data buffer is full, as determined by decision block 423, the system branches to a decode and set up routine 434 which converts the data into a form which is usable by the interpolator routine. Referring particularly to FIG. 21B, this converted data is stored in the active interpolator buffer as indicated by routine 485 and then the next block of part program data is decoded and set up in the temporary interpolator buffer as indicated by routine 486. The block set up process then enters a loop indicated by the arrow 463 while the data in the active interpolator buffer is processed by the interpolator routine during subsequent iteration periods. This loop 463 includes a set of instructions indicated by decision block 487 which tests whether the end point of this block of data has been reached and an instruction indicated by decision block 488 which determines whether cycle stop has been requested. Also, the emergency stop request flag is checked by instructions indicated by decision block 489 and if none of these requests have occurred, the system exits back to the scheduler through the routine 422 which sets the CIW inhibit flag in the process control block.

When the end point of the current part program block has been reached as determined by decision block 487, an instruction indicated by decision block 491 is executed to determine whether the end of the program has been reached. In addition, instructions indicated by decision block 492 are executed to determine if the machine is in the "block by block" mode of operation. If either condition is present, the system branches back to the beginning of the block set up process in FIG. 21A. Otherwise, an instruction indicated by decision block 493 is executed to determine if an emergency stop is required, and if not, the system branches back to the routine 485 to transfer the temporary interpolator buffer data to the active interpolator buffer and to decode and set up the next block of data in the temporary interpolator buffer.

As described above, when the block set up process reaches a point where it is waiting for an event to occur, or is waiting for data to become available, it exits back to the scheduler which sets an inhibit flag in the associated process control block (PCB2) to insure that the process is not entered until the next iteration period. In addition, however, the block set up process may be interrupted by the 1.6 millisecond clock at any point in the program. This will occur, for example, when the decode and set up routine 486 is being executed since it requires more than 1.6 milliseconds of time. As described above, when such an interrupt occurs, the status of the microprocessor or registers are saved in the process control block (PCB2) so that the block set up process will be re-entered at the same point during the same or subsequent iteration period.

Referring again to FIG. 15, the block fill in process 363 which is listed next in the schedule queue 368 is similar to the block set up process 362 in the general manner in which it interacts with the remainder of the system. More specifically, it takes block of part program data from designated locations in the random access memory 29 and loads each into the block data buffer for processing by the block set up process described above. The fill in process sets the PRW inhibit flag in its process control block when no part program data source has been identified by the operator and it sets its CIW inhibit flag when there is no room in the block data buffer for further data. The PRW inhibit flag is reset by the block set up process when a source of data has been identified by the operator (decision block 421 in FIG. 21A) and the CIW inhibit flag is, of course, reset at the beginning of the next iteration period.

Figure 22:
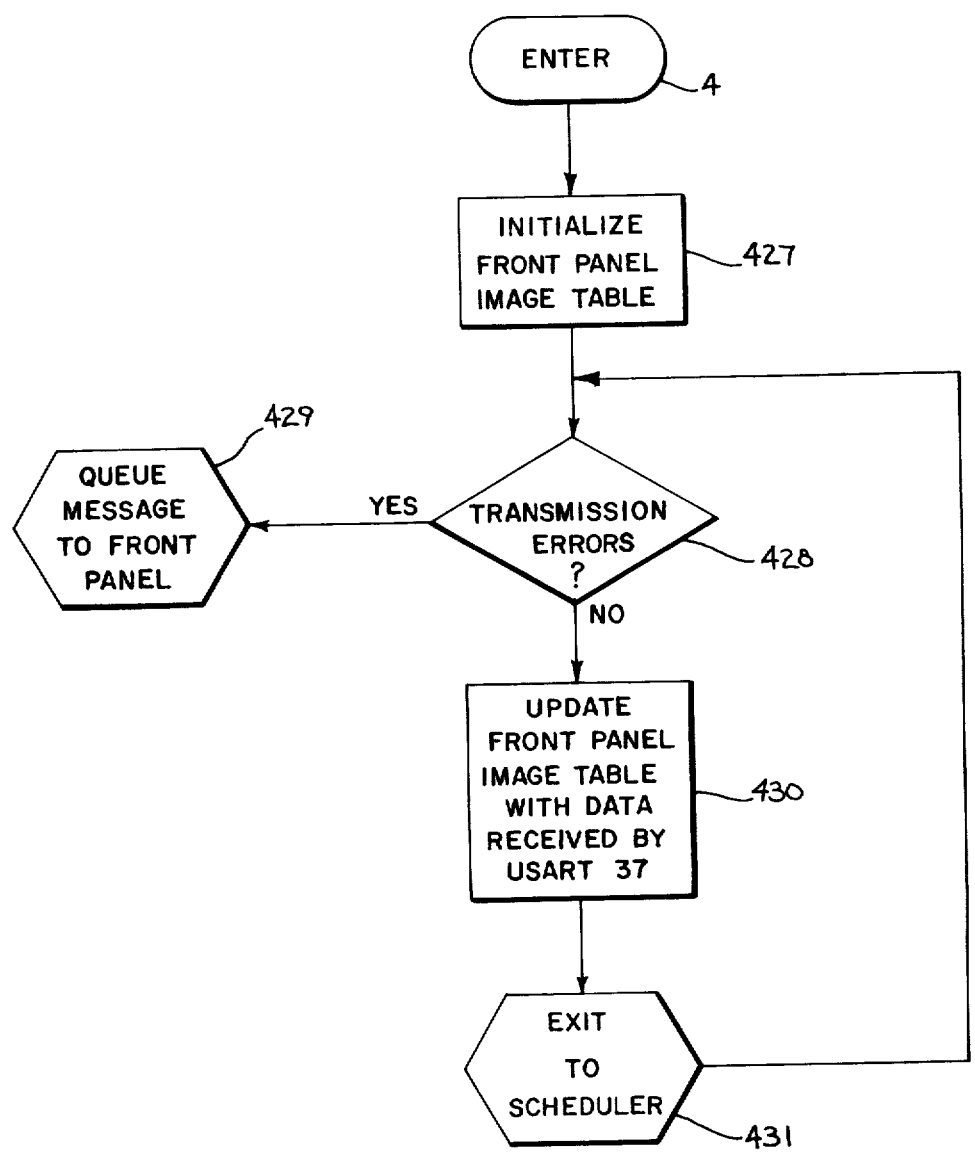
FIG. 22 is a flow chart of the front panel monitor which forms part of the system of FIG. 15.

Referring to FIGS. 2, 15 and 22, the front panel monitor 364 is the next process listed in the schedule queue 368. It functions to input data received from the front panel processor and maintain a front panel image table 444 in the main processor memory 29 which indicates the status of the lights, switches and push buttons on the pendent control station 2. When a byte of data has been received by the USART 37 which indicates that a change has ocurred at the pendent control station, the microprocessor 25 inputs the data and stores it in a data buffer associated with the front panel monitor. Three such bytes of data comprise a complete message transmission and when this third byte of data has been received, the front panel monitor 364 is "unblocked" by the communications module associated with the USART 37. The front panel monitor 364 may then be activated by the scheduler.

When the scheduler 360 activates the front panel monitor 364 it is entered at the point 425. Instructions indicated by process block 427 are then executed to initialize the front panel image table 444 to a start-up condition. A flag is then checked as indicated by decision block 428 to determine if any transmission errors have been reported by the communications module. If so, the data is ignored and the system branches to a subroutine 429 which prepares a message for transmission to the front panel processor indicating the error. Otherwise, the two bytes of status data is loaded into the front panel image table 444 as indicated by process block 430. The system then exits to the scheduler at 431 with its process control block (PCB4) set for re-entry at decision block 428 when the next complete message is received. In addition, the CIW inhibit flag is set to insure that the front panel monitor 364 is not re-entered during the same iteration period. This enables the timed interrupt process to act upon the changed line in the front panel image table 444 at least once before the data can be changed again by another transmission from the pendent control station 2.

Referring to FIGS. 1, 2 and 7, it should be apparent that the front panel image table 444 serves as an interface between the pendent control station 2 and the remainder of the numerical control system. For example, four of the switches 15 on the pendent control station 2 are set by the operator to establish the manner in which the system is to operate—that is, manual, automatic, keyboard, or single block. Specific bits on one line of the front panel image table 444 are dedicated to indicate the status of these switches and it is these which are examined by processes in the front panel processor to establish the mode of operation. As will be described in more detail hereinafter, it is one of the functions of the front panel processor to periodically check the status of the pendent control station switches 15 and to update the main processor with any changes that occur. Only changes are transmitted to the main processor through the cable 9, thus reducing the traffic. It should be apparent that a variation in the preferred embodiment is possible in which the entire front panel image table is updated each time a change occurs. More data is transmitted, but the software "overhead" is reduced because the row number need not be analyzed.

Figure 23:
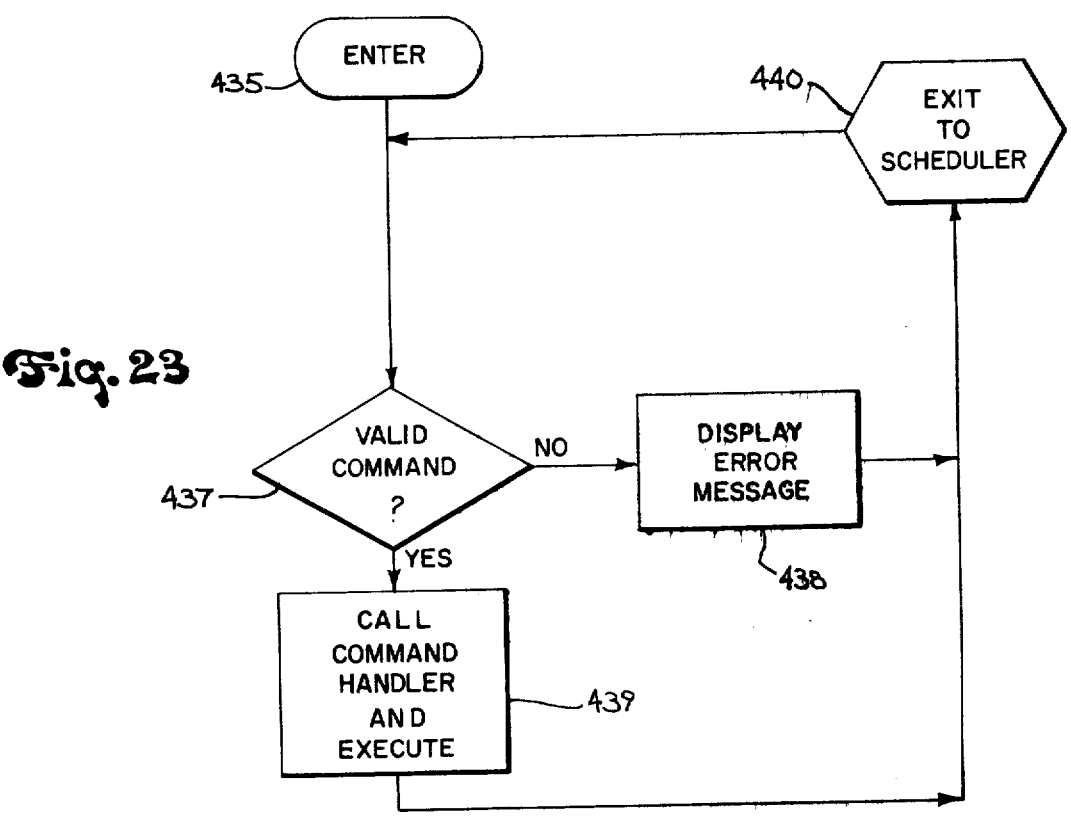
FIG. 23 is a flow chart of the keyboard command process which forms part of the system of FIG. 15.
Figure 24:
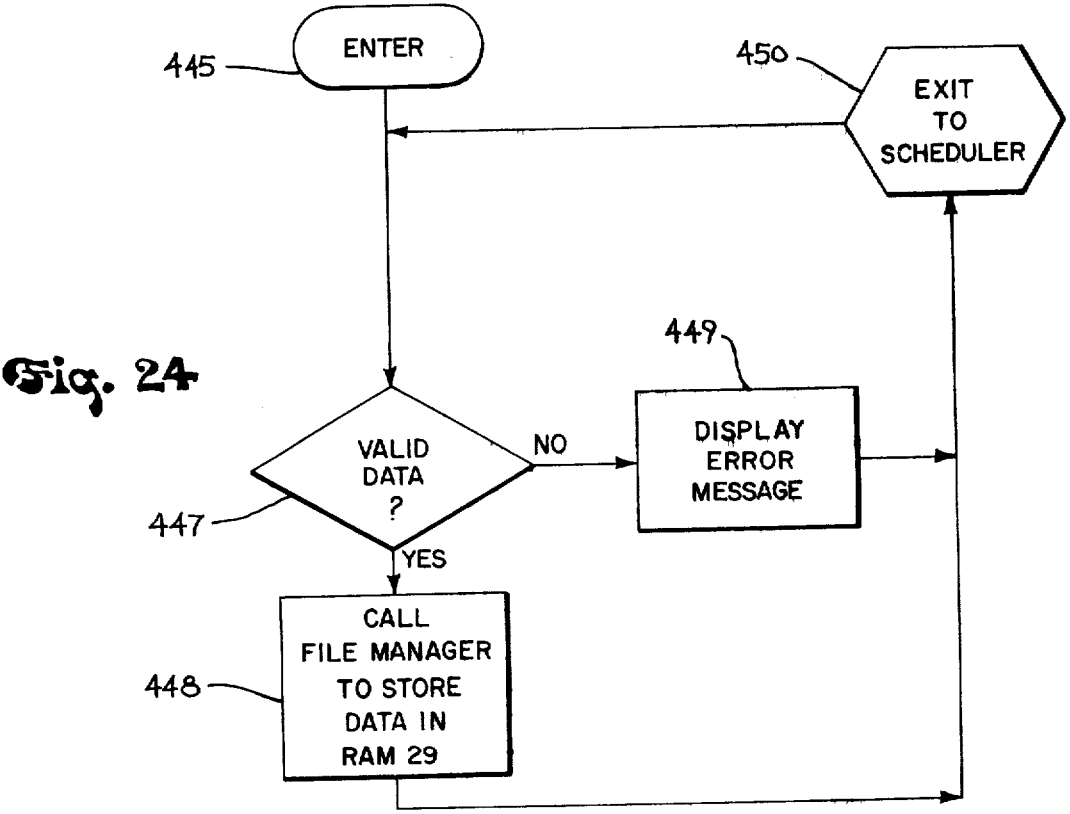
FIG. 24 is a flow chart of the program load process which forms part of the system of FIG. 15.
Figure 25:
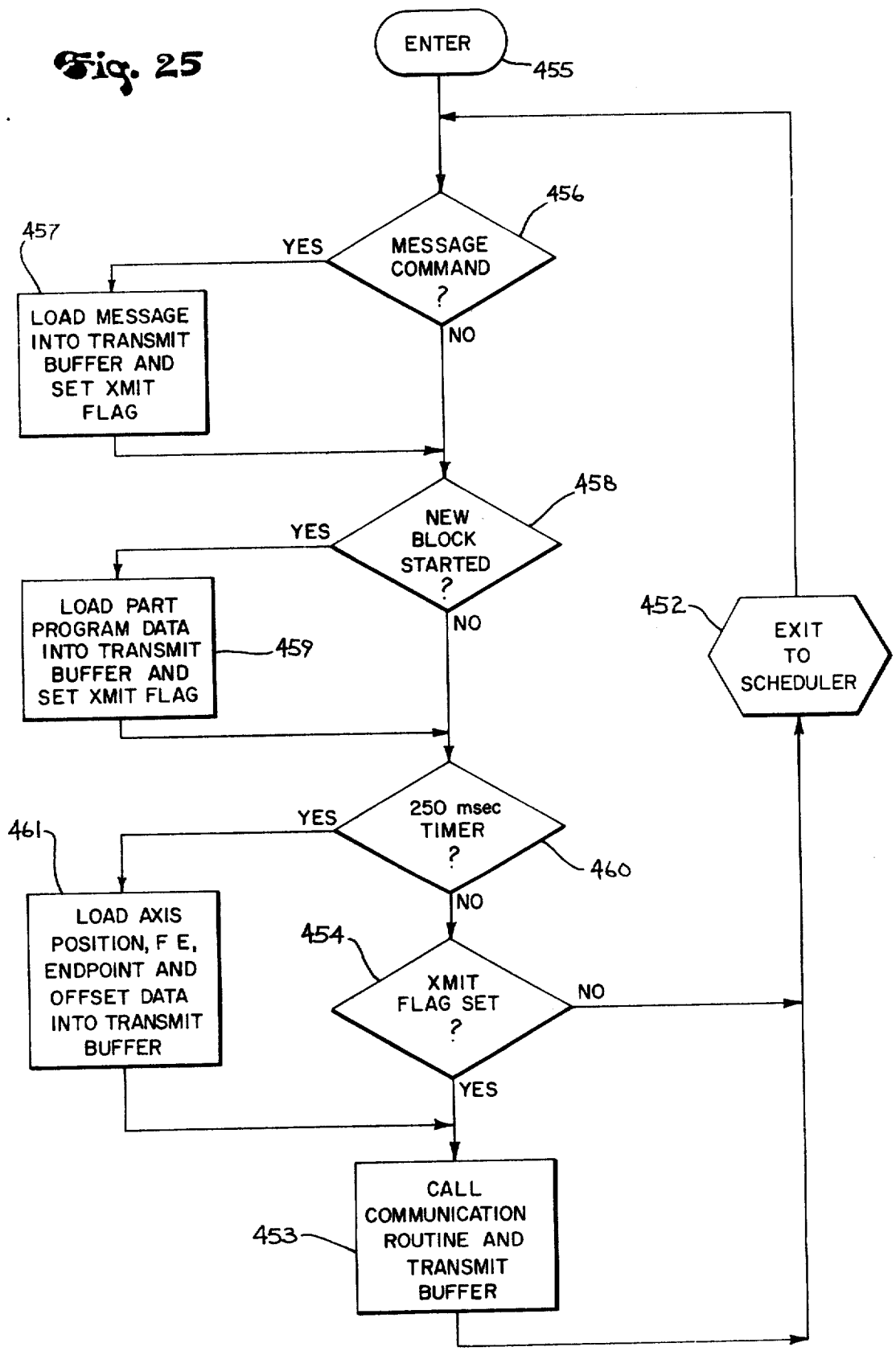
FIG. 25 is a flow chart of the display update process which forms part of the system of FIG. 15.

Referring particularly to FIGS. 2, 15 and 23, the keyboard command process 365 is listed next in the schedule queue 368 and it is entered from the scheduler 360 at a point 435 for a single 1.6 millisecond time slice when an operator command has been received from the front panel processor and is reported by the communications module (i.e., the IOW inhibit flag in PCB5 is cleared). A series of instructions indicated by decision block 437 are then executed to determine if the command is valid and if it can be executed. The command format, or command mnemonics, comply with EIA standard RS-447 (i.e., Operation Command and Data Format For Numerically Controlled Machines) and the mnemonic received from the keyboard 14 is checked to insure it is one of these. In addition, a check is made to determine if the system is configured to execute the command, and if it is, the appropriate command handler program is called up and executed as indicated by process block 439. If the opertor command is not correct or cannot be executed, the system branches at decision block 437 and an appropriate error message is generated for the pendent station display 16 or 17 as indicated by process block 438. The system then exits back to the scheduler 360 through the subroutine 440.

Referring particularly to FIGS. 2, 7, 15 and 24, the program load process 366 is executed when part program data is loaded through the pendent control station 2 for storage in the main processor memory 29. Typically, such data is entered through the tape reader 297 which connects to the pendent control station 2, although it also may be downloaded from a host computer in a DNC system through the front panel auxiliary USART 294. In either case, when the program load process 366 is entered from the scheduler 360 at a point 445, the data is checked as indicated by decision block 447 to determine if it is valid. If invalid, a suitable message is output to the display 16 or CRT 17 as indicated by process block 449, and if valid, the file manager is called up and executed as indicated by process block 448. When the data has been stored in the proper location by the file manager, the system exits back to the scheduler 360 through the subroutine 450. The subroutine 450 requests the scheduler 360 to load the process control block (PCB6) with data that causes the program load process 366 to be re-entered at 445 when the process is again activated.

Referring particularly to FIGS. 1, 2, 15 and 25, the display update process 367 is entered from the scheduler 360 at 455 and when executed, it functions to assemble all data to be transmitted to the pendent control station 2 in a transmit buffer. A set of instructions indicated by decision block 456 are executed first to determine if any messages are to be displayed. This is accomplished by examining the contents of eight message command blocks into which any routine executed by the main processor may deposit a message command. Two message command blocks are reserved for operator alert messages, and the remaining six are reserved for machine status messages. Many of these are "canned" messages in which only a message number is transmitted to the front panel processor.

As indicated by process block 456, if a message command is present a set of instructions are executed to load the message into a "transmit buffer" and to set a XMIT flag. A set of instructions indicated by decision block 458 are then executed to determine if a new block of part program data has been transferred to the active interpolator buffer. If so, a set of instructions indicated by process block 459 are executed to assemble and load into the transmit buffer data relevant to the new part program block such as M, G, F, S & T words and G92 offsets. Then, as indicated by decision block 460, the status of a 250 millisecond clock is checked to determine if it has timed out. If it has, instructions indicated by process block 461 are executed to load axis position data, axis following error data, endpoint data and offset data into the transmit buffer. This data is continuously changing and it is transmitted only four times per second to the pendent control station 2 so that the serial data link is not overloaded. When the 250 millisecond timer has not timed out as determined at decision block 460, the XMIT flag is checked at decision block 464 to determine if the contents of the transmit buffer are to be transmitted. If so, a communication routine is called as indicated by the process block 453, and the contents of the transmit buffer is output to the USART 37 and serially transmitted to the pendent control station 2 through the cable 9.

If no data is to be transmitted or when the transmission of the first byte of data is completed, the system exits back to the scheduler 360 through a subroutine 452 which loads the display update process control block (PCB7) with data that causes re-entry at point 455 when the process is reactivated.

It should be apparent from the above description that much of the burden of interfacing the main processor with I/O devices on the machine tool and with the pendent station peripheral devices is carried out respectively by the programmable interface processor and the front panel processor.

PROGRAMMABLE INTERFACE OPERATION

Referring particularly to FIGS. 1 and 3, the programmable interface processor is programmed to operate as a programmable controller. Macroinstructions such as those employed in programmable controllers are stored in the random access memory 94 as a control program 464. These instructions are loaded into the memory 94 by an operator who uses the keyboard 18 on the program panel station 3. The macroinstructions are read into the microprocessor 85 from the USART 103 and then written into the random access memory 94 through the gates 97. The program loader routine for accomplishing this is stored in the read-only memory 88 and it is called up when the mode switch 200 (FIG. 6) is set to its "LOAD" position. The listing of the program loader routine is provided in Appendix A.

When executed the macroinstructions which form the control program 464 perform a number of well known functions, including examining the state of selected bits in the programmable interface image table 106 and the I/O image table 107. Logical operations are performed by some macro-instructions and others set the state of selected bits in the image tables 106 and 107 in accordance with the results of the logical operations. The macroinstruction set is essentially the same as that described in U.S. Pat. No. 3,942,158 entitled "Programmable Logic Controller" which includes three general types: bit instructions; word instructions; and control instructions. Bit instructions and word instructions are stored on two memory lines, the first line storing an operation code and three bits of a bit pointer code and the second line storing an operand address. The control instructions are comprised solely of an operation code. The bit instructions include the following:

| MNEMONIC | BIT POINTER | | | OPERATION CODE | | | | |
|---|---|---|---|---|---|---|---|---|
| XIC/XOE | X | X | X | 0 | 1 | 0 | 1 | 1 |
| XIO/XOD | X | X | X | 1 | 1 | 0 | 1 | 1 |
| OTU | X | X | X | 1 | 0 | 1 | 1 | 1 |
| OTL | X | X | X | 0 | 0 | 1 | 1 | 1 |
| OTD | X | X | X | 1 | 1 | 1 | 1 | 1 |
| OTE | X | X | X | 0 | 1 | 1 | 1 | 1 |
| INSTRUCTION BIT NUMBER | 0 | 1 | 2 | 3 | 4 | 5 | 6 | 7 |

The operations performed by these bit instructions are briefly defined as follows:

XIC—Examine status bit closed or, is the selected bit in the image table in a logic 1 state?

XOE—Same as XIC, but refers to a status bit in the image table corresponding to an operating device.

XIO—Examine status bit open or, is the selected bit in the image table in a logic 0 state?

XOD—Same as XIO, but refers to a status bit in the image table corresponding to an operating device.

OTU—If conditions are true turn status bit off, or to a logic 0 state, and if false do nothing.

OTL—If conditions are true turn status bit on, or to a logic 1 state, and if false do nothing.

OTE—If conditions are true turn status bit on and if conditions are false turn status bit off.

The operand address which is associated with each of the above operation codes identifies the memory address of the image table word containing the selected status bit whereas the bit pointer associated with the operation code identifies the location of the status bit in the addressed image table word.

The control instructions include the following:

| MNEMONIC | OPERATION CODE | | | | | | |
|---|---|---|---|---|---|---|---|
| NOP | X | 0 | 0 | 0 | 0 | 0 | 0 |
| BND | X | X | X | 0 | 0 | 0 | 1 | 1 |
| BST | X | X | X | 1 | 0 | 0 | 1 | 1 |
| MCR | X | X | X | 1 | 1 | 1 | 0 | 1 |
| END | 0 | 0 | 1 | 0 | 0 | 1 | 0 | 0 |
| INSTRUCTION BIT NUMBER | 0 | 1 | 2 | 3 | 4 | 5 | 6 | 7 |

Note: X Signifies "don't care"

The operations performed by these control instructions are briefly defined as follows:

NOP—No operation

BND—Branch end: termination of a Boolean sub-branch

BST—Branch start: opens or begins a Boolean sub-branch

END—End of the control program

MCR—Operate master control bit

The word type programmable controller instructions include the following:

| MNEMONIC | OPERATION CODE | | | | | | |
|---|---|---|---|---|---|---|---|
| TOF 0.1 sec. | 0 | 0 | 0 | 1 | 0 | 0 | 0 | 0 |
| TOF 1.0 sec. | 0 | 1 | 0 | 1 | 0 | 0 | 0 | 0 |
| TON 0.1 sec. | 0 | 0 | 1 | 1 | 0 | 0 | 0 | 0 |
| TON 1.0 sec. | 0 | 1 | 1 | 1 | 0 | 0 | 0 | 0 |
| RTO 0.1 sec. | 0 | 0 | 0 | 0 | 1 | 0 | 0 | 0 |
| RTO 1.0 sec. | 0 | 1 | 0 | 0 | 1 | 0 | 0 | 0 |
| CTD | 0 | 1 | 1 | 0 | 1 | 0 | 0 | 0 |
| CTU | 0 | 0 | 1 | 0 | 1 | 0 | 0 | 0 |
| RTR | 0 | 1 | 0 | 0 | 0 | 1 | 0 | 0 |
| CTR | 0 | 0 | 0 | 0 | 0 | 1 | 0 | 0 |
| PUT | 0 | 1 | 0 | 1 | 1 | 0 | 0 | 0 |
| GET | 0 | 0 | 0 | 1 | 1 | 0 | 0 | 0 |
| EQU | 0 | 0 | 1 | 1 | 1 | 0 | 0 | 0 |
| LES | 0 | 1 | 1 | 1 | 1 | 0 | 0 | 0 |
| INSTRUCTION BIT NUMBER | 0 | 1 | 2 | 3 | 4 | 5 | 6 | 7 |

The operations performed by these word-type instructions are briefly defined as follows:

TOF—If conditions are true turn output status bit on, otherwise, wait until time is out then turn it off.

TON—If conditions are true wait until time is out then turn output status bit on, otherwise, turn if off.

RTO—If conditions are true wait until time is out then turn output status bit on, otherwise, stop timer.

CTD—If conditions are true reduce the count by one.

CTU—If conditions are true increase the count by one.

PUT—If conditions are true write the number in the microprocessor accumulator in the selected memory line, otherwise, do nothing.

RTR—If the conditions are true reset the timer.

CTR—If the conditions are true reset the counter.

GET—Fetch the word on the selected memory line and store in the microprocessor accumulator.

EQU—Is the value stored in the microprocessor accumulator equal to the value stored on the selected memory line?

LES—Is the value stored in the microprocessor accumulator less than the value stored on the selected memory line?

The operand address which is associated with each of these word-type operation codes is an eight-bit address of a memory line in the random access memory 94.

The user develops a control program using these macroinstructions. Such a program includes instructions which examine the state of the programmable interface image table 106 to determine whether an auxiliary function such as a tool change or pallet change has been indicated by the part program being processed by the main processor. It also includes instructions which examine the status of selected locations in the I/O image table 107 to determine whether sensing devices on the machine tool such as limit switches are in the proper state to allow a tool change or pallet change to occur. The B register in the microprocessor 85 is used to store the result of such examination instructions, and when conditions are proper, other control program instructions set the state of the appropriate bit in the I/O image table 107. When the I/O image table 107 is subsequently output to the I/O interface circuit 8, the appropriate operating device is thus energized or deenergized to carry out the indicated function.

For each of the macroinstruction operation codes there is stored in the read-only memory 88 a macroinstruction interpreter routine. When the programmable interface mode switch 200 is in its "RUN" position, the microprocessor 85 repeatedly executes a FETCH routine that sequentially reads the control program macroinstructions out of the memory 94. Each macroinstruction operation code is converted by the mapping prom 100 to a number which indicates the starting address of its macroinstruction interpreter routine. The system jumps to the indicated macroinstruction interpreter routine and executes it to perform one of the functions listed above. Each interpreter routine is comprised of a set of machine instructions selected from the Z-80 microprocessor instruction set. The FETCH routine is as follows:

| LABEL | INSTRUCTION | | DESCRIPTION |
|---|---|---|---|
| FETCH | MACR | | Get next macroinstruction |
| | POP | HL | from control program and |
| | LD | E,L | map to start of indicated |
| | LD | L,H | macroinstruction interpreter |
| | LD | H,C | routine. |
| | JP | (HL) | |
| | ENDM | | |
| NEWFE | MACR | | Reset microprocessor B |
| | DI | | register to start new "rung." |
| | LD | A,0FOH | |
| | AND | B | |
| | LD | B,A | |
| | SET | O,B | |
| | EI | | |
| | FETCH | | |
| | ENDM | | |
| FORM | MACR | | |

-continued

| LABEL | INSTRUCTION | | DESCRIPTION |
|---|---|---|---|
| | LD | L,E | Form operand address in H |
| | LD | H,D | and L registers from macro- |
| | ENDM | | instruction operand. |

The macroinstruction execution routines for a number of representative programmable controller instructions are listed below.

| LABEL | INSTRUCTION | | DESCRIPTION |
|---|---|---|---|
| XIC | MACR | #BTA | XIC instruction. |
| | LD | A,(DE) | Load image table word in microprocessor A register. |
| | BIT | #BTA,A | Test the selected bit 0-7. |
| | JR | NZ, A#SYM-$ | Jump if selected bit is 1, otherwise, reset rung |
| | RES | 0,B | status register (i.e., microprocessor B register) to zero. |
| A#SYM | FETCH | | Fetch next macroinstruction. |
| | ENDM | | |
| OTE | MACR | #BTE | OTE macro-instruction. |
| | FORM | | Get line from image table. |
| | BIT | 4,B | Test master control bit. |
| | JR | Z, E#SYM-$ | Jump if master control bit is off. |
| | BIT | 0,B | Test rung status bit. |
| | JR | Z, E#SYM-$ | Jump is rung status bit is zero. |
| | SET | #BTE,(HL) | Set addressed bit and write status word back into image table. |
| | NEWFE | | |
| E#SYM | RES | #BTE,(HL) | Reset addressed bit and write status word back into image table. |
| | NEWFE | | GOTO Fetch routine. |
| | ENDM | | |
| BST | DI | | BST instruction. |
| | BIT | 3,B | Test status bit 3 in B register. |
| | JR | Z,BST2-$ | If zero, jump to BST 2. |
| | LD | A,B | |
| | RLA | | Replace bit 2 of B register |
| | RLA | | with bit O ORED with bit 2 |
| | AND | 04H | of B register. |
| | OR | B | |
| BST1 | LD | B,A | |
| | SET | 0,B | |
| | EI | | |
| | FETCH | | |
| BST2 | LD | A,B | |
| | RLA | | |
| | AND | 02H | |
| | OR | B | |
| | SET | 3,A | |
| | JR | BST1-$ | |
| TON10 | LD | A,(STATP) | Read the |
| | JR | TON-$ | clock |
| TON01 | LD | A,(STATP) | status. |
| | RRA | | |
| TON | DI | | |
| | BIT | 4,B | Check master control. |
| | JR | Z,TON6-$ | |
| | BIT | 0,B | Check rung status. |
| | JR | Z,TON6-$ | |
| TON1 | AND | 01H | Store clock status |
| | LD | C,A | in C. |
| | INC | E | |
| | LD | A,(DE) | Get Hi-byte of timer |
| | AND | 0FH | and mask off |
| | FORM | | status bits. |
| | DEC | E | |
| | INC | L | |
| | INC | L | |
| | CP | (HL) | Compare with preset |
| | JP | M,TON5 | hi-byte. |
| | JR | NZ,TON2-$ | |

-continued

| LABEL | INSTRUCTION | | DESCRIPTION |
|---|---|---|---|
| | LD | A,(DE) | Compare timer and |
| | DEC | L | preset lo-byte |
| | CP | (HL) | if hi-bytes are |
| | JR | C,TON5-$ | equal. |
| TON2 | INC | E | Get timer hi-byte. |
| | LD | A,(DE) | |
| | SET | 5,A | Set timer status bit 15. |
| TON3 | SET | 7,A | Set timer status bit 17. |
| | LD | (DE),A | Put timer hi-byte back. |
| | LD | C,INTH | Restore C reg. |
| TON4 | SET | 0,B | Set rung status for |
| | EI | | next instruction. |
| | NEWFE | | |
| TON5 | LD | A,(DE) | Determine if clock |
| | XOR | C | status has changed |
| | AND | 01H | since last read. |
| | LD | C,A | |
| | LD | A,(DE) | Increment timer if clock |
| | ADD | C | status has changed. |
| | DAA | | |

Figure 5:
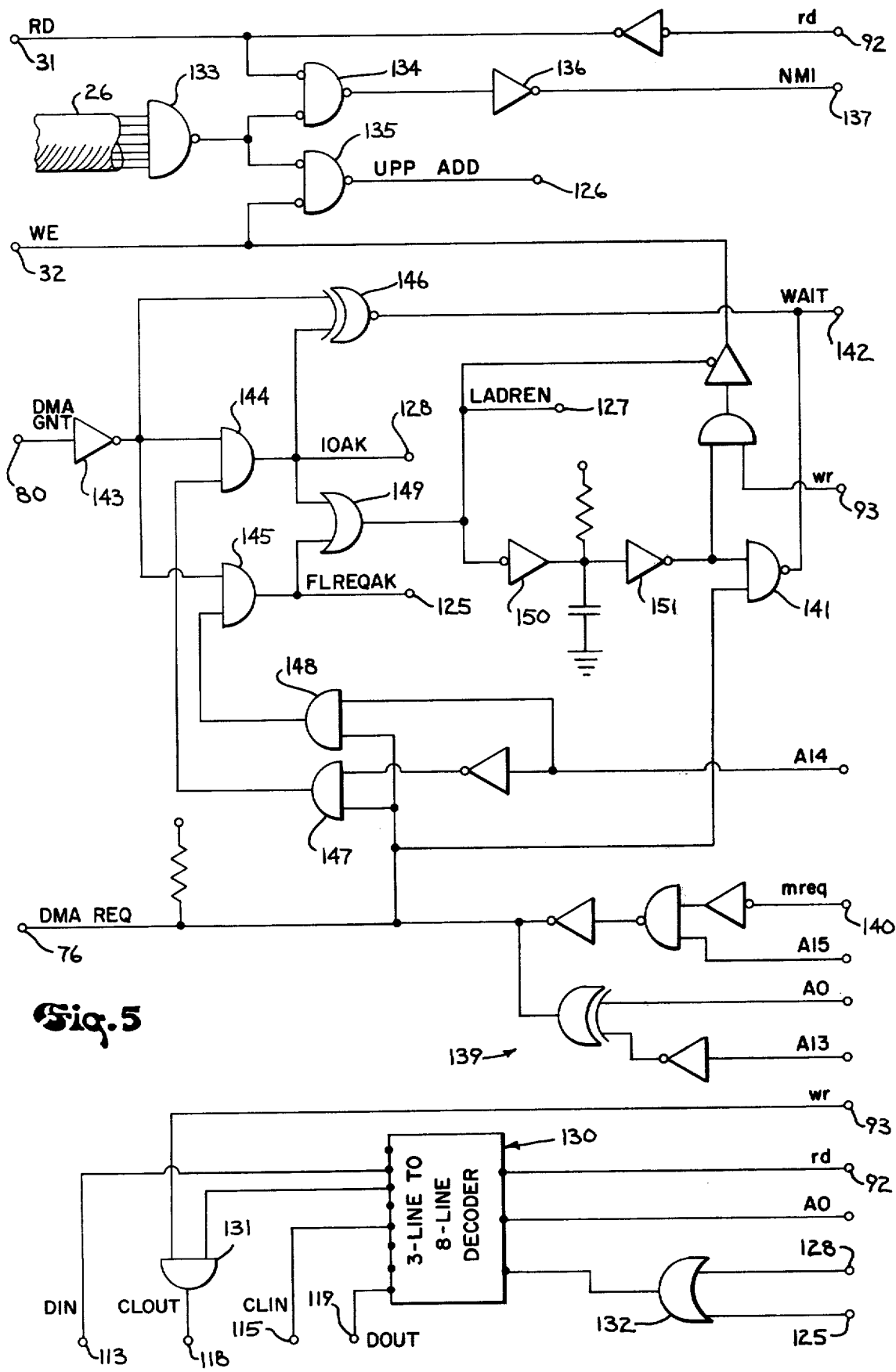
FIG. 5 is an electrical schematic diagram of the decoding and control circuit which forms part of the DMA circuit of FIG. 4.

The execution of the control program 464, the coupling of data between the image tables, the main processor and the I/O interface circuit 8 are synchronized with the operation of the main processor. Referring particularly to FIGS. 3 and 5, at the beginning of each 25.6 millisecond iteration period the main processor, as part of the timed interrupt process, addresses the NAND gate 133 in the DMA decoding and control circuit 114. This generates an interrupt signal on the NMI control line 137 which is applied to the microprocessor 85.

Figure 26A:
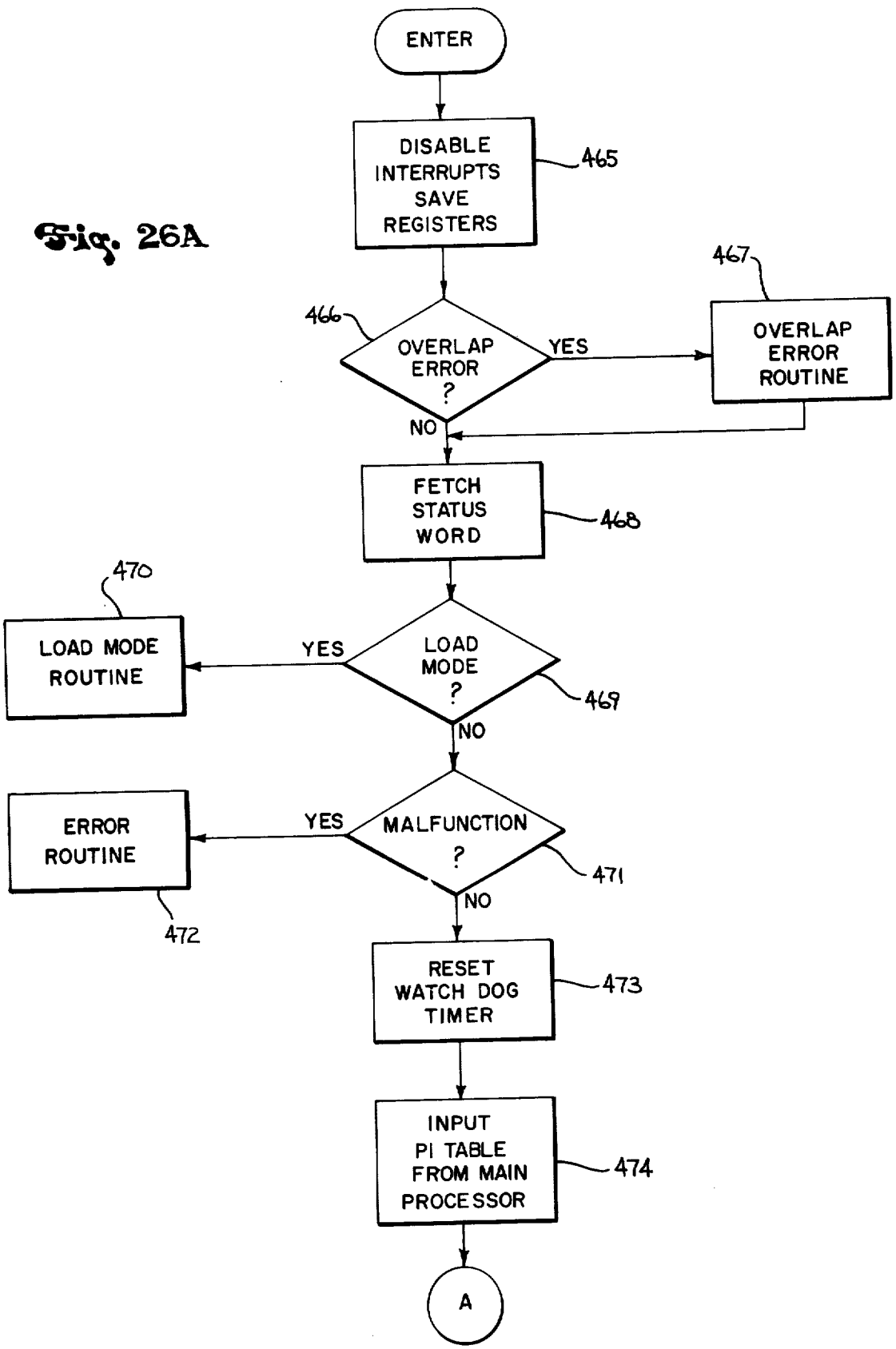
FIGS. 26A and 26B is a flow chart of the programmable interface processor operating system.

Referring to FIG. 26, the microprocessor 85 responds to this interrupt by executing an NMI service routine. A listing of this routine is provided in Appendix B and it includes a set of instructions indicated collectively by a process block 465 which when executed disable further interrupts and save the contents of the microprocessor registers. Bit 7 in the microprocessor B register is then examined as indicated by decision block 466 to determine if the overlap bit has been reset. If not, an error has occurred and the system branches to an overlap error routine indicated by process block 467, which stores an overlap error flag for later transmission to the main processor. When received by the main processor such an overlap error flag causes a message to be output to the display on the pendent station 2 as described above.

The status word is input next from the gates 175 (see FIG. 6) as indicated by process block 468, and the contents are examined to determine if the system is in the LOAD mode or if a major error has occurred. If the system is in the LOAD mode as determined by decision block 469, the system branches to a load mode routine indicated by process block 470. If an error has occurred as determined by decision block 471, the system branches to an error routine indicated by process block 472, which checks to determine if the malfunction is on the programmable interface board 6 or elsewhere in the system. If the malfunction is on the programmable interface board 6, remedial action as described in copending patent application Ser. No. 971,593 entitled "Programmable Controller With Data Archive" and filed on even date herewith is taken.

When the system is in the RUN mode and operating properly, the watchdog timer (i.e., monostable multivibrator 170 in FIG. 6) is reset next by an instruction indicated by process block 473 and a routine indicated by process block 474 is executed to input thirty-four 16-bit words from the main processor programmable interface (PI) table 105. These thirty-four words are stored as sixty-eight 8-bit words in the programmable interface processor image table 106. This data transfer is done using a block transfer instruction which addresses the main processor memory 29 through the DMA circuit 110, and sequentially reads thirty-four lines therefrom. Each such memory read operation requires less than two microseconds so that the main processor is not tied up for significant amounts of time.

Figure 26B:
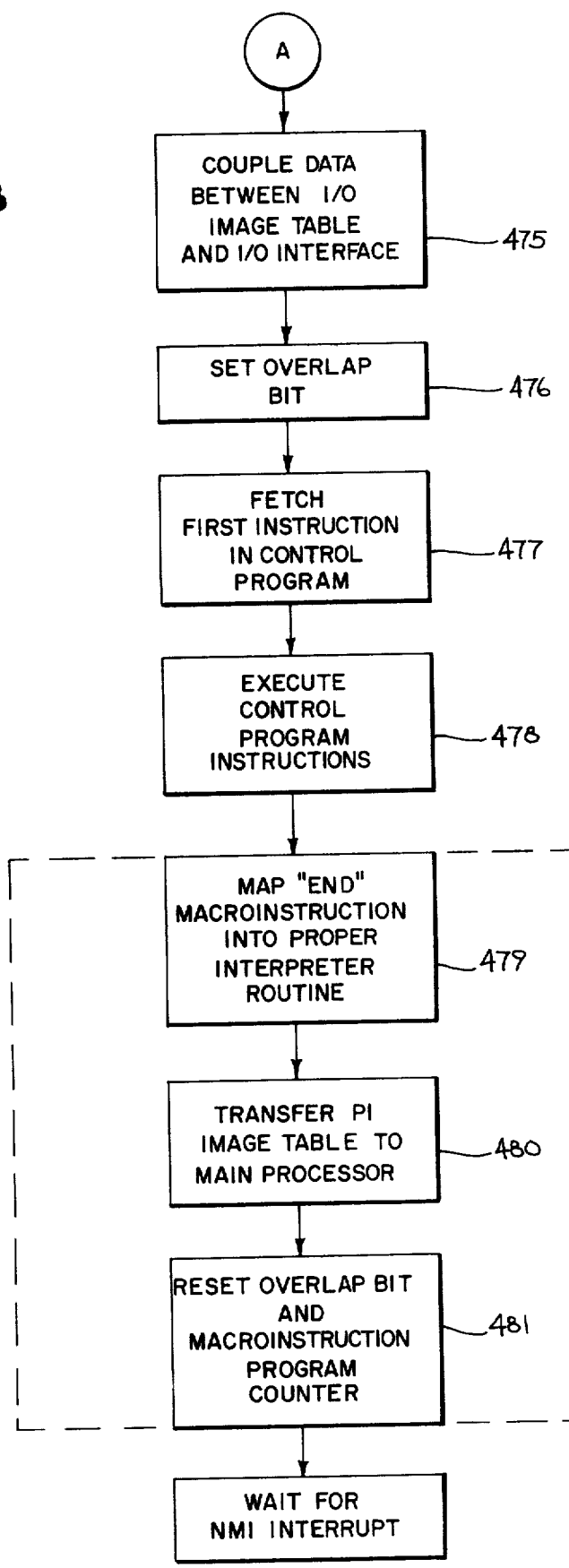

Following the receipt of data from the main processor PI image table 105, the programmable interface processor performs an I/O scan in which data is coupled between its I/O image table 107 and the I/O interface circuit 8. This is indicated in FIG. 26B by processor block 475, which includes instructions that sequentially read 8-bit words from the I/O image table 107 and couple them through the DMA circuit 110 to the main processor data bus 27. For each two of these 8-bit I/O image table words there is a corresponding 16-bit output circuit board to which the data is applied. Following the output scan an input scan is performed in which the I/O interface circuits 8 are sequentially addressed through the DMA circuit 110 and 16-bit data words indicating the state, or status, of discrete devices on the controlled machine are input. These 16-bit data words are each stored on two associated lines in the I/O image table 107. Although the amount of time the main processor is inactive during this DMA data transfer varies depending on the number of I/O devices being serviced, typically it requires less than two microseconds for each read and write operation involving the I/O interface circuits 8. The programmable interface circuit 75 thus places very little time burden on the main processor.

Referring again to FIG. 26B, after the I/O scan has been completed an overlap bit is set (i.e., Bit 7 in the microprocessor B register) as indicated by process block 476, and the system jumps to the FETCH routine as indicated by process block 477 to read out and execute the first macroinstruction in the control program. The servicing of the NMI interrupt is completed at this juncture and the programmable interface processor proceeds to sequentially execute the control program macroinstructions as indicated by process block 478.

Figure 28:
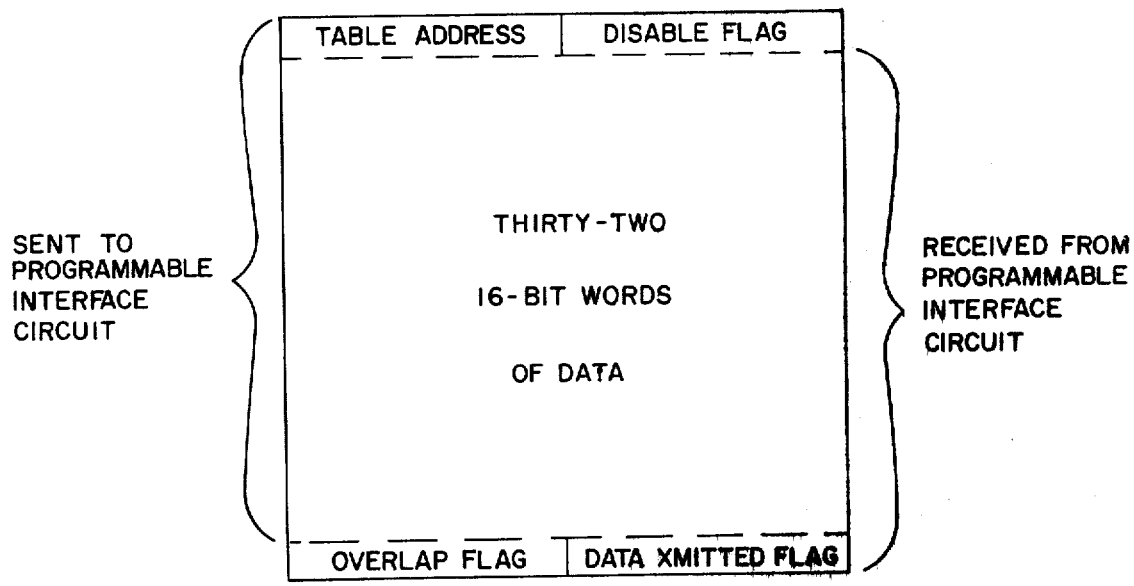
FIG. 28 is a schematic diagram illustrating the contents of the programmable interface image table which forms part of the system of FIG. 2.

Referring particularly to FIGS. 2, 3 and 26B, the last macroinstruction in the control program is an END macroinstruction. When this is fetched, it is mapped into its interpreter routine as indicated by process block 479. A listing of this routine is provided in Appendix C and one of the first functions of the END interpreter routine is to output sixty-eight 8-bit status words from the PI image table 106 to the main processor PI image table 105. Included with these status words is the "overlap" flag and the "data transmitted" flag as illustrated in FIG. 28. Direct memory access is requested from the main processor to perform this transfer and the transfer is accomplished using the block transfer instruction in the Zilog Z-80 microprocessor instruction set as indicated by process block 480. As indicated by process block 481, the overlap bit is then reset to indicate that the entire control program has been executed and the macroinstruction program counter (i.e., stack pointer) is reset to point at the first macroinstruction in the control program. The programmable interface processor then waits for the next NMI interrupt to occur during the next 25.6 millisecond iteration period.

It should be apparent from the above description that the programmable interface processor is operating in "parallel" with the main processor to execute the control program at the same time that the main processor is carrying out its many functions. When the numerical control system is in the RUN mode, the main processor is busy executing the timed interrupt process and the other processes listed in the schedule queue 368. The interpolation routine alone requires considerable main processor execution time, since considerable arithmetic calculations are required as illustrated in U.S. Pat. No. 3,728,528.

This parallel operation of the two processors is illustrated in FIG. 27. At the beginning of each iteration period, the main processor initiates the NMI interrupt with the programmable interface processor and then continues to execute the timed interrupt process. Meanwhile, in response to the NMI interrupt, the programmable interface processor starts transferring the PI image table contents from the main processor by sequentially requesting DMA and reading directly from the main processor memory 29. Shortly therefore, the programmable interface processor starts updating its I/O image table 107 by again requesting a sequence of DMA transfers from the main processor address space. It should be noted that although the data transferred during the I/O scan does not necessarily involve the main processor, the main processor data bus 27 and address bus 26 are employed and the operation of the main processor must, therefore, be suspended during this operation.

Referring still to FIG. 27, the programmable interface processor executes its control program following the I/O scan. The time it takes to perform this function depends on the length of the control program, but in no case does it extend into the next iteration period. If this should occur the overlap flag will not be reset and an error will be indicated to the main processor. When the programmble interface processor completes the execution of the control program, it makes a series of DMA requests from the main processor during which it transfers the contents of the programmable interface image table 106 to the main processor memory. The programmble interface processor then goes dormant for the remainder of the iteration period, but is reactivated to repeat the same cycle when the NMI interrupt is requested at the beginning of the next iteration period.

A variation of the preferred embodiment which would avoid suspending operation of the main processor during the I/O scan is possible. This variation requires that the I/O interface circuits 8 be connected to the programmable interface data bus 82 and address bus 83. The reason this alternative arrangement is not preferred, however, is that the programmable interface 75 of the preferred embodiment can be completely removed from the numerical control system and the main processor can be programmed to control the I/O interface circuits 8 directly. The programmable interface circuit 75 can thus be offered as an optional feature.

The advantages obtained by operating the programmable interface processor concurrently, or in parallel, with the main processor are many. First, the time burden on main processor is minimal. The main processor need not wait for the control program to be executed, but instead, can complete the execution of the timed interrupt process and attend to the other processes listed in the schedule queue 368. The only time burden imposed on the main processor is the three short periods during which DMA requests are granted to the programmable interface processor 75.

A second major advantage is the ease with which the programmable interface processor can be programmed by the user. Because the control program execution is removed from the main processor sequence, the only time constraint is that the control program be executed in less than 25.6 milliseconds. This is more than enough time to execute any reasonable control program, so that as a practical matter, there are no difficult time constraints on the user programmer. Also, because there is ample execution time available, programmable controller type instructions (i.e., macroinstructions) can be employed to develop the control program. These instructions are easily learned and understood by users in contrast to microprocessor machine language. These macroinstructions can be interpreted "on line" by the microprocessor 25 to carry out the required functions.

PENDENT CONTROL STATION OPERATION

Whereas the programmable interface processor interfaces the numerical control system with the discrete I/O devices on the machine tool, the front panel processor operates the peripheral devices which interface the numerical control system with the operator. As with the programmable interface processor, the front panel processor removes a considerable time burden from the main processor and it allows flexibility in the type and number of peripheral devices which are employed. The front panel processor also facilitates the addition of one further feature not found in prior numerical control systems, the peripheral devices can be assembled in a separate, remotely located pendent station.

Figure 29:
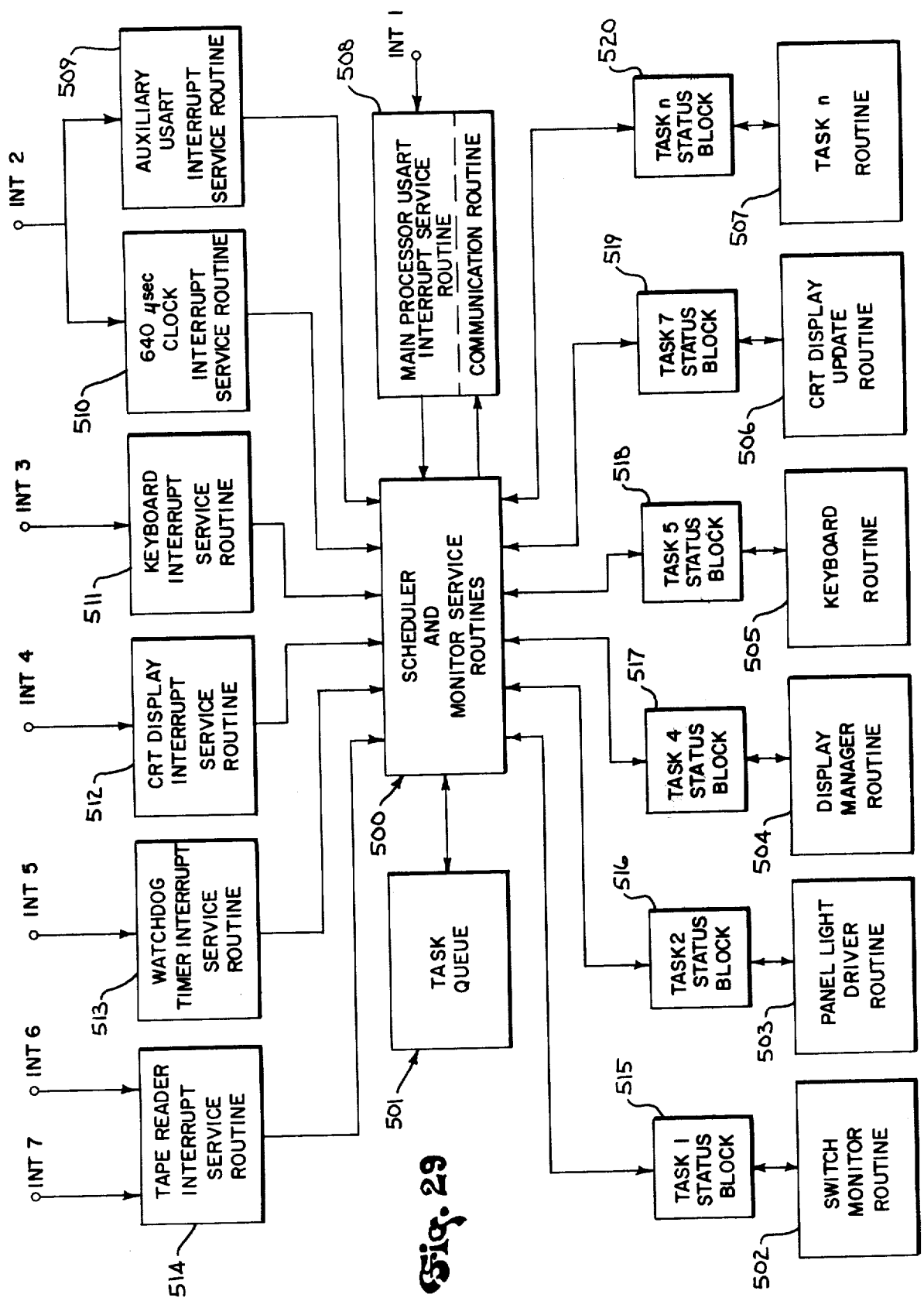
FIG. 29 is a schematic diagram of the front panel processor software system.

Referring particularly to FIG. 29, the front panel processor is an event-driven system which includes an operating system indicated at 500 which is comprised of a scheduler routine and a set of monitor service routines. The scheduler portion of the operating system 500 recognizes front panel processor events as they occur and in response to these events it selects tasks to be performed. When more than one task is capable of being executed at any point in time, the task with the highest priority is executed first. A list of such tasks along with their priority is stored in a task queue 501.

The number and nature of the tasks performed by the front panel processor may vary considerably depending on the particular options selected by the user. In the preferred embodiment illustrated in FIG. 29, these tasks include: a switch monitor routine 502; a panel light driver routine 503; a display manager routine 504; a keyboard routine 505; and a CRT display update routine 506. An additional task indicated at 507 and labeled "Task n Routine" is intended to illustrate that other tasks may also be executed by the front panel processor. Indeed, it is one of the major advantages of the front panel processor that it allows tasks to be added or removed from the system with little or no change to the operating system software.

The front panel processor operating system 500 recognizes eighteen different events. Many of these events are generated by the routines 502-507 as they execute their tasks and others are generated by the front panel processor hardware. Referring particularly to FIGS. 7 and 29, interrupts generated by the main processor USART 220, the auxiliary USART 294, the keyboard interface 235, the CRT interface 250 and the tape reader 297 are each linked to the scheduler by associated interrupt service routines. As explained previously, the microprocessor 221 is vectored to the proper interrupt service routine by the four-bit code generated on the bus 291 by the interrupt and I/O control circuit 243. More specifically, an interrupt on the INT1 control line vectors the microprocessor 221 to a main processor USART service routine indicated at 508, the interrupt generated on control line INT2 vectors into either an auxiliary USART interrupt service routine 509 or a 640 microsecond clock interrupt service routine 510. An interrupt generated on the control line INT3 vectors the microprocessor 221 to a keyboard interrupt service routine 511 and an interrupt generated on the INT4 line vectors the system to a CRT display interrupt service routine 512. An interrupt on the control line INT5 vectors the system to a watchdog timer interrupt service routine 513 and interrupts on the control lines INT6 and INT7 vector the system to a tape reader interrupt service routine 514.

The interrupt service routines 508-514 report to the scheduler in the operating system 500. These reports include a first number which indicates the event that has occurred, and a second number which identifies a specific related task. The scheduler uses these two numbers as indices into tables that define what is to happen next. The events which are recognized by the scheduler are listed in Table C.

TABLE C

| Event Number | Event Mnemonic | Reported by | Event Definition |
|---|---|---|---|
| 1 | EIC | 508 | Message received from main processor and acknowledged. |
| 2 | EOC | 508 | Message sent to main processor and acknowledgment received. |
| 3 | ENRI | 508 | Non-requested message from main processor to read data from front panel processor. |
| 4 | ESLP | 500 | Put identified task to sleep. |
| 5 | EWU | 510 | Wake up identified task. |
| 6 | EBFD | 500 | Block identified task until finished. |
| 7 | EIOW | 500 | Queue identified task for sending or receiving message from main processor. |
| 8 | ERK | 500 | Read request for keyboard received from main processor. |
| 9 | EKI | 511 | Keyboard character received. |
| 10 | EPN | 500 | Put identified task into null state. |
| 11 | EGN | 500 | Move task number from null queue into task queue 501. |
| 12 | ECOD | 500 | Open or close completed. |
| 13 | EWCO | 500 | Wait for open or close to be completed. |
| 14 | ERRQ | 500 | Read request received. |
| 15 | ERDI | 500 | Read a display command from main processor. |

The front panel processor is a finite state machine and accordingly, the tasks performed by the routines 502-507 are each in a defined state at any time. These states are as follows:

SCPT—The task is currently being carried out by the front panel processor.

SEXT—The task is listed in the task queue 501 awaiting processor time.

SSLP—The task is "asleep" waiting for a preset amount of time to pass.

SIOW—The task is waiting for an I/O operation to be completed.

SNUL—The task is awaiting activation by an event which identifies the task. Various events can activate the task from this state.

It is, of course, the function of the scheduler to recognize the defined events as they occur and to place the various tasks in the proper state. For example, every time the CRT display 17 generates a vertical retrace signal the microprocessor 221 is interrupted through INT4 control line and the CRT display interrupt service routine 512 is executed. The purpose of this interrupt driven event is to initiate updating of the CRT display 17 with new data during the 3.1 millisecond vertical retrace period. It is the task of the CRT display update routine 507 to make the actual data transfer, and accordingly, it is the function of the scheduler to activate task number 7 when the CRT display interrupt service routine 512 reports its event. This is accomplished by loading the task number (i.e., 7) into the task queue 501 where it will be executed when higher priority tasks listed in the task queue are completed. In response to the vertical retrace event therefore, task 7 is changed from the SNUL state to the SEXT state.

When task 7 becomes the highest priority task in the queue 501 and the previous task has been completed or blocked, the CRT display update routine 506 is activated by the scheduler and executed (i.e., task 7 state changed from SEXT to SCPT).

It should be apparent from the above description that tasks are moved from state to state by the scheduler in response to events reported on the task. The state changes which occur are outlined in the state-event table of FIG. 30.

Referring to FIGS. 29 and 32, a task may be activated (i.e., put in SCPT state) and only partially executed before being deactivated (i.e., put in SSLP, SIOW or SNUL state). In no case is a task allowed to execute more than five milliseconds at one time, and typically, its execution is either interrupted by an event or the task blocks itself while waiting for an I/O operation to occur. Accordingly, task status blocks 515–520 are stored in the front panel processor memory 226 and are associated respectively with the task routines 502–507. The contents of such a task status block is illustrated in FIG. 32.

It is through these task status blocks that the operating system 500 communicates with the task routines. For example, when a particular task is placed in the SEXT state the first line of its associated task status block is written into the task queue 501. This first line includes not only the task number, but also the priority level of that task. When the task is subsequently activated by the scheduler (i.e., placed in SCPT state) the microprocessor workspace pointer, program counter and status register are preset to the contents of words 5, 6 and 7 of the task status block. The task is thus entered at the proper point. When the task is subsequently deactivated by either itself or the operating system, these same three lines in the task status block are reloaded with current data so that the "task environment" is preserved for later re-entry.

If a task deactivates itself, it may also set an inhibit bit in word 1 of the task status block to prevent the task from being re-entered until an indicated event occurs. Such an event is recognized by the scheduler which responds by placing the task in the proper state. The inhibit bits in word 1 of the task status blocks are as follows:

Bit 0—inhibit blocking

Bit 1—wait for I/O event (i.e., EIC)
Bit 2—wait for I/O event (i.e., EOC)
Bit 3—waiting for close
Bit 4—waiting for open
Bit 5—waiting for memory buffer space allocation The front panel processor operating system 500 is designed for maximum flexibility since the type and number of peripheral devices associated with the pendent control station 2 will vary considerably according to user requirements. When the CRT display 17 is changed, for example, the display manager routine 504, the CRT display update routine 506 and the CRT display interrupt service routine 512 may need alteration due to hardware differences. The remainder of the operating system remains unchanged. The priority in which tasks are executed can easily be changed by altering the priority numbers stored in the task status blocks.

Figure 33:
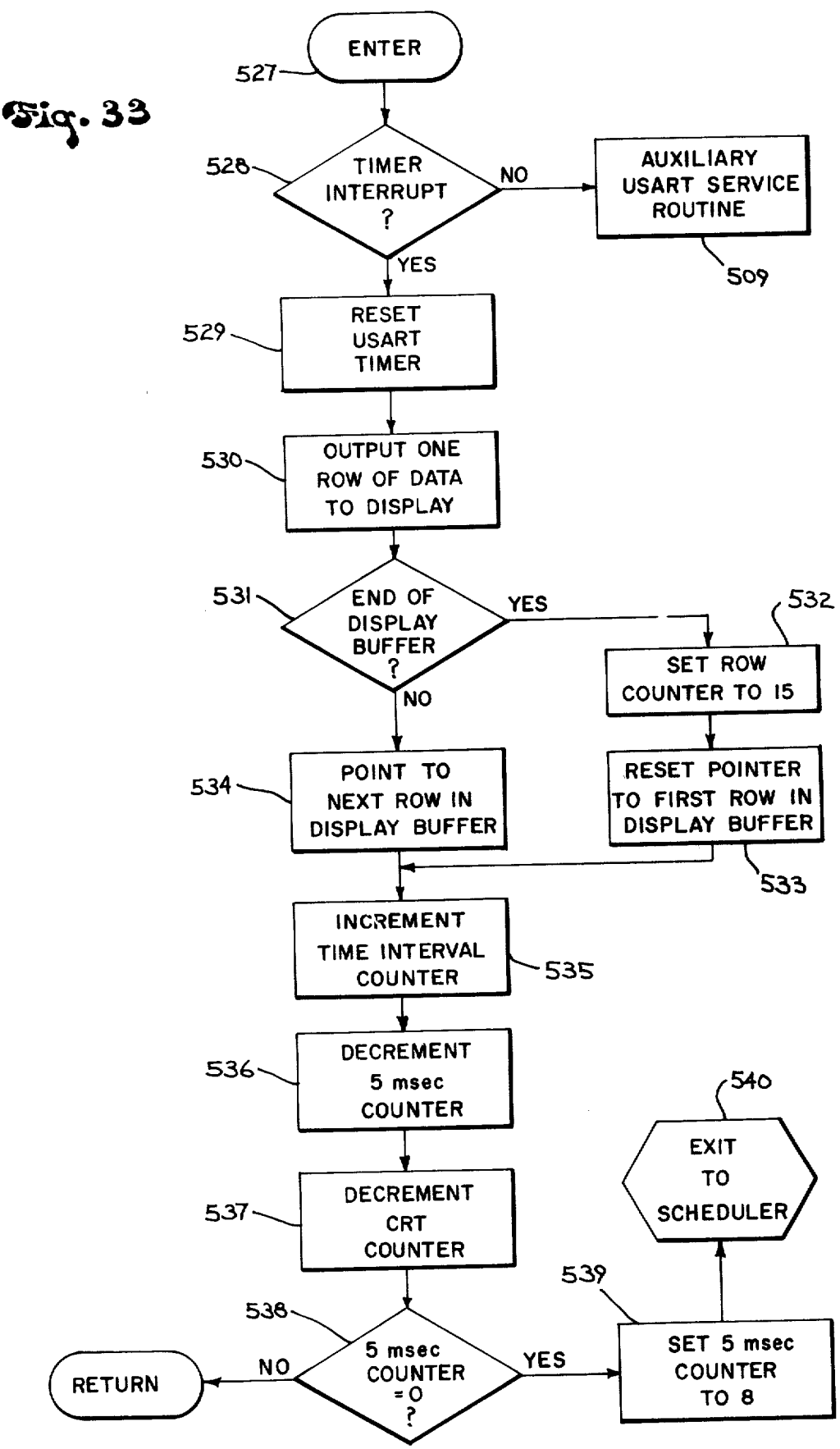
FIG. 33 is a flow chart of the clock interrupt service routine which forms part of the system of FIG. 29.

Referring particularly to FIGS. 7, 29 and 33, there are a number of operations performed by the front panel processor that are time dependent. These include, for example, scanning the state of the front panel switches 15, updating the display 16, and determining the end of the CRT vertical retrace period. Accordingly, the auxiliary USART 294 has been initialized to provide an interrupt at 640 microsecond time intervals on the INT2 control line. This interrupt vectors the microprocessor 221 to the 640 microsecond clock interrupt service routine 510 which is executed to update a number of system clocks.

Referring particularly to FIGS. 7 and 33, the clock interrupt service routine 510 is entered at 527 and the auxiliary USART 294 is checked to determine if the timer caused the interrupt. If not, as determined by decision block 528, the auxiliary USART interrupt service routine 509 is executed. If the timer caused the interrupt, it is then reset as indicated by process block 529 and instructions are executed as indicated by process block 530 to output one 36-bit row of data to the alpha-numeric display 16. This data is stored in a display buffer contained in the RAM 226. There are fourteen rows of display data stored in this buffer and a row pointer is employed to keep track of which data is to be output. As indicated by decision block 531, when a row counter is decremented to zero, the last line in the display buffer has been output and the counter is reset to fifteen as indicated by process block 532 and the pointer is reset to point at the first row in the display buffer, as indicated by process block 533. Otherwise, the row pointer is incremented to point to the next row and the row counter is decremented as indicated by process block 534.

Three time counters are then updated to reflect the additional 640 microsecond time interval. First, as indicated by process block 535, a time interval counter is incremented. Then, a 5 millisecond counter is decremented as indicated by process block 536, and finally, a CRT counter is decremented as indicated by process block 537. The 5 millisecond counter is preset to eight so that when it is counted down to zero, as determined by decision block 538, 5 milliseconds have transpired. The CRT counter is preset to five so that when it is counted down to zero, 3.2 milliseconds have transpired. The CRT counter is preset by the CRT display interrupt service routine at the beginning of each vertical retrace period and it serves, therefore, to determine the time interval during which the CRT display 17 can be updated with new data.

The five millisecond time interval measured by the 5 millisecond counter is required by a number of tasks in the system and this time interval will be referred to hereinafter as one "TIC." When a TIC has occurred, as determined by decision block 538, the 5 millisecond counter is reset to eight as indicated by process block 539 and the event is reported to the scheduler as indicated at 540. Otherwise, the system returns immediately to the routine which was interrupted.

The scheduler responds to this event by "queueing up" any tasks that were put to sleep for a finite number of TICs and that are now ready to be awakened. This procedure occurs every 50 milliseconds, for example, with the switch monitor routine 502. Line five of the task status block 515 for this routine is set with a specific number of TICs and these are counted down by the scheduler as the five millisecond events occur. When line five is counted down to zero, the switch monitor routine 502 is queued up by writing its task number and priority number (i.e., line one of the task status block 515) into the task queue 501.

Figure 34A:
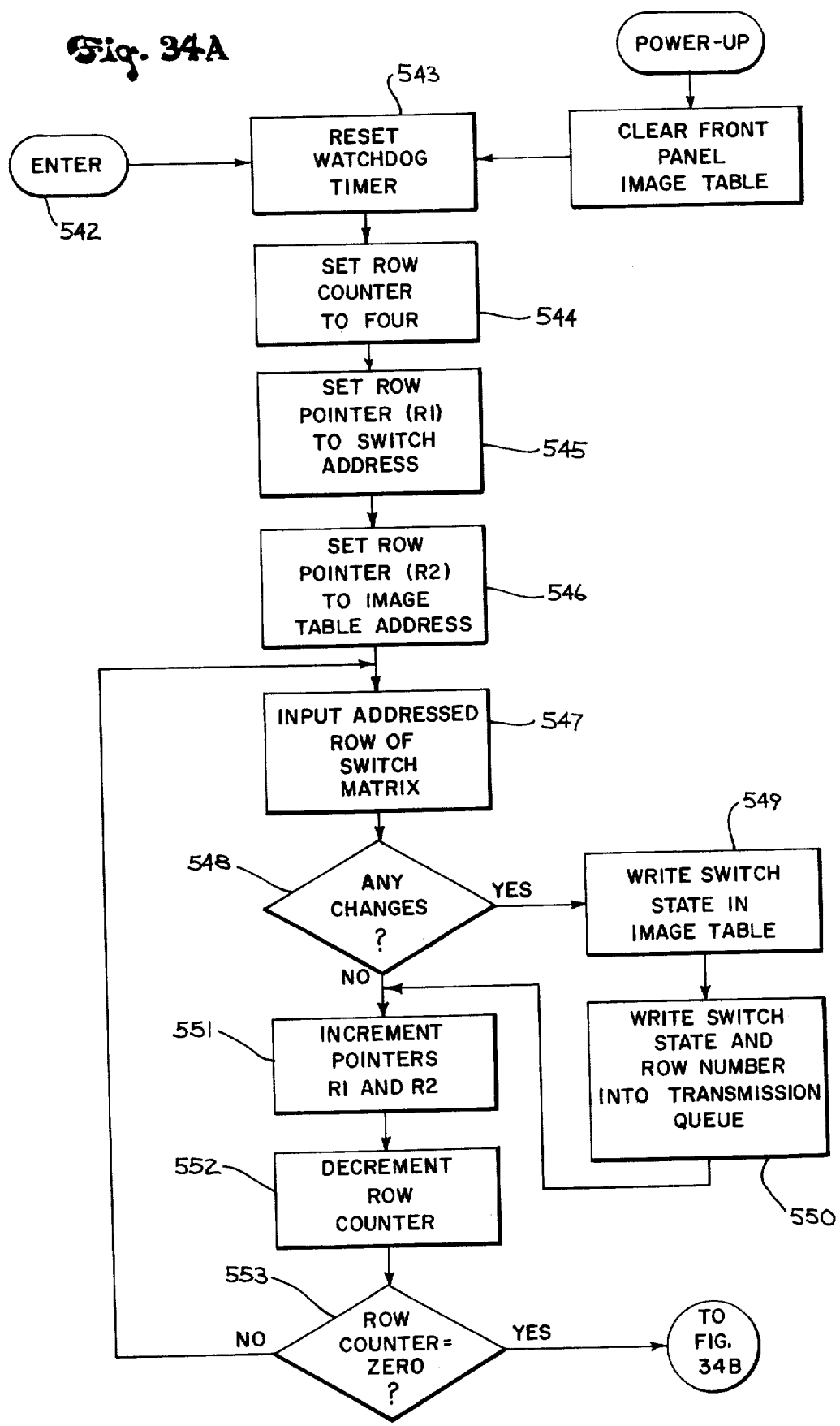
FIGS. 34A and 34B is a flow chart of the switch monitor routine which forms part of the system of FIG. 29.

Referring to FIG. 34, when the switch montior task is thus awakened and then placed in the MCPT state by the scheduler, the routine 502 is executed to scan the front panel switches 15 and report any changes to the main processor. The routine is entered at 542 and the first function it performs is to reset the watchdog timer 325 (FIG. 10) as indicated by process block 543. As indicated by process block 544, a row counter is then set to "four," which is the number of rows in the switch matrix (FIG. 13) and the number of rows in the front panel image table 233 (FIG. 7). A row pointer (R1) is then set to the address of the first row in the switch matrix, as indicated by process block 545, and a row pointer (R2) is set to the address of the first line in the front panel image table 233, as indicated by process block 546.

The state of the first switch matrix row is then input to the microprocessor 221 as indicated by process block 547 and it is compared with the first row of the front panel image table 233. If any changes have occurred in the state of the switches 15 since the previous scan, as determined at decision block 548, the new switch state is written into the front panel image table 223 as indicated by process block 549. As indicated by process block 550, the new 16-bit switch state word is then written into a task transmission queue along with its row number (1 to 4). A three-byte message is thus formed for transmission through the serial data link to update the front panel image table 444 in the main processor (FIG. 2).

All four rows of the switch matrix are sequentially compared with the corresponding rows in the front panel image table 223. After each row is compared, the row pointers R1 and R2 are incremented as indicated by process block 551, the row counter is decremented as indicated by process block 552, and a test is made at decision block 553 to determine whether all four rows have been examined for changes. When all four rows have been examined, the front panel image table 233 in the front panel processor has been updated with any changes that have occurred in the front panel switches 15 during the previous 50 millisecond time period and these changes have been stored in a task transmission queue portion of the front panel processor RAM 226.

Figure 34B:
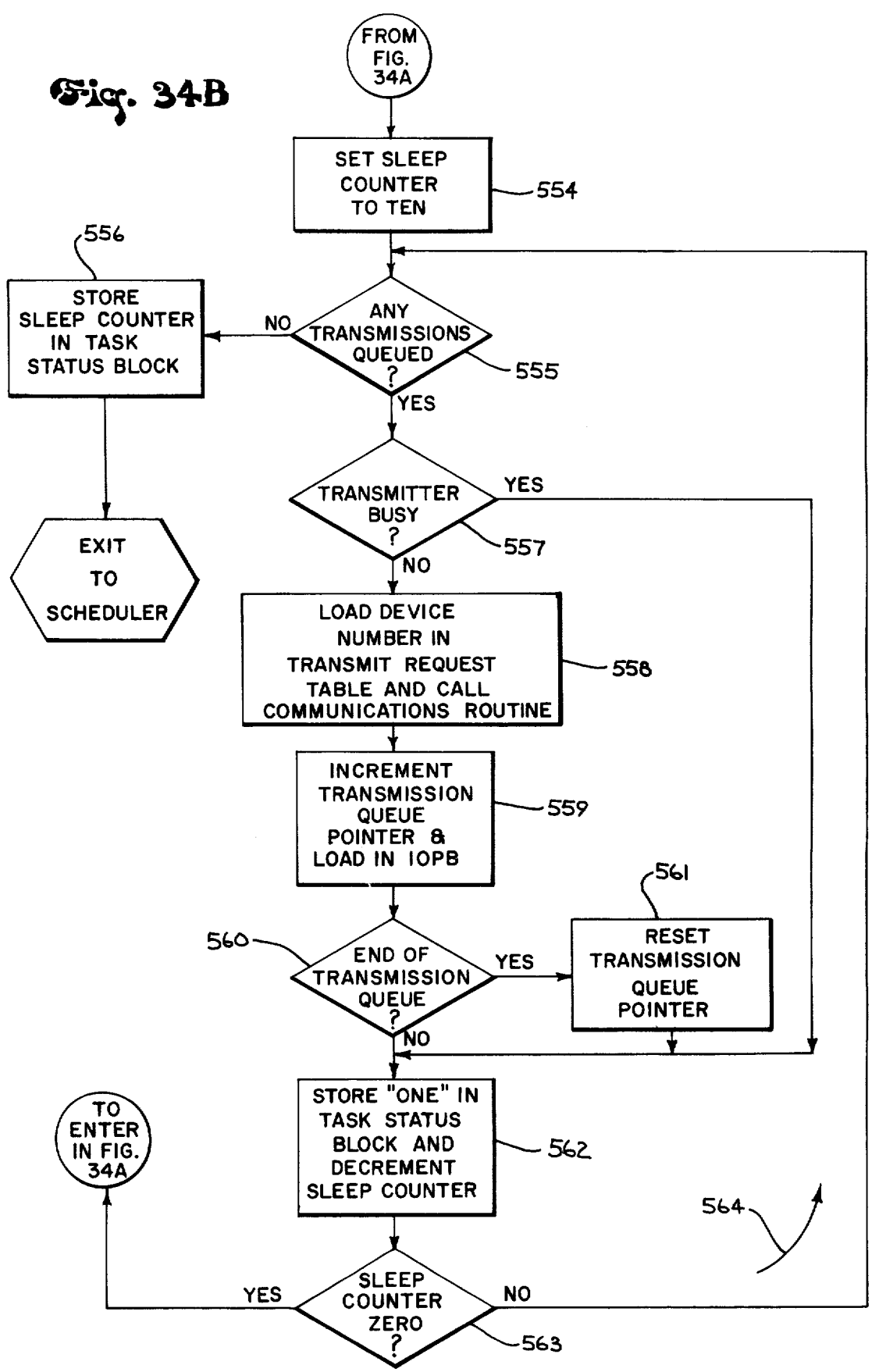

Referring particularly to FIG. 34B, the switch monitor routine 502 then operates to update the main processor by transmitting the changes through the cable 9. A "sleep" counter is first set to ten (10×5 msec.=50 msec.) as indicated by process block 554, and the task transmission queue is checked at decision block 555 to determine if any updating is necessary. If not, the system branches back to the scheduler through a set of instructions indicated by process block 556 which store the sleep counter contents in word five of the task status block 515.

If changes are to be transmitted, a "busy" flag associated with the communications routine is first checked to determine if a message transmission is presently taking place, as indicated at decision block 557. If not, the device code for the switch monitor is loaded into the transmit request table and the communication routine 558 is called up and executed to initiate the transmission of the first three character text. Upon return from the communication routine, the system increments a transmission queue pointer as indicated by process block 559 to point to the next three bytes of data in the transmission queue and the new value is loaded into an IOPB memory location where it is used by the communication routine. If the end of the transmission queue has been reached as indicated at decision block 560, the pointer is reset as indicated by process block 561 to the top of the switch monitor transmission queue.

The switch monitor routine then puts itself to sleep for five milliseconds, during which time the communication routine transmits three bytes of data from the transmission queue. This is accomplished at process block 562 which includes instructions that load a "one" into line five of the task status block 515 and then decrements the sleep counter by one. The system then exits to the scheduler after lines six, seven and eight of the task status block 515 are loaded with data which direct the system to re-enter the switch monitor routine at decision block 563 when five milliseconds expires.

Upon re-entry, the sleep counter is examined to determine if it has been decremented to zero at decision block 563. If it has, the system branches back to the start of the routine to perform the next scan of the front panel switches 15. Normally, however, the system loops back to decision block 555 to determine if further updates need to be transmitted. This loop, indicated by arrow 564, may be repeated a number of times and is usually exited at decision block 555 back to the scheduler for the remainder of the fifty millisecond scan period.

Other tasks in the front panel processor operate in a similar manner to input data from a peripheral device, write the data into a task transmission queue, and then call up the communication routine to transmit that data to the main processor. It is in this manner, for example, that data is input to the main processor from both the keyboard 14 and a tape reader.

OPERATION OF THE SERIAL DATA LINK

The serial data link between the main processor and the pendent control station is a full duplex RS-232 data link. The management of the data communications is performed by a communications software module which is comprised of a USART interrupt service routine and a communication routine. The communications software module is substantially the same at both the main processor and the front panel processor.

The primary purpose of the communication software module is to establish a protocol which the main processor and the front panel processor adhere to when commands or messages are communicated between them. The communications software module also receives requests to transmit messages from resident processes or tasks, it transmits the message using the proper protocal, and it reports back to the requesting process or task when the transmission is complete. The communications module also receives messages through the serial data link, stores them in data buffers which are set up by the resident task or process, and notifies the resident task or process that reception is complete or that a transmission error has occurred.

Figure 31:
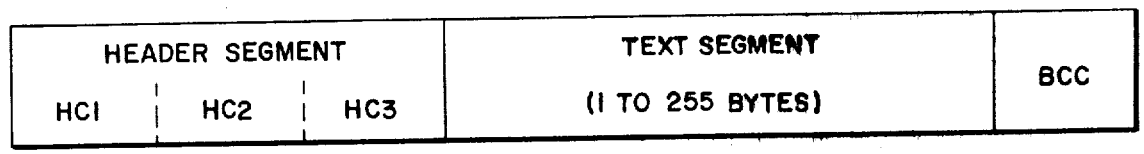
FIG. 31 is a schematic illustration of the format of a message conveyed over the serial data link.

Referring particularly to FIG. 31, a message conveyed across the data link consists of a header segment, a text segment and a block check character (BCC). The header segment consists of three bytes designated herein HC1, HC2 and HC3. The first byte (HC1) indicates the number of bytes in the text segment, the second byte (HC2) is the device code for the receiving task or process, and the third byte (HC3) is a command or a control code. The text segment may range from 1 to 255 bytes in length and the BCC character is a single byte which is calculated by logical exclusive OR'ing every byte in the text segment.

When the first byte in the message (HC1) is zero, the message is interpreted as a command. The third byte (HC3) identifies the particular command for the receiving task or process.

Referring particularly to FIG. 35, it is the responsibility of the tasks in the front panel processor and the processes in the main processor to obtain data buffers and fill them with data prior to calling the communication software module for transmission. Such a buffer, indicated at 570, is referred to herein as a process transmit queue or a task transmit queue, and one is associated with each task or process which transmits data across the serial data link. Also associated with each such process or task is an IOPB block of data 571 which stores information that is needed by the communication software module in order to service the transmitting task. The IOPB block 571 stores a queue pointer which indicates the address of its associated transmit queue, it stores the address of any buffer set up by its associated task for the receipt of data, and it stores a text length character (HC1), a device code (HC2), and command data (HC3) needed by the communication software module to form a message.

Referring still to FIG. 35, a message transmission is initiated by a task or process which loads its device code in a transmit request table 572 and calls the communication software module 573. The device code is employed by the routine 573 to find the header data and the text of the message to be transmitted. This is accomplished by mapping through a device code table 574 that stores a list of the IOPB block memory addresses for all of the device codes. The header data stored in the IOPB block is then employed to form the header segment of the message and the queue pointer stored in the IOPB block is employed to find the message text.

A similar process occurs at the receiving end of the message. The second character (HC2) in the received message is the device code for the process or task which is to receive the message. This is mapped through the device code table 574 to find the proper IOPB block 571. The address of the data buffer into which the message text is to be stored is found in the IOPB block 571.

Referring to FIG. 36, the communications routine portion of the communication software module 573 is called up by a task or process when a message transmission is to be made. The communications routine enters at 575, and as indicated by process block 576, it maps to the IOPB block for the top entry in the transmit request table 572. As indicated by process block 577, the text length number stored in the IOPB block is then output to the USART and transmitted as the HC1 character. As indicated by process block 578, an XTEXT counter is then preset to the value of the HC1 character, and an XHC2 flag is set as indicated by process block 579. A busy flag is also set as indicated by process block 580 and the system returns to the calling process or task.

Figure 37A:
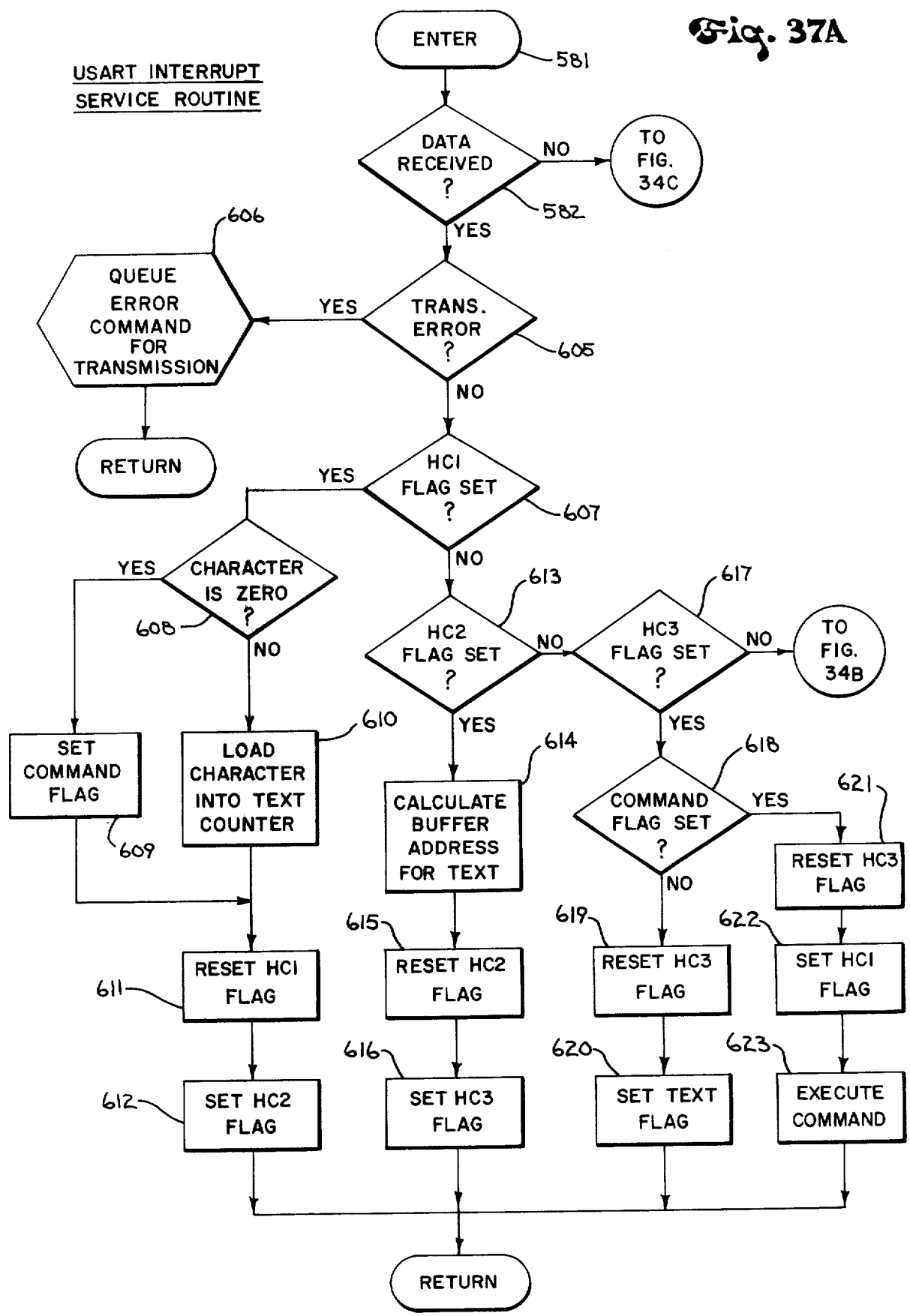
FIGS. 37A-C is a flow chart of the USART interrupt service routine associated with the serial data link and executed by both the main processor and front panel processor.

The transmission of the remainder of a message is completely interrupt driven as is the receipt of a message. Referring to FIGS. 37A and 37C, when the HC1 character has been transmitted by the USART an interrupt is generated which vectors the system to the USART interrupt service routine. The USART interrupt service routine is entered at 581 and an instruction indicated by decision block 582 is executed to determine whether the interrupt was generated by a completed character transmission or the receipt of a character. A transmit interrupt causes the system to branch to a decision block 583 which includes instructions that examine the XHC2 flag. If it is set, the HC2 character is read from the active IOPB block and output to the USART for transmission as indicated by process block 584. The XHC2 flag is then reset as indicated by process block 585 and a XHC3 flag is set as indicated by process block 586. The system then returns to the interrupt routine.

When the next transmit interrupt is generated, the USART interrupt service routine examines the XHC3 flag as indicated by decision block 587 and the third message character (HC3) is read from the active IOPB block and output to the USART for transmission as indicated by process block 588. The XHC3 flag is then reset as indicated by process block 589. As indicated by decision block 590, the value of the HCl byte is read again from the active IOPB block and examined to determine if it is zero. If it is, the message is a command and it is completed, in which case the busy flag is reset as indicated by process block 591 and the system returns to the interrupted routine. Otherwise, an XTEXT flag is set as indicated by process block 592 to indicate that text characters are to be transmitted.

When the next transmit interrupt occurs, the USART interrupt service routine branches through the decision blocks 582, 583, and 587 to a decision block 593 which examines the XTEXT flag. When the XTEXT flag is set, the routine uses the task transmit queue pointer stored in the active IOPB block to read out a character from the task transmit queue 570. This is output to the USART and transmitted as indicated by process block 594. The transmit queue pointer is then incremented as indicated by process block 595 and the XTEXT counter is decremented as indicated by process block 596. The BCC byte is then computed using the transmitted text character as indicated by process block 597, and the XTEXT counter is then examined as indicated by decision block 598 to determine if the entire text has been transmitted. If it has not, the system returns to the interrupted routine and transmits further text characters as subsequent interrupts occur. When the XTEXT counter reaches zero, however, a XBCC flat is set as indicated by process block 599 and the XTEXT flag is reset as indicated by process block 600. The system then returns to the interrupted routine.

When the next transmit interrupt occurs, the USART interrupt service routine branches at decision block 593 and executes an instruction indicated by decision block 601 which determines whether or not the BCC flag is set. If it is not, the system returns to the interrupted routine. Otherwise, the BCC flag is reset as indicated by process block 602 and the calculated BCC byte is output to the USART and transmitted to complete the message. As indicated by process block 603, this event is then reported before the system returns to the interrupted routine. In the front panel processor this report is made to the scheduler routine, whereas, in the main processor this report is made directly to the process which initiated the message transmission.

Figure 37B:
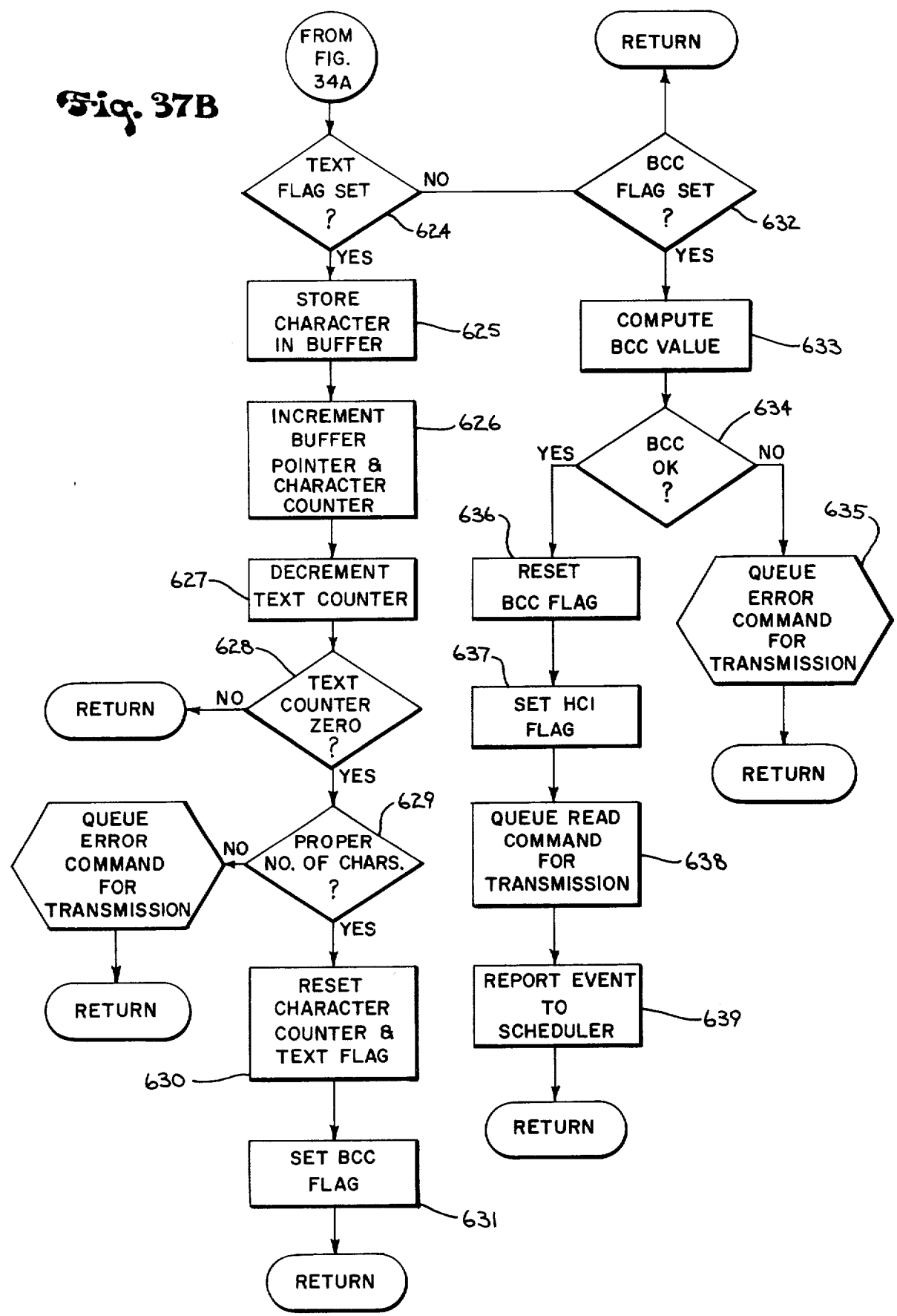
Figure 37C:
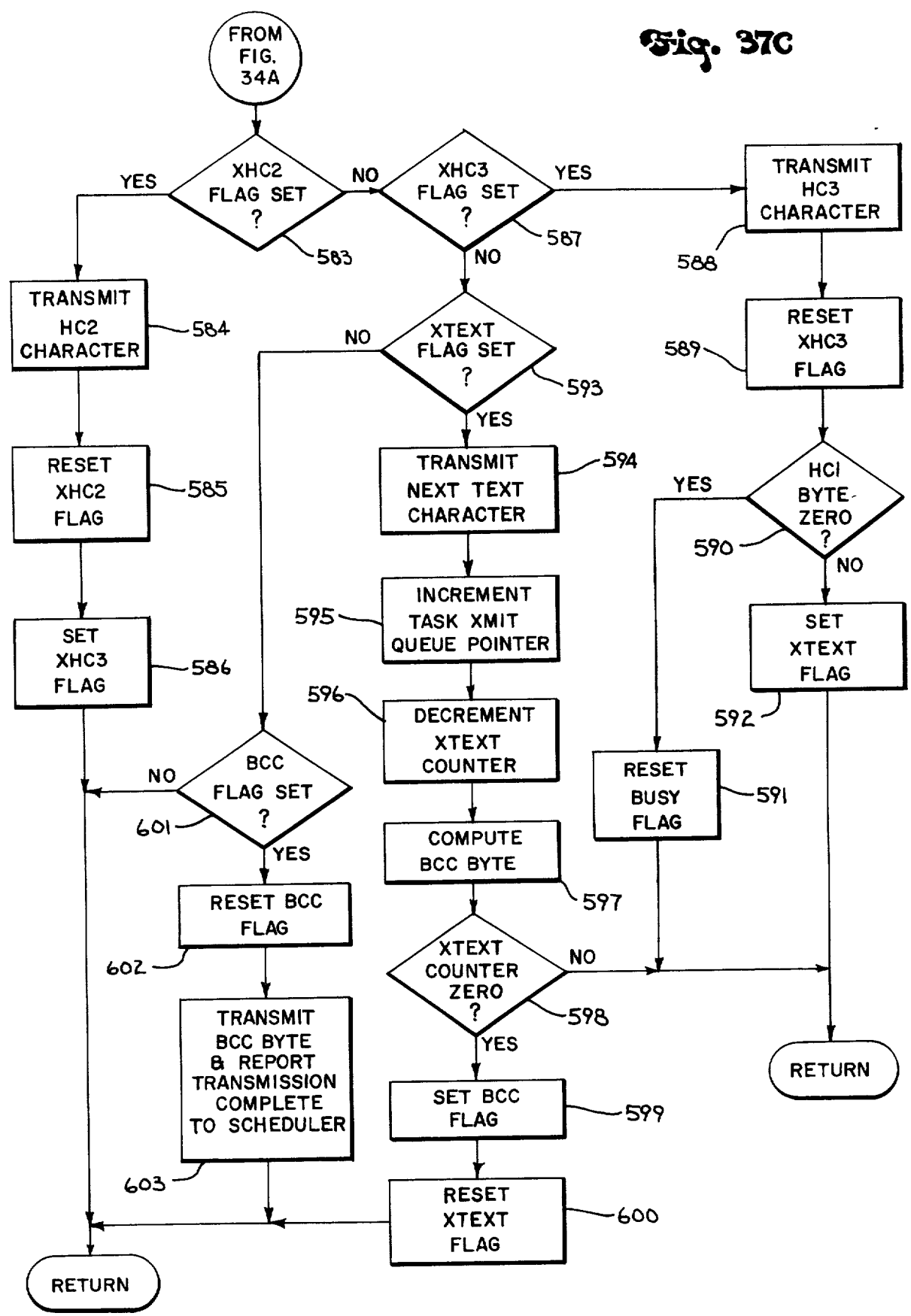

Referring particularly to FIGS. 37A and 37B, when data is received at a USART, it generates an interrupt which also vectors the system to the USART interrupt service routine. The routine is entered at 581 and branches at the decision block 582 to a set of instructions indicated by decision block 605. These instructions examine the USART to determine if a parity, overrun or framing error occurred during the data transmission. If so, the system branches to a subroutine indicated at 606 which alerts the receiving task, or process, and queues up an error command message for transmission. The state of an HC1 flag is then examined as indicated by decision block 607 to determine if the received byte is the HC1 byte, and if so, the character is examined to determine if it is zero as indicated by decision block 608. If it is zero, the message to follow is a command and a command flag is set as indicated by process block 609. Otherwise, the HC1 character is loaded into a TEXT counter as indicated by process block 610, the HCL flag is reset as indicated by process block 611, and a HC2 flag is set as indicated by process block 612. The system then returns to the interrupted routine to await receipt of the next character.

When the next character is received the HC2 flag is tested at decision block 613, and if set, the system branches to a set of instructions indicated by process block 614. The HC2 character is the device number of the receiving task or process, and it is employed to calculate the memory address of the data buffer which has been set aside for the received message. As indicated by process block 615, the HC2 flag is then reset and a HC3 flag is set as indicated by process block 616 before returning to the interrupted routine.

When the HC3 byte is received the USART interrupt service routine branches at decision block 617 that includes instructions which test the HC3 flag. The command flag is then tested as indicated by decision block 618, and if the message is not a command, the HC3 flag is reset as indicated by process block 619 and a TEXT flag is set as indicated by process block 620. On the other hand, if the message is a command, the HC3 flag is reset as indicated by process block 621 and the HC1 flag is set as indicated by process block 622. The routine then analyzes the HC3 byte and executes the indicated command as indicated by process block 623.

Referring particularly to FIG. 37B, if the message is not a command, another interrupt will occur and the USART interrupt service routine branches through to a decision block 624 which tests the condition of the TEXT flag. If it is set, the received character is stored in the data buffer set up by the receiving task as indicated by process block 625. The data buffer pointer is then incremented along with a character counter, as indicated by process block 626. The TEXT counter is decremented as indicated by process block 627 and the TEXT counter is then examined as indicated by decision block 628 to determine if all text characters have been received. If not, the system returns to the interrupted routine. On the other hand, when the text counter is counted down to zero, a test is made of the character counter, as indicated by decision block 629, to determine whether the proper number of characters as indicated by the HC1 byte have been received. If not, the system branches to a sub-routine which indicates the error to the receiving task or process. Under normal operating conditions, however, the proper number of text characters are received and the character counter is reset to zero and the TEXT flag is reset as indicated by process block 360. A BCC flag is then set as indicated by process blocks 631 and the system returns to the interrupted routine.

When the BCC byte is subsequently received, the USART interrupt service routine branches to decision block 632 which determines whether the BCC flag is set. If it is, the received BCC byte is compared to a BCC value which is computed from the previously received text characters as indicated by process block 633. If they are not the same as determined by decision block 634, a sub-routine 635 is called up to notify the receiving task or process of this fact. Normally, however, the transmission is correct and the system branches to a process block 636 which resets the BCC flag followed by a process block 637 which sets the HC1 flag. A "read" command is then queued up for transmission back to the master process or task as indicated by process block 638 and the completed transmission is reported as an event to the scheduler as indicated by process block 639. The USART interrupt service routine then returns to the interrupted routine in condition for receiving the HC1 character of the next message.

It should be apparent from the above description that numerous variations can be made from the preferred embodiment described herein without departing from the scope of the invention. Reference is therefore made to the claims which follow for a definition of the invention.

| COMPONENT APPENDIX | | |
|---|---|---|
| Reference Number | Manufacturer And Model No. | Description |
| 25 | Texas Instruments, Inc. TMS 9900 | 16-bit microprocessor. |
| 29 | MOSTEK MK4104 | 4K × 1 Random Access Memory. |
| 30 | Signetics 82S181 | 1K × 8 Programmable Read-Only Memory. |
| 37 | AMD 9551-4 | Universal Synchronous/Asynchronous Receiver/Transmitter. |
| 45 | Texas Instruments, Inc. TMS 9901 | Interrupt Controller. |
| 53, 54 | Texas Instruments, Inc. 74LS138 | 3-line-to-8-line decoder. |
| 84 | Texas Instruments, Inc. 74LS244 | Tristate Buffers. |
| 85 | Zilog Z-80 | 8-bit Microprocessor. |
| 86 | National Semiconductor DP8304 | Tristate Transceiver. |
| 88 | Signetics 8LS181 | 1K × 8 Programmable Read-Only Memory. |
| 89 | General Instrument ER3401 | 1K × 4 Electrically Alterable Read-Only Memory. |
| 94 | Intel 2114 | 1K × 4 Random Access Memory. |
| 97 | Texas Instruments, Inc. 74LS244 | Tristate Buffer. |
| 100 | Texas Instruments, Inc. 74S472 | 512 × 8 Programmable Read-Only Memory. |
| 103 | AMD 9551-4 | Universal Synchronous/Asynchronous Receiver/Transmitter. |
| 111,116 | Texas Instruments, Inc. 74LS374 | Octal Register. |

COMPONENT APPENDIX

| Reference Number | Manufacturer And Model No. | Description |
|---|---|---|
| 112,117, 122,123 | Texas Instruments, Inc. 74LS244 | Tristate Buffer. |
| 124 | Texas Instruments, Inc. 74LS374 | Octal Register. |
| 130 | Texas Instruments, Inc. 74LS138 | 3-line-to-8-line Decoder. |
| 155 | Texas Instruments, Inc. 74LS138 | 3-line-to-8-line Decoder. |
| 159,162, 163 | Texas Instruments, Inc. 74LS139 | 2-line-to-4-line Decoder. |
| 170 | Texas Instruments, Inc. 74LS123 | Monostable Multi-vibrator. |
| 175 | Texas Instruments, Inc. 74LS244 | Tristate Buffer. |
| 194,195 | Texas Instruments, Inc. 74LS390 | Decade Counter. |
| 220 | Texas Instruments, Inc. TMS9902 | Universal Asynchronous Receiver/Transmitter. |
| 221 | Texas Instruments, Inc. TMS9900 | 16-bit Microprocessor. |
| 224 | Intel 2732 | 4K × 8 Programmable Read-Only Memory. |
| 225 | General Instrument ER3401 | 1K × 4 Electrically Alterable Read-Only Memory |
| 226 | Intel 2114 | 1K × 4 Random Access Memory. |
| 236 | Texas Instruments, Inc. 74LS374 | Octal Register. |
| 251 | National Semi-conductor DP8304 | Octal Transceiver. |
| 252 | Standard Micro-systems Corp. CRT5027 | CRT Timing and Controller. |
| 260 | Texas Instruments, Inc. 74LS139 | 2-line-to-4-line Decoder. |
| 269 | Texas Instruments, Inc. 74LS244 | Tristate Buffer. |
| 274,275, 276 | Texas Instruments, Inc. 74LS374 | Octal Register. |
| 277 | Texas Instruments, Inc. 74LS138 | 3-line-to-8-line Decoder. |
| 285 | Texas Instruments, Inc. TMS9901 | Interrupt Control. |
| 294 | Texas Instruments, Inc. TMS9902 | Universal Asynchronous Receiver/Transmitter. |
| 306 | Texas Instruments, Inc. 74LS244 | Tristate Buffer. |
| 325 | Texas Instruments, Inc. 74LS123 | Monostable Multi-vibrator. |
| 336 | Texas Instruments, Inc. 74LS138 | 3-line-to-8-line Decoder. |
| 338–341 | Texas Instruments, Inc. 74LS259 | 8-bit Addressable Latch. |
| 351–354 | Texas Instruments, Inc. 74LS138 | 3-line-to-8-line Decoder. |

APPENDIX A

```
; PROGRAm LOADER ROUTINE
;
;
INTR    LD      A,(UCA)         ;INPUT USART STATUS
        AND     38H             ;CHECK ERROR BIT
        JP      NZ,BREAK        ;IF ERROR, SEND BREAK
        LD      A,(UDA)         ;INPUT DATA FROM USART
        BIT     7,B             ;USER MODE
        JR      Z,SKP-$         ;NO,SKIP
        POP     HL              ;YES, REPAIR INTR DAMAGE
        LD      HL,7FEH         ;OFFSET TWEEN RAM + EAROM
        ADD     HL,SP           ;HL NOW POINTS AT COPY
        LD      E,(HL)          ;FETCH COPY
        INC     HL              ;BUMP POINTER
        LD      D,(HL)          ;FETCH COPY
        PUSH    DE              ;RESTORE INST
        LD      D,OPRH
SKP     BIT     6,B             ;CHECK B6 TO SEE IF IT IS
        JR      Z,ADDR-$        ;AN ADDR OR AN OPR
        LD      E,A             ;IF OPR, CHECK IF LEADING
        AND     OFOH            ;4 BITS ARE ZERO
        JP      NZ,BREAK        ;IF NOT, SEND BREAK
        BIT     5,B             ;CHECK B5 TO SEE IF IT IS
        JR      NZ,DLO-$        ;THE FIRST 4-BIT DATA
        LD      A,E             ;IF YES, STORE IT IN
        LD      (WDATA),A       ;WDATA
INT1    SET     5,B             ;
INT2    BIT     7,(IY+0)        ;SHOULD PROGRAM RETURN TO NMI
DANGER  JP      Z,NMI1          ;YES
        RES     7,(IY+0)        ;NO, RESET INTR BIT FLAG
        BIT     7,B
        LD      HL,FLAG
        JR      NZ,INT6-$
        BIT     1,(HL)
        JR      Z,INT5-$
        LD      SP,4800H
        JP      LODLP
INT5    BIT     6,(HL)
        JP      NZ,FLG13
        LD      SP,TEMP2+1
        JP      WAIT
INT6    BIT     O,(HL)
        JP      NZ,ZCL1         ;OCCURRED
        EI                      ;
        FETCH
DLO     LD      HL,(WADL)       ;IF INPUT IS THE SECOND
```

APPENDIX A -continued

|  | | | |
|---|---|---|---|
|  | LD | A,(WDATA) | ;4-BIT DATA, MUST |
|  | SLA | A | ;ASSEMBLE 8-BIT DATA |
|  | SLA | A | ;AND STORE IN |
|  | SLA | A | ;LOCATION INDICATED |
|  | SLA | A | ;IN WADL AND WADH |
|  | OR | E | ; |
|  | LD | (HL),A | ; |
|  | RES | 5,B | ; |
|  | RES | 6,B | ; |
|  | JR | INT2-$ | ; |
| ADDR | BIT | 5,B | ;CHECK IF IT IS THE |
|  | JR | NZ,ALO-$ | ;HI-BYTE ADDR |
|  | BIT | 7,A | ;HI-BYTE ADDR BUT BIT 7 |
|  | JR | Z,BREAK-$ | ;ZERO SEND BREAK |
| INT3 | LD | (WADH),A | ;OTHERWISE |
|  | LD | A,COMD | ;STORE AND |
|  | LD | (UCA),A | ;RESET USART |
|  | LD | A,(UDA) | ;DUMMY READ |
|  | JR | INT1-$ | ; |
| ALO | BIT | 7,A | ;LO-BYTE ADDR EXPECTED BUT |
|  | JR | NZ,INT3-$ | ;BIT 7 IS ONE, TREAT IT |
|  | RES | 5,B | ;AS HI-BYTE |
|  | LD | L,A | ;ASSEMBLE 16-BIT ADDRESS |
|  | LD | A,(WADH) | ; |
|  | RL | L | ; |
|  | RRA |  | ; |
|  | RR | L | ; |
|  | LD | E,A | ; |
|  | AND | 1FH | ; |
|  | ADD | 20H | ;MAKE ADDR, ABSOLUTE |
|  | CP | RAMEND+1 | ;BEYOND USER MEMORY? |
|  | JR | NC,FINTR-$ | ; |
| INT4 | BIT | 5,E | ;CHECK IF READ OR WRITE |
|  | JR | NZ,WRITE-$ | ; |
|  | LD | H,A | ;IF READ,HI-ADDR, IN H |
| WA | LD | A,(UCA) | ;LOOP WAITING FOR |
|  | BIT | 0,A | ;TRANSMITTER |
|  | JR | Z,WA-$ | ;TO BE READY |
|  | LD | A,(HL) | ;WITHIN BOUNDS, READ MEMORY |
|  | LD | (UDA),A | ;AND OUTPUT IT |
|  | INC | HL | ; |
| WAIT1 | LD | A,(UCA) | ;CHECK IF USART READY |
|  | BIT | 0,A | ;FOR SECOND BYTE |
|  | JR | Z,WAIT1-$ | ; |
|  | LD | A,(HL) | ;SEND SECOND BYTE |
|  | LD | (UDA),A | ; |
|  | RES | 5,B | ;RESET FLAGS!!! |
|  | RES | 6,B | ; |
|  | JP | INT2 | ; |
| WRITE | LD | (WADH),A | ;WRITE OPERATION |
|  | LD | A,L | ;STORE |
|  | LD | (WADL),A | ; |
|  | SET | 6,B | ; |
|  | JP | INT2 | ; |
| BREAK | LD | A,3FH | ;SEND BREAK CHARACTERS |
|  | LD | (UCA),A | ;AND RESET B5 AND B6 |
|  | RES | 5,B | ;FLAGS |
|  | RES | 6,B | ; |
|  | BIT | 7,B | ;USER MODE? |
|  | JP | Z,INT2 | ;NO,SKIP INTR DAMAGE FIX |
|  | POP | HL | ;YES,REPAIR INTR DAMAGE |
|  | LD | HL,7FEH | ;OFFSET TWEEN RAM + EAROM |
|  | ADD | HL,SP | ;HL NOW POINTS AT COPY |
|  | LD | E,(HL) | ;FETCH COPY |
|  | INC | HL | ;BUMP POINTER |
|  | LD | D,(HL) | ;FETCH COPY |
|  | PUSH | DE | ;RESTORE INSTRUCTION |
|  | LD | D,OPRH | ;RESTORE D-REG |
|  | JP | INT2 | ;RETURN |
|  | JP | INT2 | ; |
| FINTR | BIT | 5,E | ;BEYOND USER,READ OR WRITE |
|  | JR | NZ,FWRIT-$ | ;WRITE NEEDS SPECIAL TREAT |
| FWA | LD | A,(UCA) | ;READ |
|  | BIT | 0,A | ;XMTR READY? |
|  | JR | Z,FWA-$ | ;NO,LOOP |
|  | LD | A,0FFH | ;YES, SEND ALL ONES |
|  | LD | (UDA),A | ; |
| FWAIT | LD | A,(UCA) | ;WAIT TILL XMTR |
|  | BIT | 0,A | ;READY FOR |
|  | JR | Z,FWAIT-$ | ;SECOND BYTE |
|  | LD | A,0FFH | ;2ND BYTE ALL ONES |

APPENDIX A -continued

|  | LD | (UDA),A | ;OUTPUT IT |
|---|---|---|---|
|  | RES | 5,B | ;RESET FLAGS!!!! |
|  | RES | 6,B | ; |
|  | JP | INT2 | ;RETURN |
| FWRIT | LD | A,48H | ;WRITE INTO ILLEGAL MEM. |
|  | LD | L,00H | ;POINT ADDR AT EMPTY |
|  | JP | WRITE | ;AND DO IT AS USUAL |

APPENDIX B

; NON-MASKABLE INTERRUPT ROUTINE
;

| NMIR | DI | | ;DO NOT ALLOW INTERRUPTS |
|---|---|---|---|
|  | EX | AF,AF' | ;SAVE ACC + STATUS BRIEFLY |
|  | BIT | 7,B | ;OVERLAP ERROR? |
|  | JP | NZ,OVLPER | ;YES, GO TAKE CARE OF IT |
|  | BIT | 7,(IY+0) | ;WAS INTR INTERRUPTED? |
|  | JR | Z,NMI1-$ | ;NO, CONTINUE |
|  | RES | 7,(IY+0) | ;YES, RESET FLAG AND RETURN |
|  | XOR | A | ;CLEAR CARRY FLAG |
|  | EXX | | ;EXCHANGE REGISTER SETS |
|  | LD | HL,DANGER | ;HL←DANGER ADDRESS |
|  | POP | DE | ;POP RETURN ADDRESS |
|  | PUSH | DE | ;RESTORE RETURN ADDRESS |
|  | EX | DE,HL | ;SWAP COMPARISON REGISTERS |
|  | SBC | HL,DE | ;COMPARE ADDRESSES |
|  | JR | Z,NMI1A-$ | ;IF ZERO, EXX AND CONTINUE NMI |
|  | LD | DE,3 | ;IS RETURN ADDR = DANGER+3? |
|  | XOR | A | ;CLEAR CARRY FLAG |
|  | SBC | HL,DE | ;TEST FOR INSTR AFTER DANGER |
|  | JR | Z,NMI1A-$ | ;YES, EXX AND EXECUTE NMIR |
|  | EXX | | ;RESTORE REGS |
|  | EX | AF,AF' | ;RESTORE ACC AND STATUS |
|  | RET | | ;RETURN |
| NMI1A | EXX | | ;RESTORE REGS |
| NMI1 | LD | A,(STATP) | ;FETCH PROCESSOR STATUS |
|  | RLCA | | ;ROTATE STATUS |
|  | LD | (STAT),A | ;AND STORE IT |
|  | LD | A,(STATP) | ;FETCH PROCESSOR STATUS |
|  | BIT | 2,A | ;LOAD MODE? |
|  | JP | NZ,LOADMO | ;YES, GO TO IT |
|  | BIT | 7,A | ;ANY ERROR? |
|  | JP | NZ,ERROR | ;YES, GO TAKE CARE OF IT |
|  | LD | (WDOG),A | ;KICK WATCHDOG |
| FLGINP | DI | | ;CANNOT ALLOW INTR |
|  | EXX | | ;SWAP REGISTERS |
|  | LD | HL,FLGIOI | ;PI TABLE ADDR IN HL |
|  | LD | DE,FLGTBL | ;PI TABLE ADDR IN DE |
|  | LD | BC,WRDCNT | ;NO, BYTES IN PI TBL IN BC |
|  | LDIR | | ;TRANSFER PI TABLE FROM |
|  |  |  | ;MAIN PROCESSOR |
|  | LD | A,(HL) | ;INPUT ONE MORE WORD |
| INC | HL | ;THROW AWAY MSBYTE | |
|  | LD | A,(HL) | ;GET LSBYTE |
|  | CP | 0 | ;NON-ZERO? |
|  | LD | HL,FLAG | ;LOOK AT FLAG WORD |
|  | JR | NZ,FLGI1-$ | ;YES, SET OUTPUT DISABLE FL |
|  | RES | 3,(HL) | ;NO,CLR OUTPUT DISABLE FL |
|  | JR | FLGI2-$ | ; |
| FLGI1 | SET | 3,(HL) | ; |
| FLGI2 | EXX | | ;ALL DONE: CLEAN UP |
|  | LD | HL,FLAG | ;POINT HL AT FLAG REG |
|  | SET | 6,(HL) | ;SET I/O SCAN FLAG |
|  | EI | | ;ALLOW INTR |
| FLGI3 | LD | A,(UCA) | ;CHECK IF PANEL IS |
|  | BIT | 7,A | ;CONNECTED, IF NOT, |
|  | JP | Z,CLR | ;CLEAR FORCED I/O |

;
; I/O SCAN
| IOS1 | DI | | ;NO INTERRUPTS! |
|---|---|---|---|
|  | EXX | | ;SWAP REGISTERS |
|  | LD | HL,FLAG | ;POINT HL AT FLAG REG. |
|  | RES | 6,(HL) | ;RESET I/O SCAN FLAG |
|  | BIT | 3,(HL) | ;OUTPUTS DISABLED |
|  | JR | NX,IOS4-$ | ;YES, SKIP OUTPUT |
|  | LD | HL,IMAG | ;I/O IMAGE TABLE ADDRESS IN HL |
|  | LD | DE,IOPO | ;LOAD OUTPUT PORT ADDR IN DE |

APPENDIX B

|  |  |  |  |
|---|---|---|---|
|  | LD | BC,NBR | ;NO. OF I/O SLOTS IN BC |
| IOS2 | LDI |  | ;OUTPUT HI-BYTE |
|  | LDI |  | ;OUTPUT LO-BYTE |
|  | INC | HL | ;SKIP NEXT TWO BYTES IN IMAG |
|  | INC | HL | ;(INPUT BYTES) |
|  | JP | PE,IOS2 | ;LOOP IF NOT DONE |
| IOS4 | LD | HL,IOPI | ;INPUT PORT ADDR. IN HL |
|  | LD | DE,IMAG+2 | ;I/O IMAGE TABLE + 2 |
|  | LD | BC,NBR | ;NO. OF I/O SLOTS IN BC |
| IOS3 | LDI |  | ;INPUT HI-BYTE |
|  | LDI |  | ;INPUT LO-BYTE |
|  | INC | DE | ;SKIP NEXT TWO BYTES IN IMAG |
|  | INC | DE | ;(OUTPUT BYTES) |
|  | JP | PE,IOS3 | ;LOOP IF NOT DONE |
|  | EXX |  | ;SWAP REGISTERS BACK |
|  | LD | HL,AION | ;GET ADDR FOR FORCED ON |
|  | MASK |  | ;GENERATE MASK |
|  | FON |  | ;PERFORM FORCED ON |
|  | LD | HL,AIOF | ;GET ADDR FOR FORCED OFF |
|  | MASK |  | ;GENERATE MASK |
|  | FOF |  | ;PERFORM FORCED OFF |
|  | LD | C,INTH | ;PREPARE REGISTERS FOR |
|  | LD | C,OPRH | ;PROGRAM EXECUTION |
|  | LD | SP,USER | ; |
|  | SET | O,B | ; |
|  | SET | 7,B | ; |
|  | EI |  | ;ALLOW USART TO INTR. |
|  | FETCH |  | ;FETCH 1ST INST IN USER PR |
| OVLPER | LD | HL,FLAG | ;POINT HL AT FLAG REG |
|  | SET | 2,(HL) | ;SET OVERLAP ERROR BIT |
|  | POP | HL | ;BACK SP TO CREAMED INST |
|  | LD | HL,7FEH | ;OFFSET TWEEN RAM + EAROM |
|  | ADD | HL,SP | ;HL NOW POINTS AT COPY |
|  | LD | E,(HL) | ;FETCH COPY |
|  | INC | HL | ;BUMP POINTER |
|  | LD | D,(HL) | ;FETCH COPY |
|  | PUSH | DE | ;RESTORE INST |
|  | LD | D,OPRH | ;RESTORE D-REG |
|  | LD | HL,FLAG | ; |
|  | BIT | O,(HL) | ; |
|  | JP | NZ,ZCL1 | ; |
|  | FETCH |  | ; |
|  | EI |  | ; |

APPENDIX C

; END MACRO-INSTRUCTION INTERPRETER ROUTINE

|  |  |  |  |
|---|---|---|---|
| FLGOUT |  |  | ;CANNOT ALLOW INTR |
|  | LD | HL,AOON | ;GET ADDR FOR FORCED ON |
|  | MASK |  | ;GENERATE MASK |
|  | FON |  | ;PERFORM FORCED ON |
|  | LD | HL,AOOF | ;GET ADDR FOR FORCED OFF |
|  | MASK |  | ;GENERATE MASK |
|  | FOF |  | ;PERFORM FORCED OFF |
|  | EXX |  | ;SWAP REGISTERS |
|  | LD | HL,FLGTBL | ;PI TABLE ADDR IN HL |
|  | LD | DE,FLGIOO | ;PI OUTPUT ADDR IN DE |
|  | LD | BC,WRDCNT | ;NO. BYTES IN PI TBL IN BC |
|  | LDIR |  | ;TRANSFER TABLE |
|  | LD | HL,FLAG | ;FLAG ADDR, IN HL |
|  | BIT | 2,(HL) | ;OVERLAP ERROR? |
|  | JR | Z,FLGOK-$ | ;NO, NORMAL XFER FLAG |
|  | RES | 2,(HL) | ;YES,RESET BIT FLAG |
|  | LD | A,OFFH | ;LOAD NEG. XFER FLAG |
|  | JR | FLG1-$ | ;AND OUTPUT IT |
| FLGOK | LD | A,7FH | ;LOAD NORMAL XFER FLAG |
| FLG1 | LD | (DE),A | ;OUTPUT 1ST HALF |
|  | INC | DE | ;BUMP POINTER |
|  | LD | (DE),A | ;OUTPUT 2ND HALF |
|  | EXX |  | ;ALL DONE: CLEAN UP |
|  | LD | A,OFOH | ;LOAD MASK |
|  | AND | B | ; |
|  | LD | B,A | ; |
|  | SET | 4,B | ;TURN ON MCR |
|  | RES | 7,B | ;GO TO SYSTEM MODE |
|  | LD | A,(FLAG) | ; |
|  | RES | 0,A | ;TURN ON ZCL |
|  | RES | 1,A | ;GO TO SYSCK |

APPENDIX C (-continued)

```
RES    4,A          ;NO LONGER FIRST SCAN
RES    5,A          ;
LD     (FLAG),A     ;
LD     SP,TEMP2+1   ;POINT SP AT TEMP 2+1
EI
JP     WAIT         ;WAIT FOR NMI
```

We claim:

1. A numerical control system for operating the servomechanisms and discrete devices on a machine tool which comprises:
   - a main processor having a main microprocessor which connects to a main memory through a main data bus and a main address bus, said main processor being operable in response to instructions which are stored in its memory and executed by its microprocessor to convert blocks of part program data into motion command signals for the servomechanisms on said machine tool and into discrete logic signals which are stored in a programmable interface image table portion of said main memory; and
   - a programmable interface processor having a PI microprocessor which connects to a PI memory through a PI data bus and a PI address bus and having a DMA circuit which couples the PI data bus and PI address bus to said main data bus and said main address bus, said programmable interface processor being operable in response to instructions which are stored in its memory and executed by its microprocessor to: (a) read data out of the programmable interface image table in said main memory and write said data into a corresponding programmable interface image table portion of the PI memory; (b) input data indicative of the state of discrete devices on the machine tool and store it in an I/O image table portion of said PI memory; (c) perform logical operations using data from the programmable interface image table and I/O image table portions of said PI memory and storing the results of said logical operations at selected locations in said programmable interface image table and I/O image table portions of said PI memory; (d) output data from said I/O image table portion of said PI memory to control discrete devices on said machine tool; and (e) read data out of the programmable interface image table portion of the PI memory and write said data into the programmable interface image table portion of said main memory.

2. The numerical control system as recited in claim 1 which includes a front panel processor having an FP microprocessor which connects to an FP memory through an FP data bus and an FP address bus and having means for coupling it to the main processor, means for coupling it to a keyboard, means for coupling it to a display and means for coupling it to a set of front panel switches, said front panel processor being operable in response to instructions which are stored in its memory and executed by its microprocessor to couple data from said keyboard and said set of front panel switches to said main processor and to couple data received from said main processor to said display.

3. The numerical control system as recited in claim 2 wherein said means for coupling said FP microprocessor to said main processor includes a serial data link.

4. The numerical control system as recited in claim 3 in which said means for coupling said FP microprocessor to said main processor further includes first universal receiver/transmitter means connecting said serial data link to said main processor and second universal receiver/transmitter means connecting said serial data link to said FP microprocessor.

5. The numerical control system as recited in claims 2, 3 or 4 in which said main memory stores a front panel image table that indicates the state of said set of front panel switches and said FP memory stores a front panel image table that indicates the state of said set of front panel switches and in which said front panel processor operates to periodically compare the current state of said set of front panel switches with the state of said front panel image table stored in said FP memory, and if there is a difference, to update the front panel image table in said FP memory by changing its contents and coupling data to said main processor which indicates the corresponding change to be made in said front panel image table stored in said main memory.

6. The numerical control system as recited in claims 1, 2, 3 or 4 in which said discrete devices on said machine tool are coupled to said main data bus by I/O interface circuit means and data is input from the discrete devices and output to them by said programmable interface processor through said DMA circuit.

7. The numerical control system as recited in claims 1, 2, 3 or 4 in which said logical operations performed by said programmable interface processor using data from the programmable interface image table and I/O image table portions of said PI memory and storing the results of said logical operations at selected locations in said programmable interface image table and I/O image table portions of said PI memory are determined by a control program comprised of macroinstructions stored in a control program portion of said PI memory, and in which said control program macroinstructions are executed by mapping them into corresponding macroinstruction interpreter routines stored in said PI memory.

8. The numerical control system as recited in claim 7 in which said programmable interface processor includes a PI universal receiver/transmitter coupled to the PI data bus, and said PI microprocessor is operable to receive macroinstructions through said PI universal receiver/transmitter from a program panel station and write them into said control program portion of said PI memory.

9. A numerical control system for operating the servomechanisms and discrete devices on a machine tool which comprises:
   - a main processor having a main microprocessor which connects to a main memory through a main data bus and a main address bus, said main processor being operable in response to instructions which are stored in its memory and executed by its microprocessor to convert blocks of part program data into motion command signals for the servomechanisms on said machine tool; and a front panel processor having an FP microprocessor which connects to an FP memory through an FP data bus and an FP address bus and having serial data link means for coupling it to the main processor, means for coupling it to a keyboard, means for coupling it to a display and means for coupling it to a set of front panel switches, said front panel processor being operable in response to instructions which are stored in its memory and executed by its FP microprocessor to couple data from said keyboard and said set of front panel switches to said main processor and to couple data received from said main processor to said display.

10. The numerical control system as recited in claim 9 in which said means for coupling said FP microprocessor to said main processor further includes first universal receiver/transmitter means connecting said serial data link to said main processor and second universal receiver/transmitter means connecting said serial data link to said FP microprocessor.

11. The numerical control system as recited in claims 9, or 10 in which said main memory stores a front panel image table that indicates the state of said set of front panel switches and said FP memory stores a front panel image table that indicates the state of said set of front panel switches and in which said front panel processor operates to periodically compare the current state of said set of front panel switches with the state of said front panel image table stored in said FP memory, and if there is a difference, to update the front panel image table in said FP memory by changing its contents and coupling data to said main processor which indicates the corresponding change to be made in said front panel image table stored in said main memory.

12. A numerical control system which comprises:
processor means having a set of data terminals, a set of address terminals and an interrupt request terminal;
a data bus coupled to said processor data terminals;
an address bus coupled to said processor address terminals;
means coupled to said data bus for interfacing with servomechanisms on a machine tool;
means coupled to said data bus for receiving part program data, for receiving operator commands, and for receiving data indicative of the state of switches on a front panel;
real time clock means coupled to said interrupt request terminal on said processor and being operable to define a series of time slices by periodically generating an interrupt request signal to said processor;
a memory coupled to said data bus and said address bus and being operable to store an active interpolator buffer, a front panel image table, blocks of part program data, and a plurality of sets of instructions which when executed by said processor cause a specific function to be performed, said sets of instructions including
(a) a timed interrupt routine for calculating motion command signals from data stored in said active interpolator buffer and outputting them to said servomechanism interfacing means, said motion command signals directing the motion of said servomechanisms for an iteration period comprised of a preselected number of time slices,
(b) a block set-up routine for calculating data for said active interpolator buffer from a block of stored part program data,
(c) a front panel monitor routine for updating the state of said front panel image table in response to the data received from said front panel switches,
(d) operator command routine for performing functions indicated by the received operator commands,
(e) program load routine for storing in said memory the received part program data, and
(f) a scheduler routine which is entered each time an interrupt request is made by said real time clock means and which is operable to schedule said timed interrupt routine for execution during each iteration period and is operable to allocate a preselected number of time slices of execution time to each of the remaining routines.

13. The numerical control system as recited in claim 12 in which said memory stores a schedule queue which includes data that identifies the routines which are allocated execution time by said scheduler routine.

14. The numerical control system of claim 13 in which said memory stores a plurality of process control blocks, one associated with each routine allocated execution time by said scheduler routine, and each storing data which indicates where its associated routine is to be entered when allocated execution time.

15. The numerical control system as recited in claim 12 which includes I/O interface means for coupling said data bus to discrete devices on said machine tool and programmable interface means coupled to said data bus and responsive to a signal generated by said processor each time it executes said timed interrupt routine to input data from said I/O interface means, perform logical operations with said data, and output data to said I/O interface means.

16. The numerical control system as recited in claim 15 in which said programmable interface performs its logical operations while said processor is executing instructions stored in said memory.

17. The numerical control system as recited in claim 12 in which said means coupled to said data bus for receiving part program data, for receiving operator commands and for receiving data indicative of switches on a front panel includes a serial data link coupled to said data bus by a universal receiver/transmitter and all of said data is coupled through said serial data link.

18. A numerical control system which comprises:
a main processor having means for inputting blocks of part program data, means for storing a programmable interface image table and means for outputting motion command signals to servo-mechanisms on a machine tool, said main processor being operable to convert part program data into motion command signals which are output to said servomechanisms once during a defined interation period and to convert part program data into discrete logic signals which are stored in said programmable interface image table; and
a programmable interface processor coupled to said main processor and to the discrete devices on said machine tool through I/O interface circuits, said programmable interface processor being operable once during each iteration period to input data from said I/O interface circuits and said programmable interface image table, to execute a control program using this data, and to output data to said I/O interface circuits and said programmable interface image table.

19. The numerical control system as recited in claim 18 in which the functions performed by said programmable interface processor are carried out while said main processor is carrying out its function.

20. The numerical control system as recited in claim 19 in which the functions carried out by said programmable interface processor are synchronized with the functions carried out by said main processor by means of a signal generated by said main processor.

21. A numerical control system which comprises:
   a main processor having means for storing part program data, means for outputting motion command signals to the servomechanisms on a machine tool and means for converting part program data into motion command signals;
   a pendent control station located remotely from the main processor and coupled to the main processor by a serial data link said pendent control station including a front panel processor which comprises:
   (a) keyboard interface means;
   (b) switch interface means;
   (c) means for inputting part program data;
   (d) display means; and
   (e) means coupled to said keyboard interface means, said switch interface means, said part program data input means and said serial data link means for inputting data to said main processor and being coupled to said serial data link and said display means for outputting data from said main processor to said display.

22. A numerical control system which comprises:
   a main processor having means for storing part program data, means for outputting motion command signals to the servomechanism on a machine and means for converting part program data into motion command signals;
   a pendent control station located remotely from the main processor and coupled to the main processor by a serial data link, said pendent control station including a front panel processor which comprises:
   (a) processor means having a set of data terminals, a set of address terminals and a set of interrupt request terminals;
   (b) a data bus coupled to said processor means data terminals;
   (c) an address bus coupled to said processor means address terminals;
   (d) switch interface means connected to sense the state of a plurality of switches mounted on said pendent control station and being coupled to said data bus and said address bus;
   (e) keyboard interface means having an input connected to receive digital signals from a keyboard and an output connected to said data bus, said keyboard interface means being operable to generate an interrupt request signal to one of said interrupt request terminals when digital signals are received at its input;
   (f) universal receiver/transmitter means connected to couple data between said serial data link and a data terminal on said processor means, said universal receiver/transmitter means being operable to generate an interrupt request signal to another one of said interrupt request terminals when data is received over said serial data link from said main processor.

23. The numerical control system as recited in claim 22 in which said front panel processor includes display interface means coupled to said data bus and said address bus and having outputs connected to a display.

24. The numerical control system as recited in claim 22 in which said front panel processor includes CRT interface means coupled to said data bus and a cathode ray display, said CRT interface means being operable to generate an interrupt request signal to another one of said interrupt request terminals at the beginning of each vertical retrace of said cathode ray display.

25. The numerical control system as recited in claim 22, 23 or 24 in which said front panel processor includes means for interfacing a tape reader with said processor means including an input for receiving digital signals from a tape reader, an output coupled to a data terminal on said processor means and means for generating an interrupt request signal to another interrupt request terminal on said processor means when digital signals are received at its input.

26. A numerical control system which comprises:
   a main processor having means for storing part program data and an image table, means for outputting motion command signals to the servomechanism on a machine and means for converting part program data into motion command signals;
   a pendent control station coupled to said main processor by a serial data link, said pendent control station including means for storing a front panel image table which indicates the state of a set of switches on said pendent control station, means for periodically inputting the state of said switches and comparing their state with that of the front panel image table, means for updating the front panel image table to reflect any changes in state of said set of switches, and means for transmitting any changes in the state of said set of switches through said serial data link to the image table in said main processor.

* * * * *